US006959166B1

(12) United States Patent
Gabai et al.

(10) Patent No.: US 6,959,166 B1
(45) Date of Patent: Oct. 25, 2005

(54) INTERACTIVE TOY

(75) Inventors: Oz Gabai, Tel Aviv (IL); Jacob Gabai, Tel Aviv (IL); Nimrod Sandlerman, Ramat Gan (IL)

(73) Assignee: Creator Ltd., Givat Shmuel (IL)

( * ) Notice: Subject to any disclaimer, the term of this patent is extended or adjusted under 35 U.S.C. 154(b) by 742 days.

(21) Appl. No.: 09/602,892

(22) Filed: Jun. 23, 2000

Related U.S. Application Data

(63) Continuation of application No. 09/081,255, filed on May 19, 1998, now Pat. No. 6,160,986.

(30) Foreign Application Priority Data

Apr. 16, 1998 (IL) ............................................... 124122

(51) Int. Cl.[7] ................................................ G09B 5/00

(52) U.S. Cl. ..................... 434/308; 434/307 R; 463/42; 446/297; 709/228

(58) Field of Search ................................ 434/118, 169, 434/185, 307 R, 308, 322, 323, 362, 365; 446/175, 280, 297, 298, 301, 302, 340, 341, 354, 397, 43, 91, 176, 299, 454; 463/1, 35, 39, 15, 23, 24, 29, 31; 345/50, 473, 474; 273/148 B, 460

(56) References Cited

U.S. PATENT DOCUMENTS

| | | | | |
|---|---|---|---|---|
| 4,642,710 A | | 2/1987 | Murtha et al. | |
| 4,670,848 A | | 6/1987 | Schramm | |
| 4,679,789 A | | 7/1987 | Okada | |
| 4,712,184 A | | 12/1987 | Haugerud | |
| 4,717,364 A | | 1/1988 | Furukawa | |
| 4,752,068 A | * | 6/1988 | Endo | 463/15 |
| 4,802,879 A | | 2/1989 | Rissman et al. | |
| 4,840,602 A | | 6/1989 | Rose | |
| 4,846,693 A | | 7/1989 | Baer | |

(Continued)

FOREIGN PATENT DOCUMENTS

| | | |
|---|---|---|
| DE | 3009-040 | 5/1982 |
| WO | 87/06487 | 11/1987 |

OTHER PUBLICATIONS

M. Fujita et al., "An Open Architecture for Robot Entertainment", Proceedings of the First International Conference on Autonomous Agents, Morina del Rey, U.S.A., Feb. 5–8, 1997, pp. 435–442.

M. Sekiguchi et al., "Behavior Control for a Mobile Robot by Multi–Hierarchical Neural Network", Proceeding of the International Conference on Robotics and Automation, Scottsdale, May 15–19, 1989, pp. 1578–1583.

D. Taylor, "Three ways to Get A–Life", IEEE Expert, vol. 12, No. 4, Jul. 1, 1997, pp. 25–30.

D.A. Norman, "How Might People Interact with Agents", Communications of the ACM, 37(7):68–71, Jul. 1994.

J. Bates, Communications of the ACM, 37(7):122–125, Jul. 1994, "The Role of Emotion in Believable Agents".

Microsoft Corp., Using the Microsoft Agent Character Editor, Aug. 1997.

Microsoft Corp., Designing Characters for Microsoft Agent, Aug. 1997.

D. Barker, "Secret Agent Man: Microsoft's New Animated Agent Technology," Jan./Feb. 1998, pp. 49–51.

Brochure: The Industry Standard for Creating and Distributing Interactive Applications, Macromedia Director, Version 5, 1996.

Brochure: Authoring Tool for Interactive Learning, Macromedia, 1993.

*Primary Examiner*—Joe H. Cheng
(74) *Attorney, Agent, or Firm*—Darby & Darby

(57) ABSTRACT

The present invention relates to computer systems and methods generally and more particularly to development of interactive constructs, to techniques for teaching such development, and to verbally interactive toys.

4 Claims, 68 Drawing Sheets

U.S. PATENT DOCUMENTS

| | | | | | |
|---|---|---|---|---|---|
| 4,857,030 | A | | 8/1989 | Rose | |
| 4,858,930 | A | * | 8/1989 | Sato | 463/23 |
| 4,923,428 | A | | 5/1990 | Curran | |
| 4,959,037 | A | | 9/1990 | Garfinkel | |
| 5,021,878 | A | | 6/1991 | Lang | |
| 5,032,099 | A | | 7/1991 | Chan | |
| 5,109,222 | A | | 4/1992 | Welty | |
| 5,142,803 | A | | 9/1992 | Lang | |
| 5,191,615 | A | | 3/1993 | Aldava et al. | |
| 5,195,920 | A | | 3/1993 | Collier | |
| 5,209,695 | A | | 5/1993 | Rothschild | |
| 5,241,142 | A | | 8/1993 | Thangavelu | |
| 5,270,480 | A | | 12/1993 | Hikawa | |
| 5,281,143 | A | | 1/1994 | Arad et al. | |
| 5,289,273 | A | | 2/1994 | Lang | |
| 5,358,259 | A | * | 10/1994 | Best | 463/31 |
| 5,369,575 | A | | 11/1994 | Lamberti et al. | |
| 5,377,103 | A | | 12/1994 | Lamberti et al. | |
| 5,386,556 | A | | 1/1995 | Hedin et al. | |
| 5,388,493 | A | | 2/1995 | Curletto | |
| 5,390,281 | A | | 2/1995 | Luciw et al. | |
| 5,390,282 | A | | 2/1995 | Koza et al. | |
| 5,395,242 | A | * | 3/1995 | Slye et al. | 463/1 |
| 5,479,564 | A | | 12/1995 | Vogten et al. | |
| 5,581,664 | A | | 12/1996 | Allen et al. | |
| 5,608,624 | A | | 3/1997 | Luciw | |
| 5,615,112 | A | | 3/1997 | Liu Sheng et al. | |
| 5,615,304 | A | | 3/1997 | Hatanaka et al. | |
| 5,636,994 | A | * | 6/1997 | Tong | 434/308 |
| 5,655,945 | A | | 8/1997 | Jani | |
| 5,656,907 | A | | 8/1997 | Chainani et al. | |
| 5,677,835 | A | | 10/1997 | Carbonell et al. | |
| 5,694,558 | A | | 12/1997 | Sparks et al. | |
| 5,696,884 | A | | 12/1997 | Heckerman et al. | |
| 5,727,951 | A | | 3/1998 | Ho et al. | |
| 5,752,880 | A | | 5/1998 | Gabai et al. | |
| 5,779,486 | A | | 7/1998 | Ho et al. | |
| 6,075,195 | A | | 6/2000 | Gabai et al. | |
| 6,134,590 | A | * | 10/2000 | Perlman | 709/228 |
| 6,160,986 | A | | 12/2000 | Gabai et al. | |
| 6,206,745 | B1 | * | 3/2001 | Gabai et al. | 446/91 |
| 6,439,956 | B1 | * | 8/2002 | Ho | 446/454 |
| 6,663,393 | B1 | * | 12/2003 | Ghaly | 434/262 |
| 2001/0032278 | A1 | * | 10/2001 | Brown et al. | 710/101 |

* cited by examiner

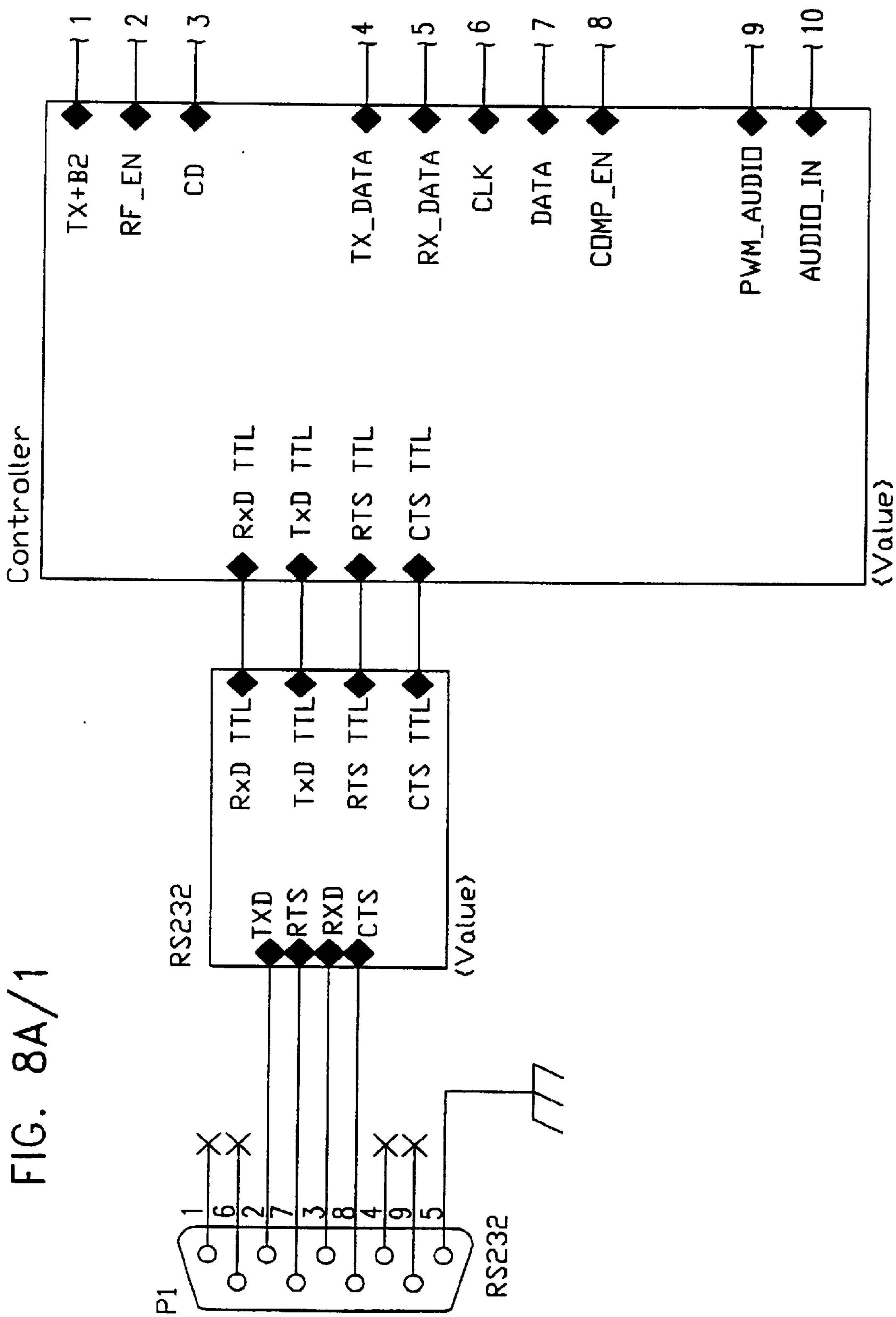
FIG. 8A/1

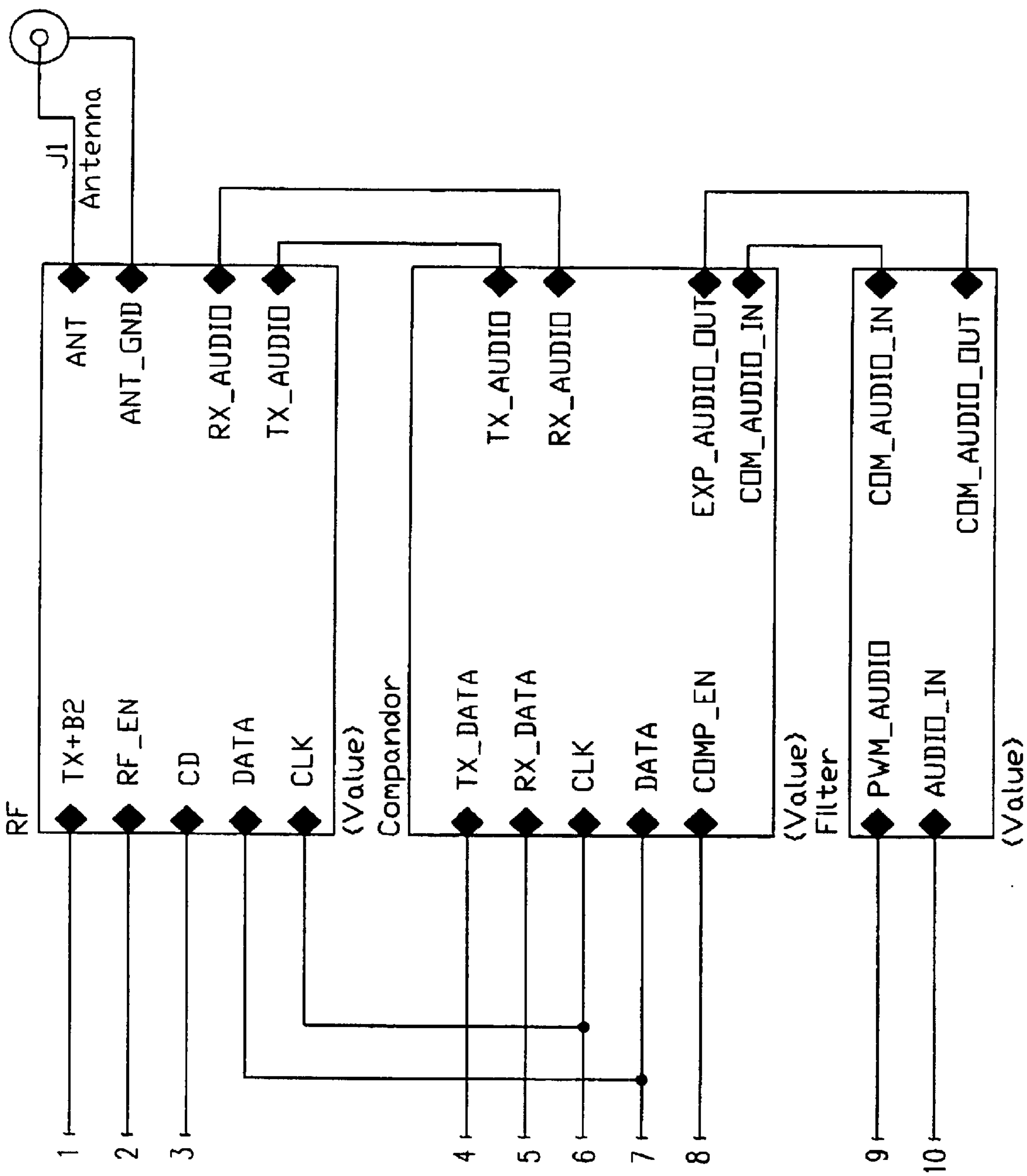
FIG. 8A/2

FIG. 8B/1
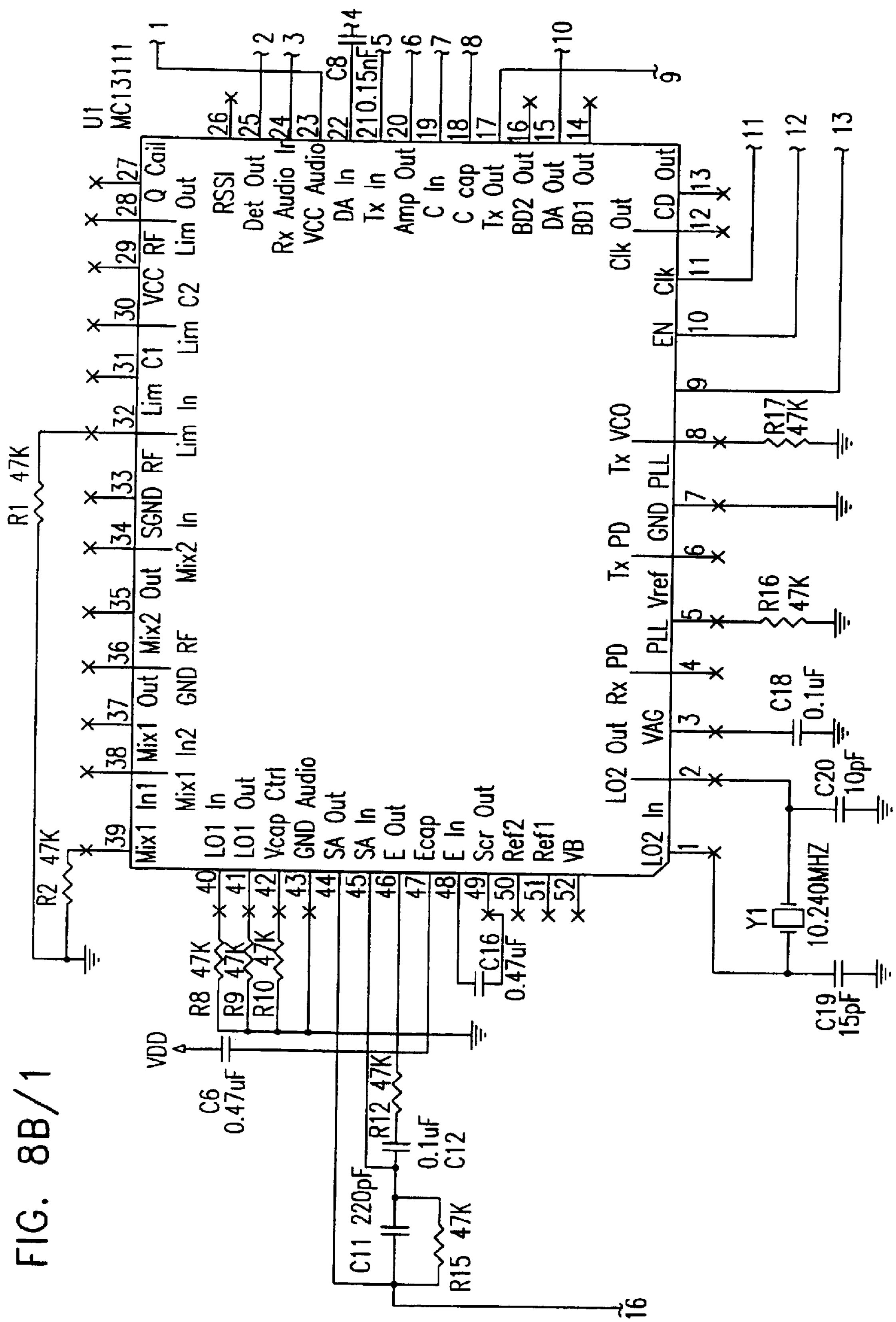

FIG. 8B/2
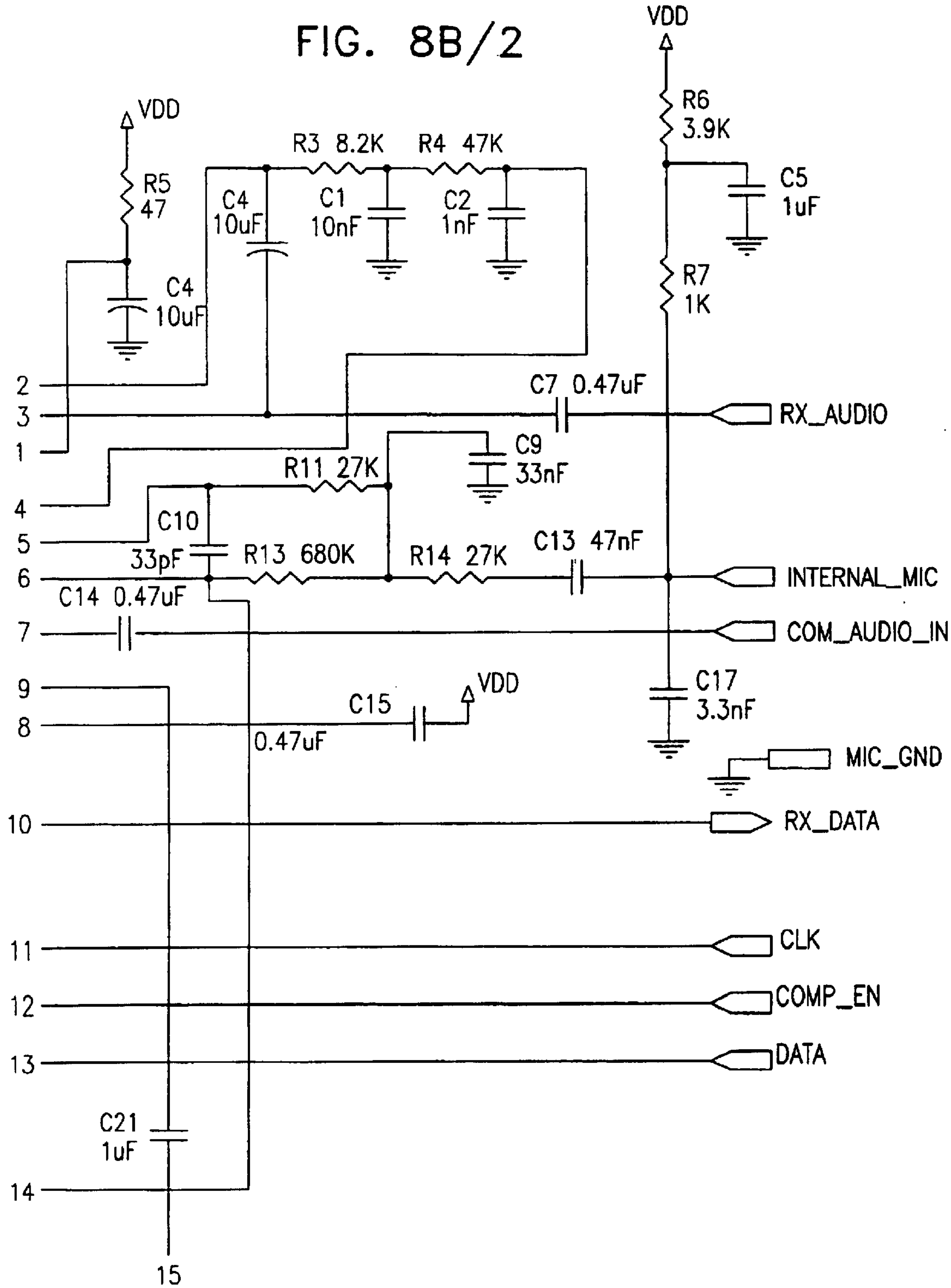

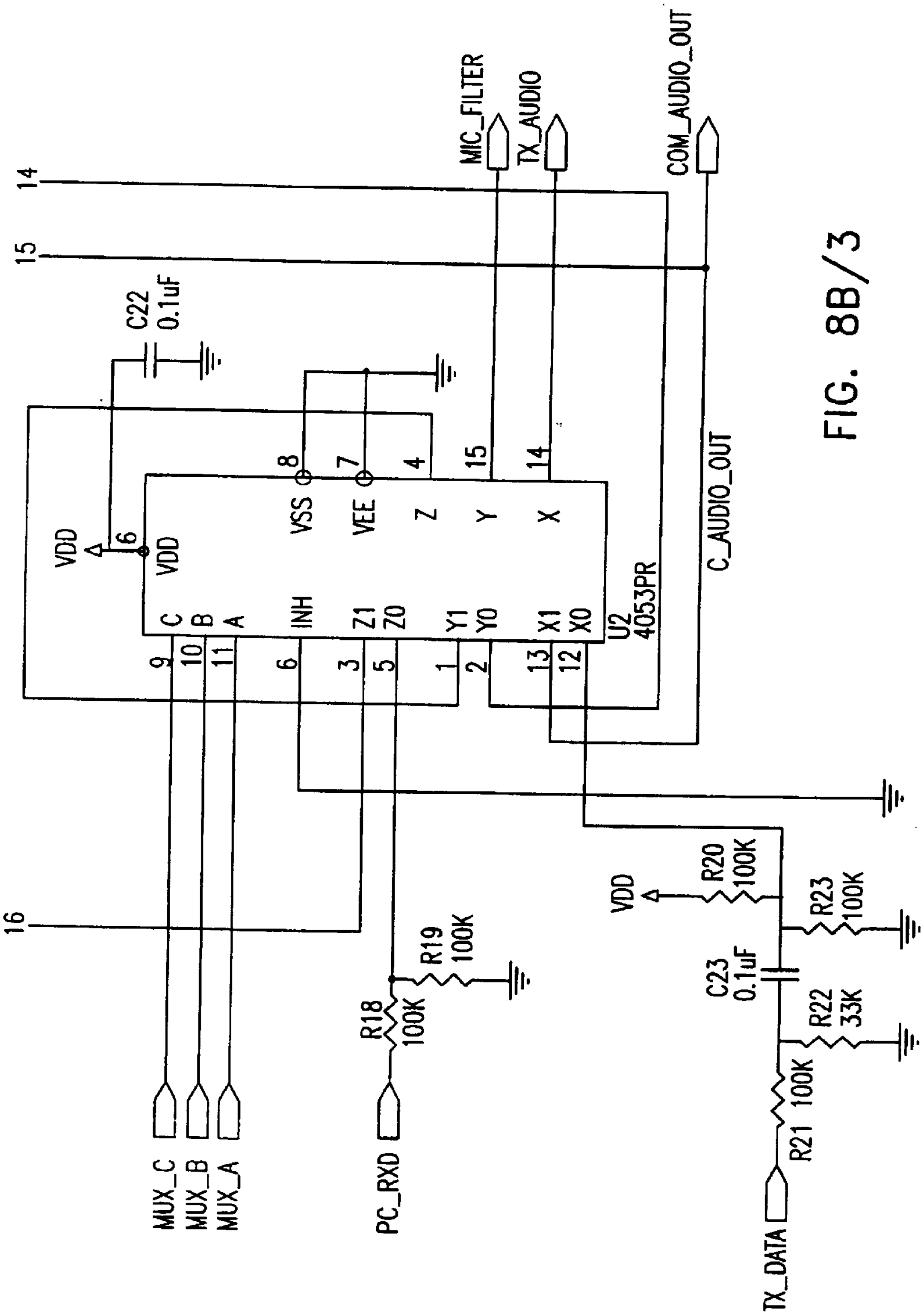
FIG. 8B/3

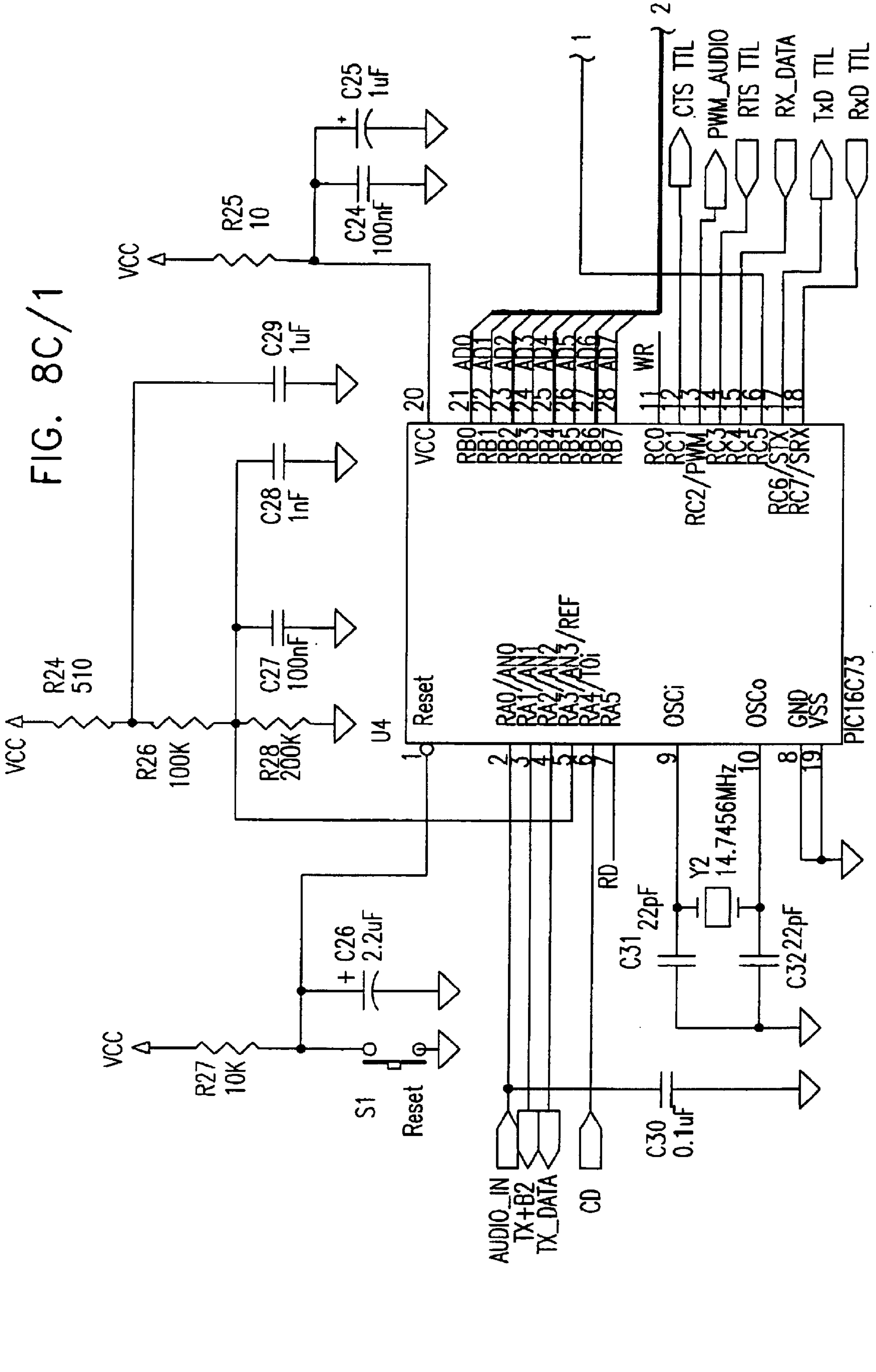
FIG. 8C/1

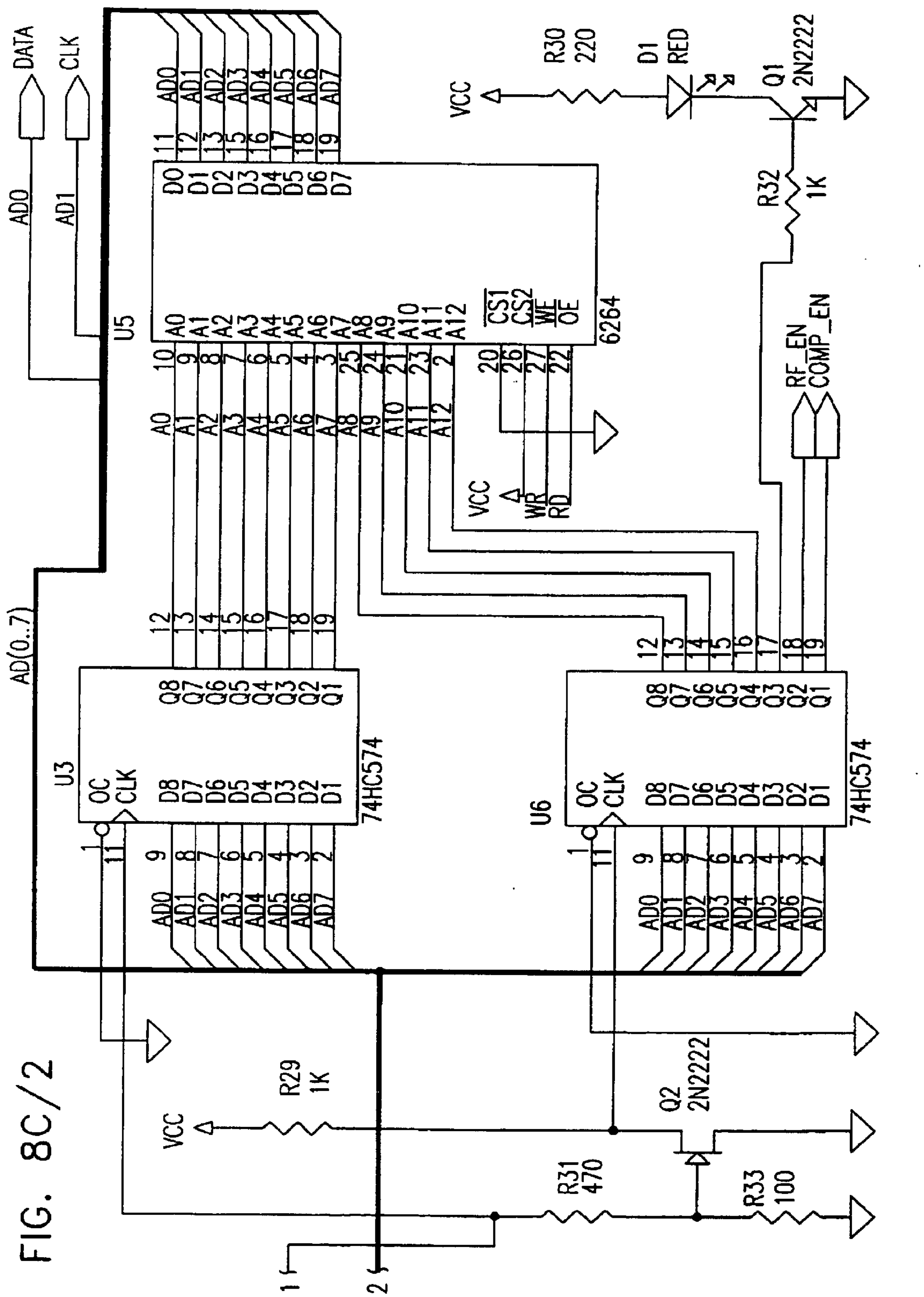
FIG. 8C/2

FIG. 8D/1
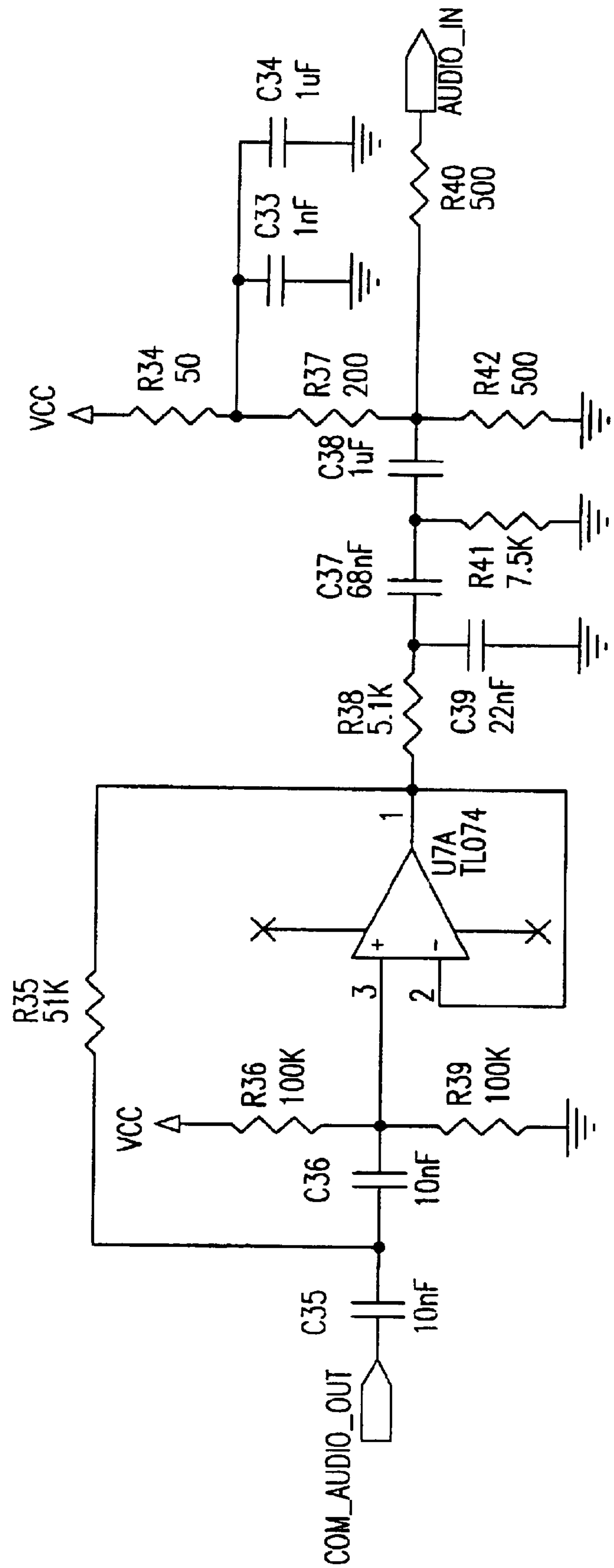

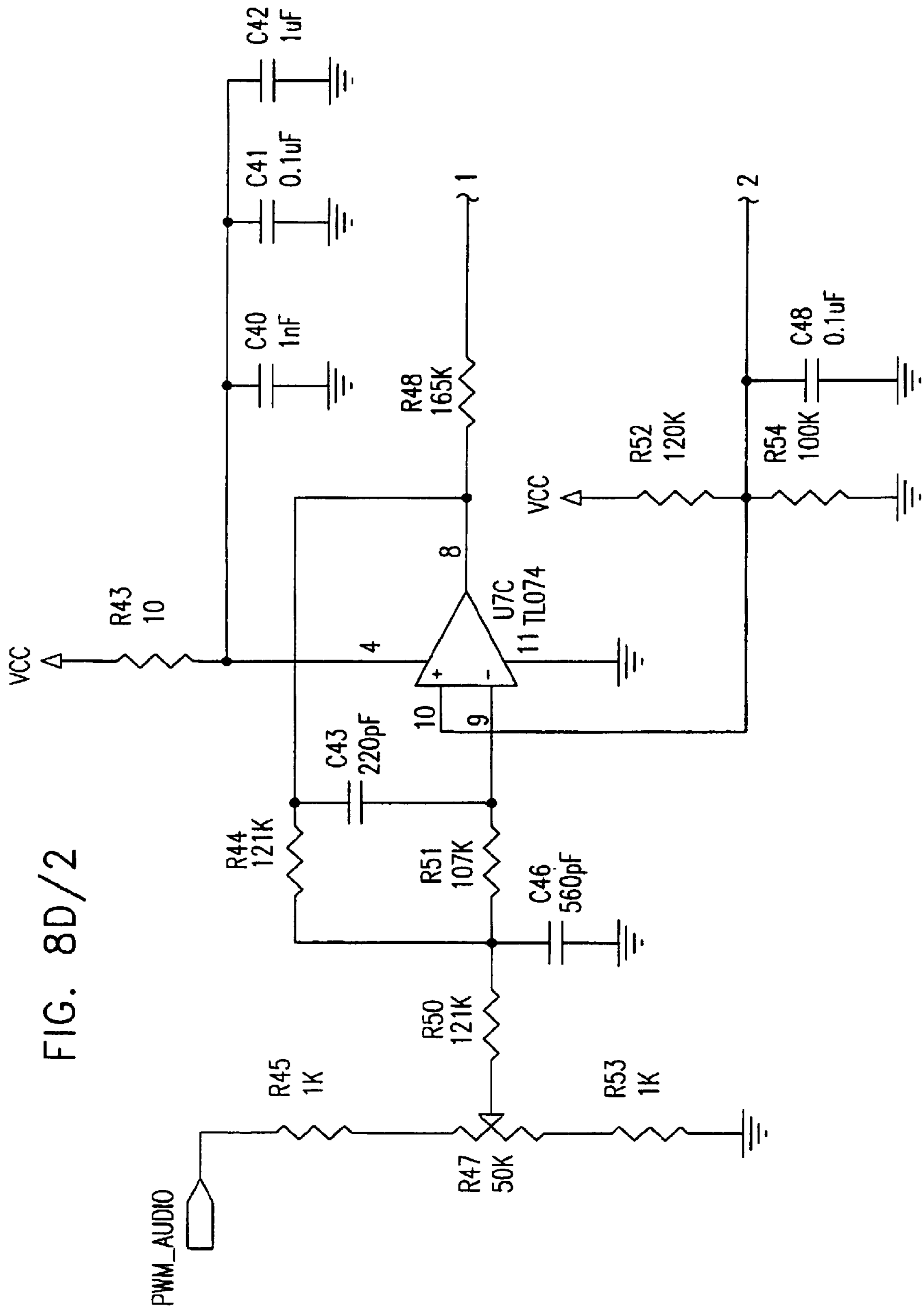
FIG. 8D/2

FIG. 8D/3
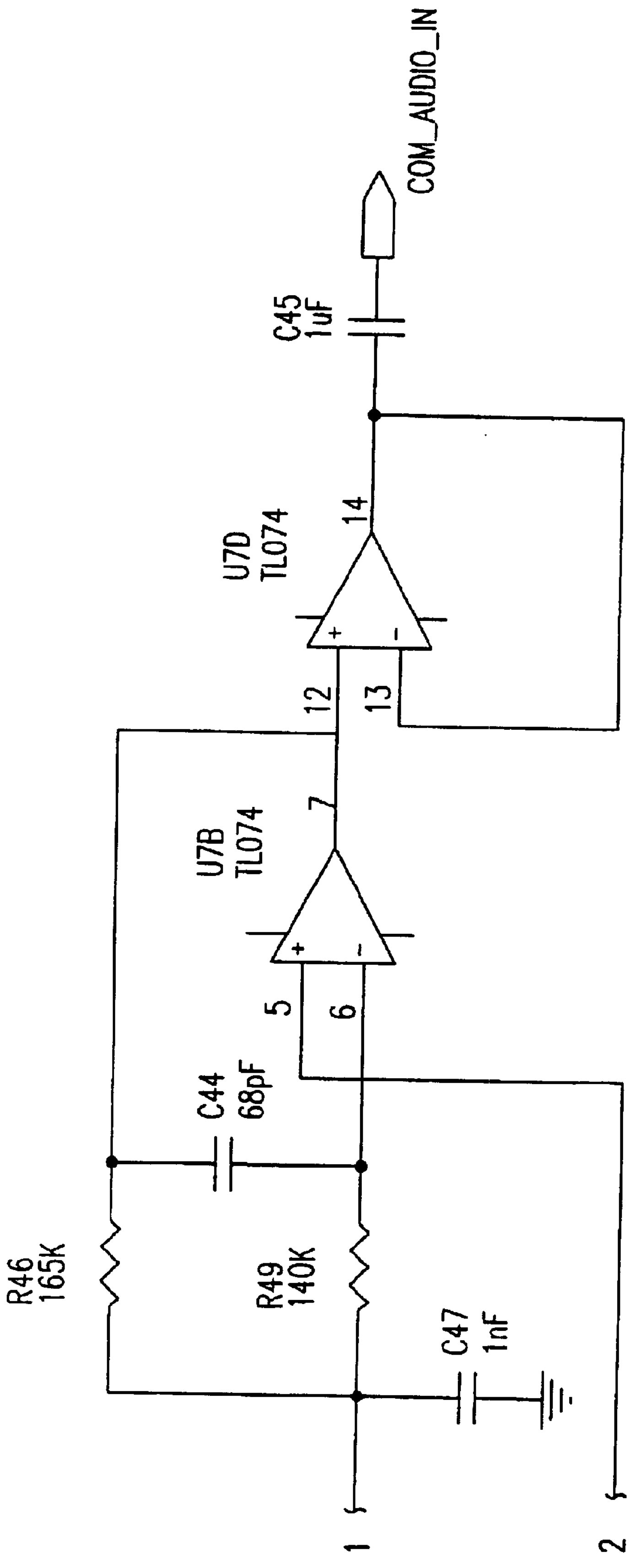

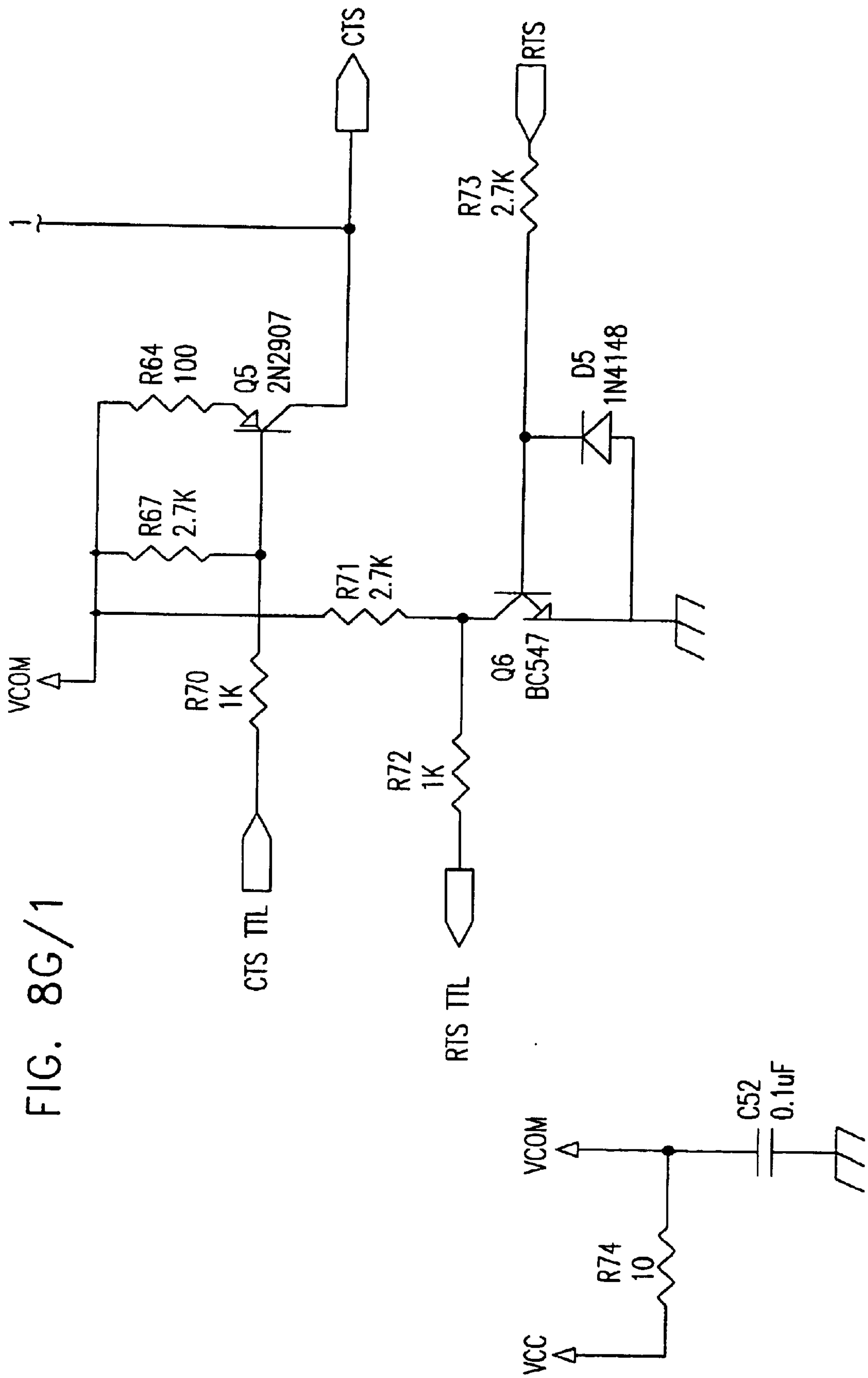
FIG. 8G/1

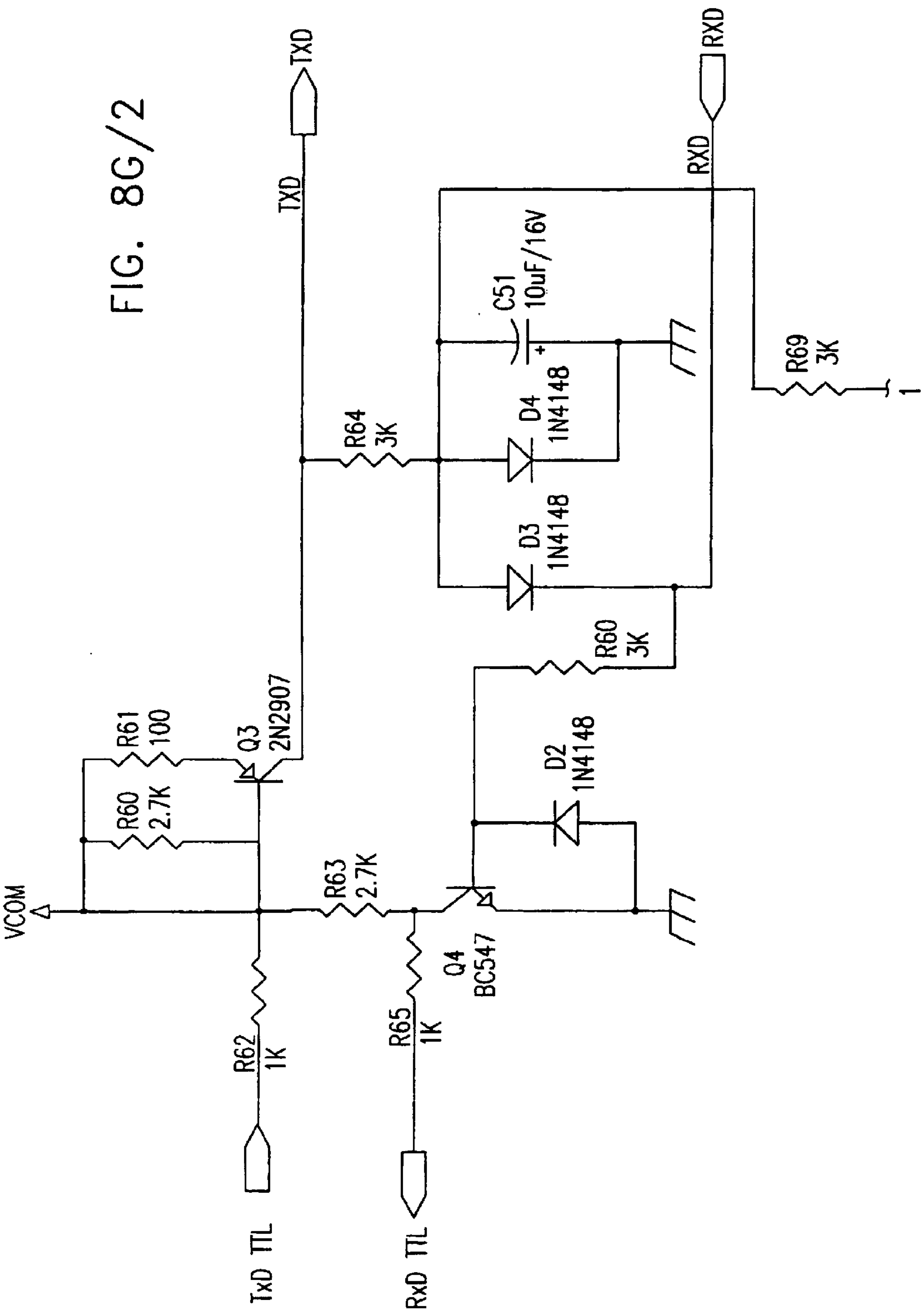
FIG. 8G/2

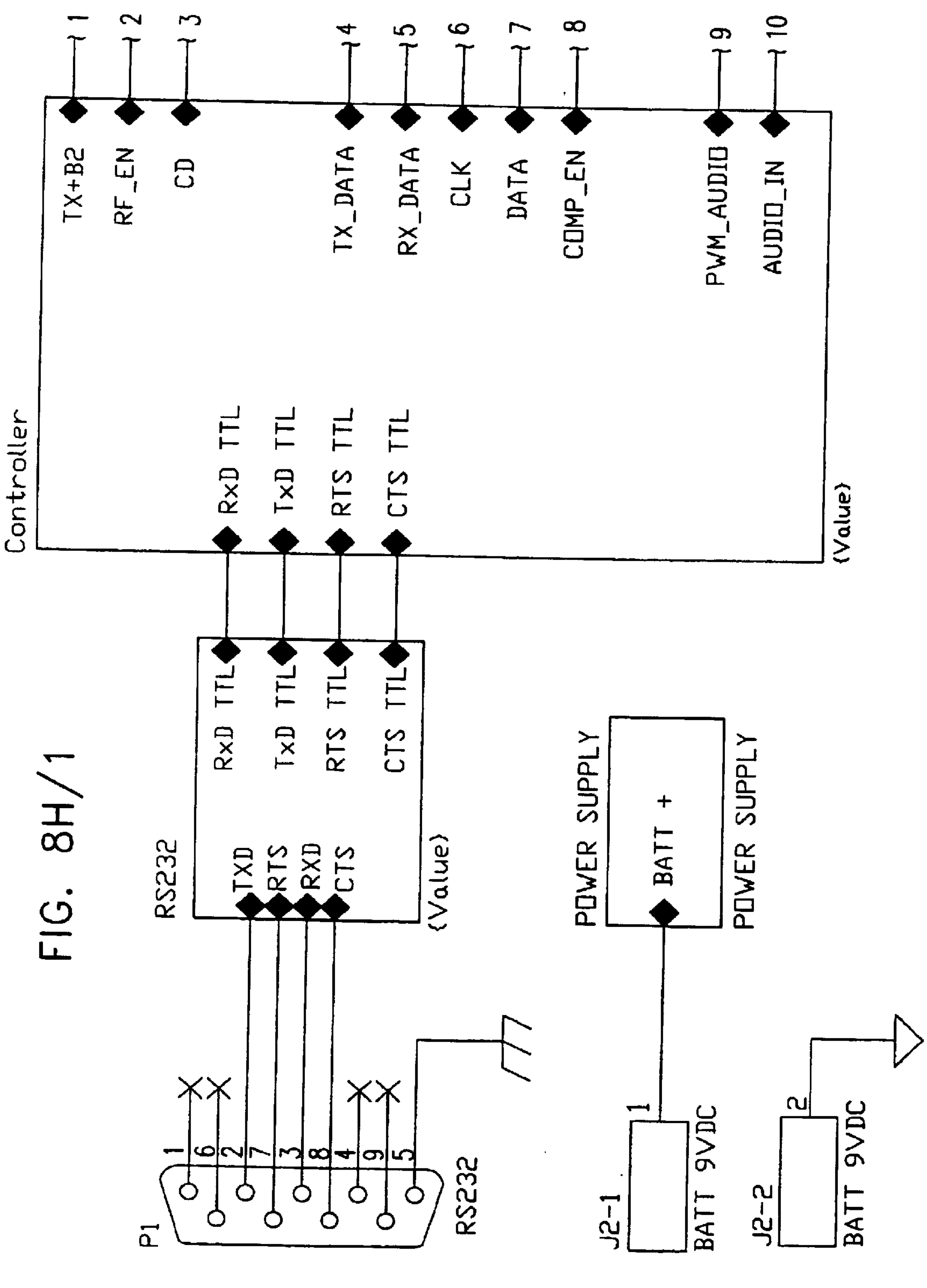
FIG. 8H/1

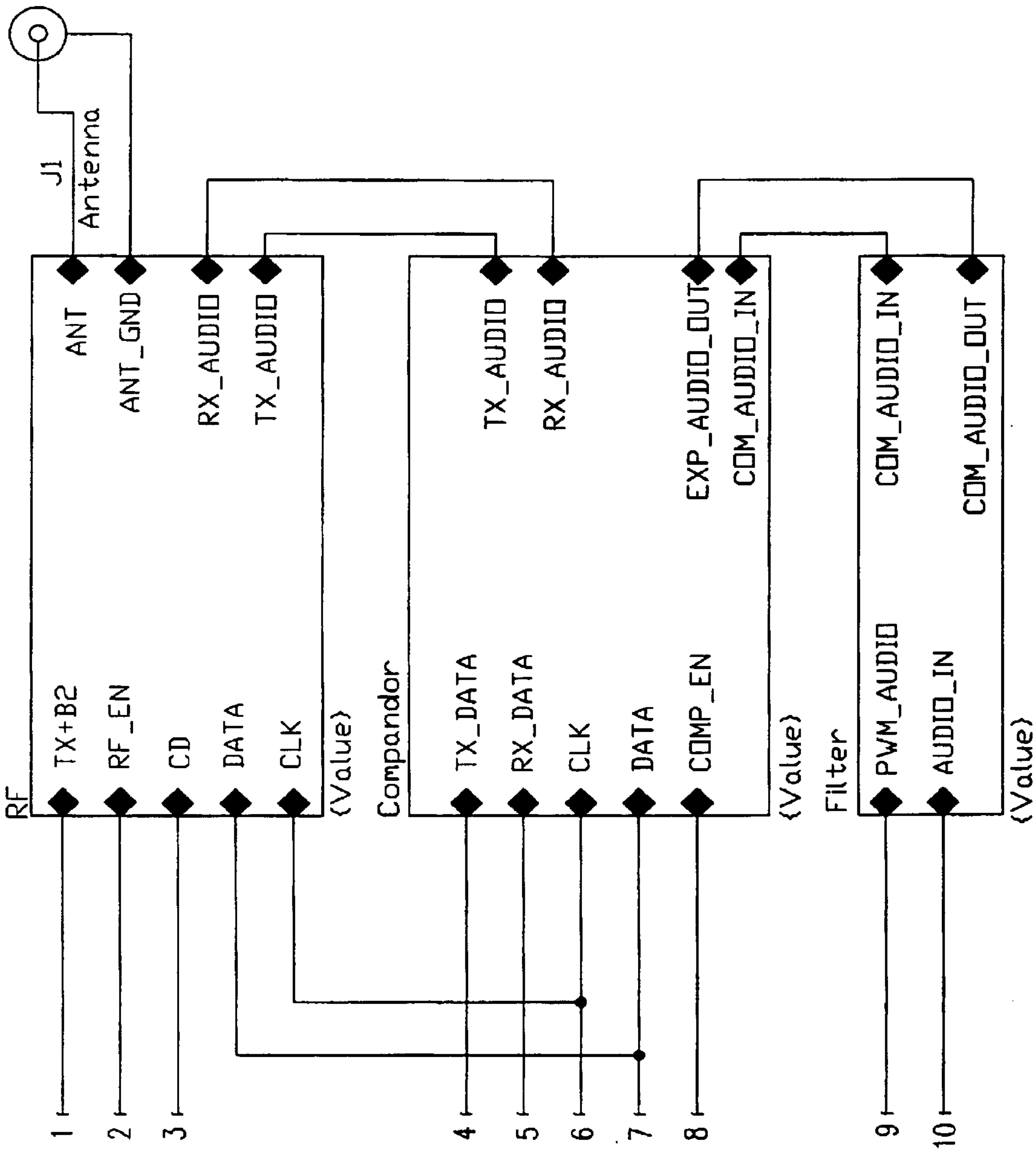
FIG. 8H/2

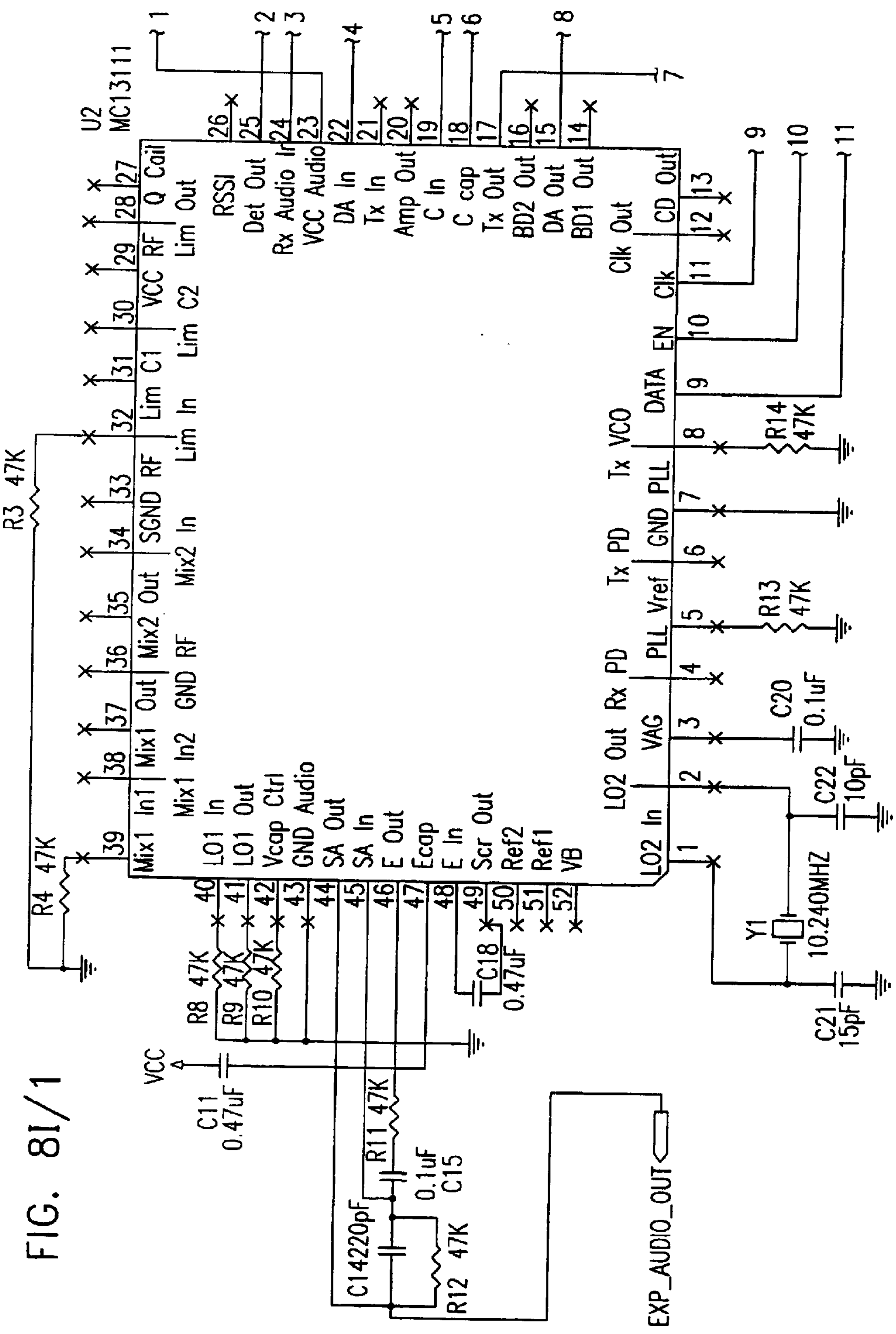
FIG. 8I/1

FIG. 8I/2
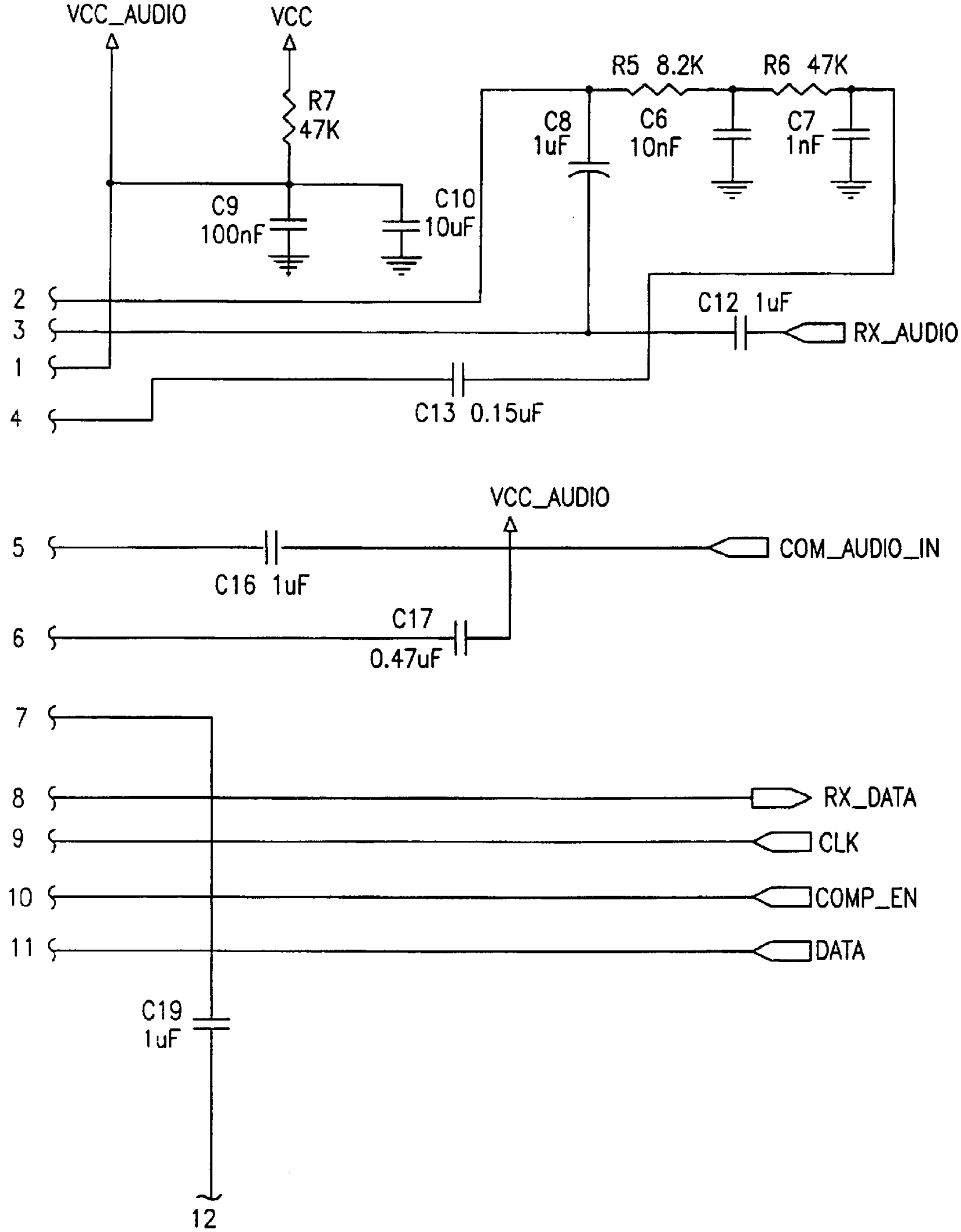

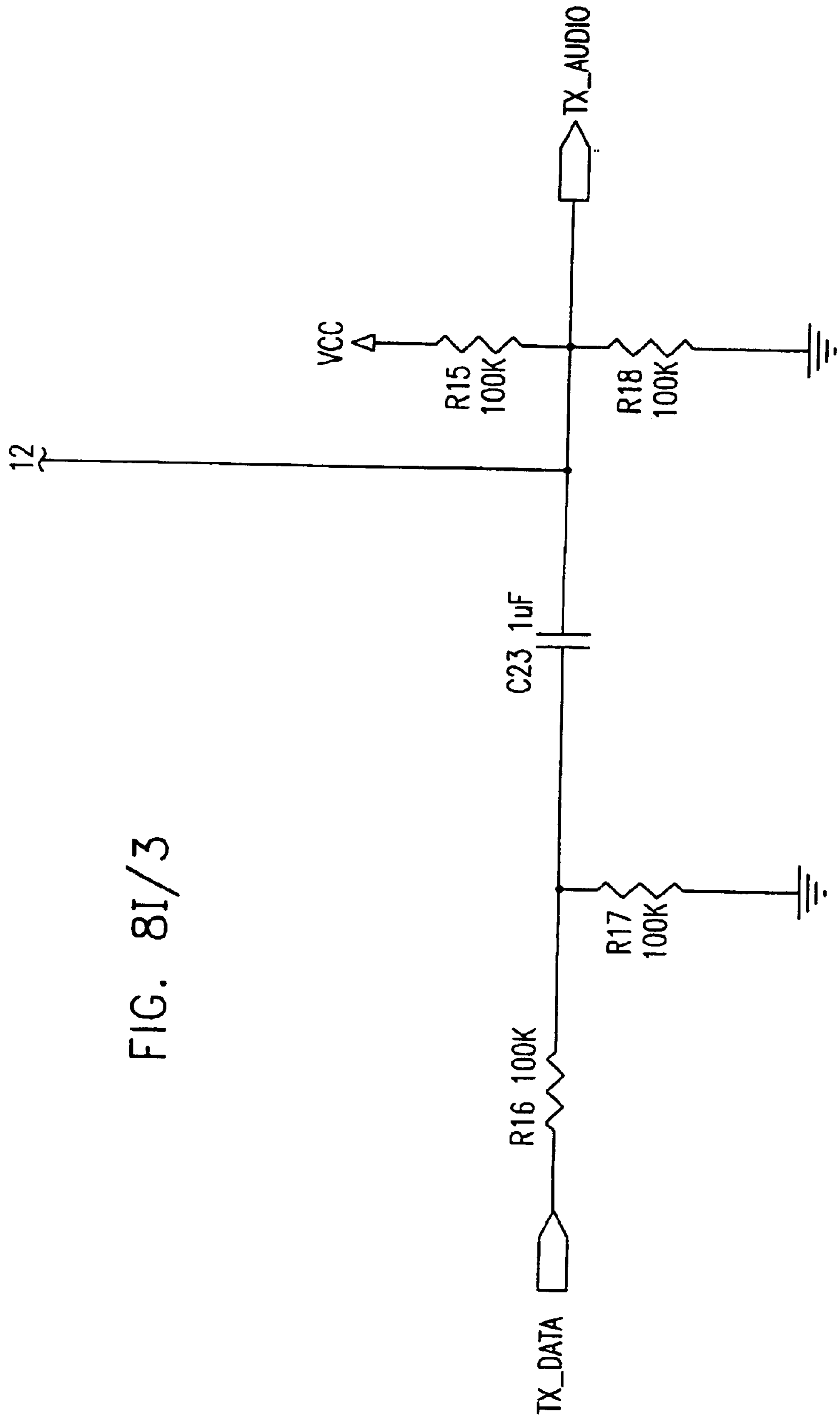
FIG. 8I/3

FIG. 8J/1
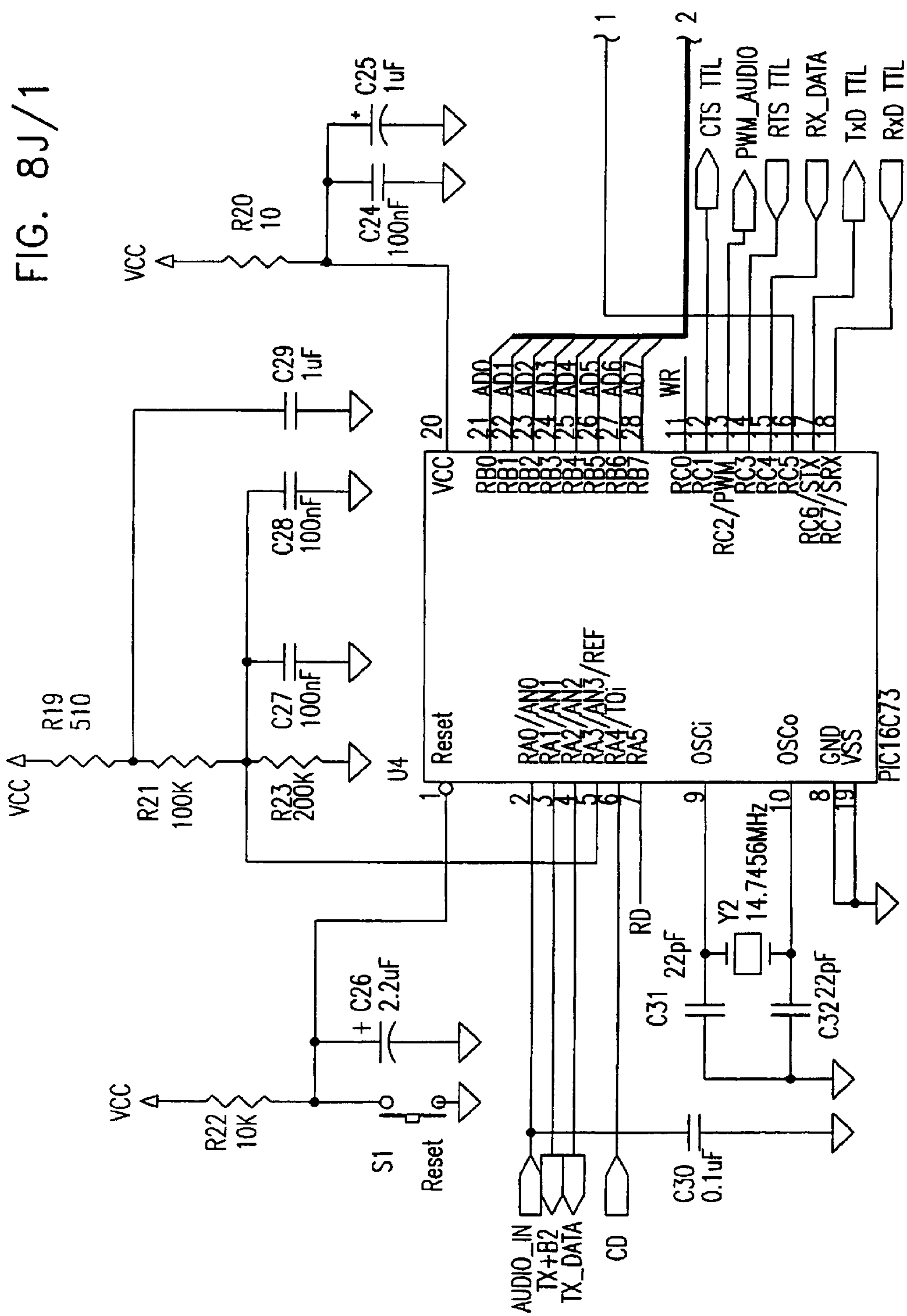

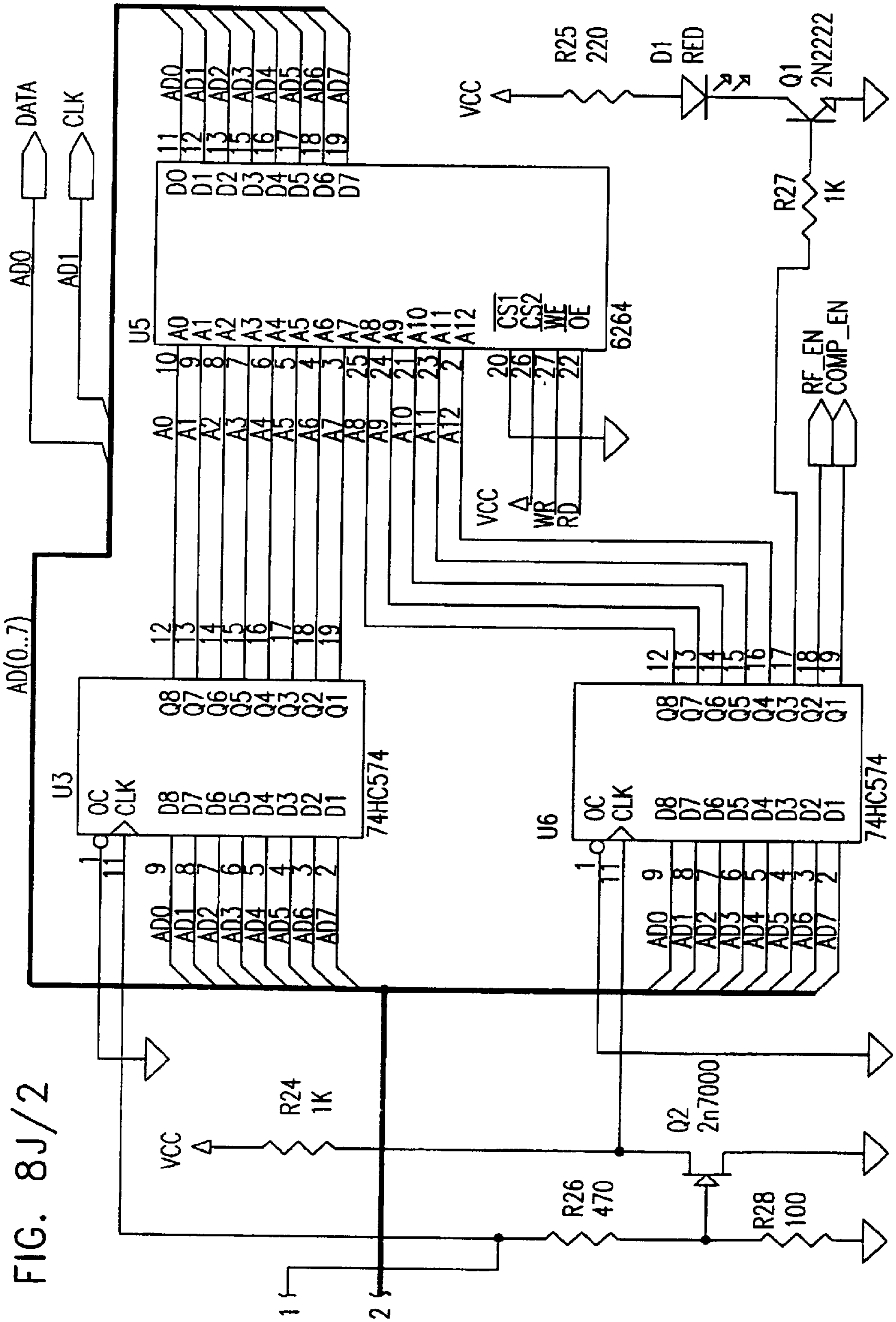
FIG. 8J/2

FIG. 8K/1
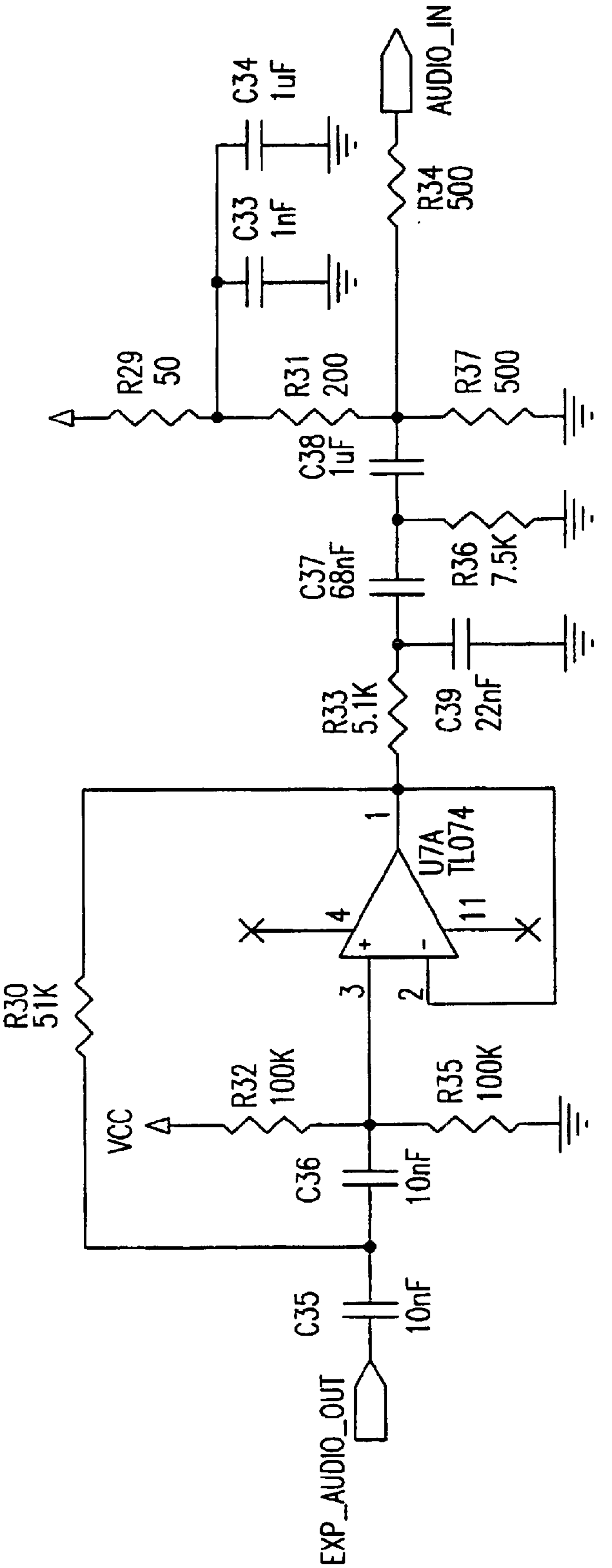

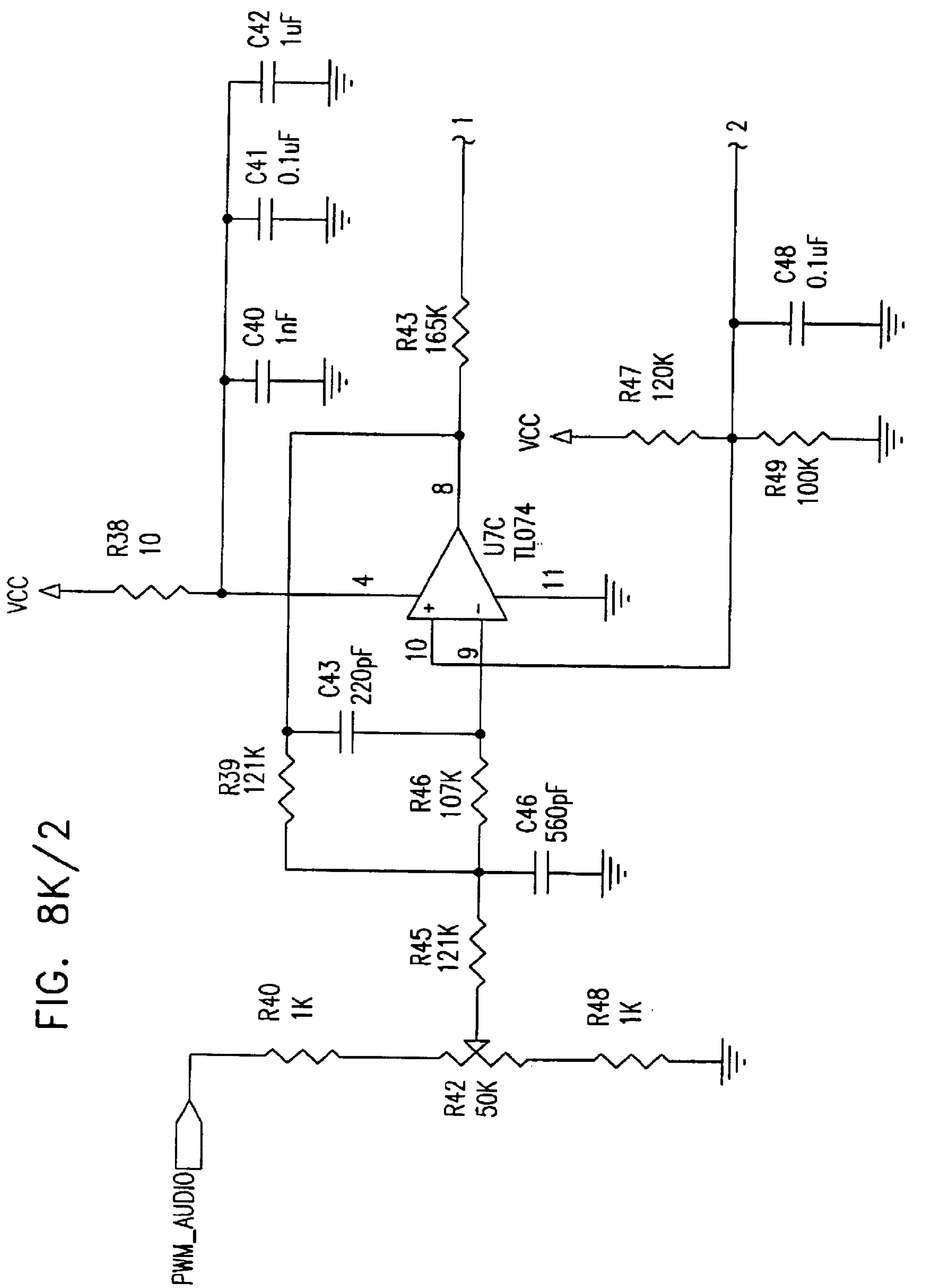
FIG. 8K/2

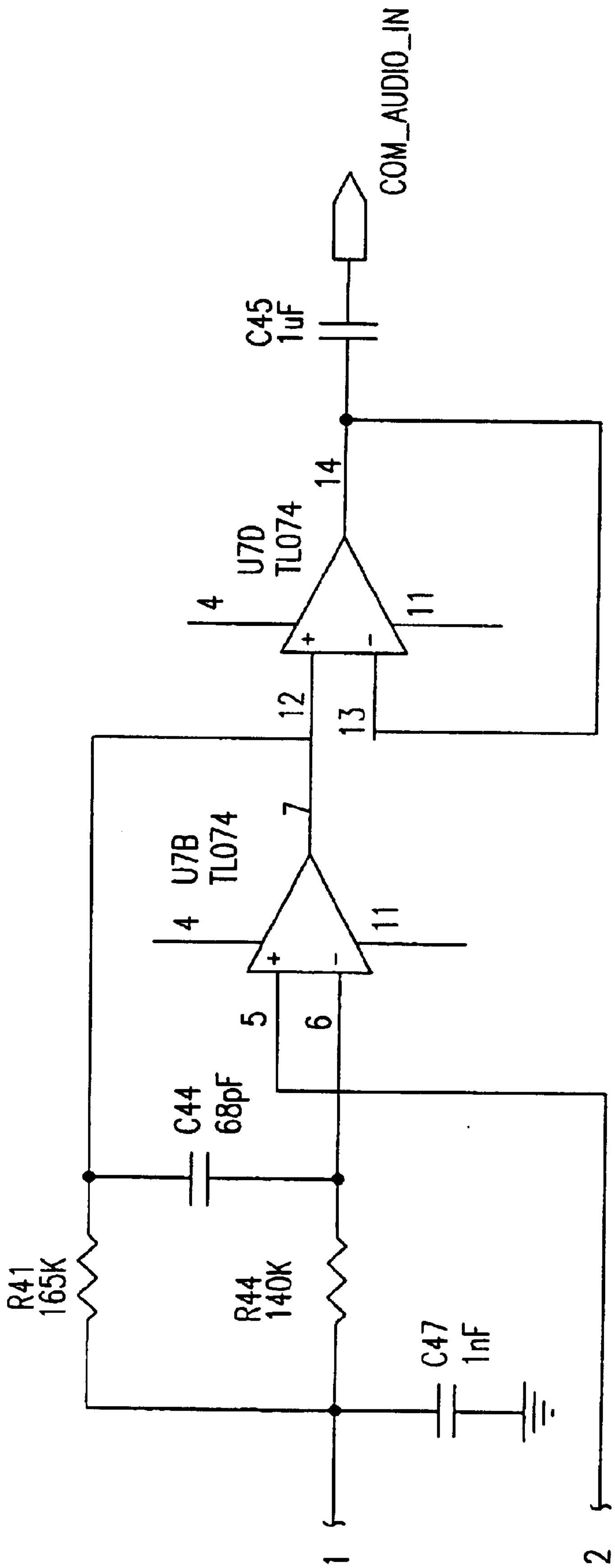
FIG. 8K/3

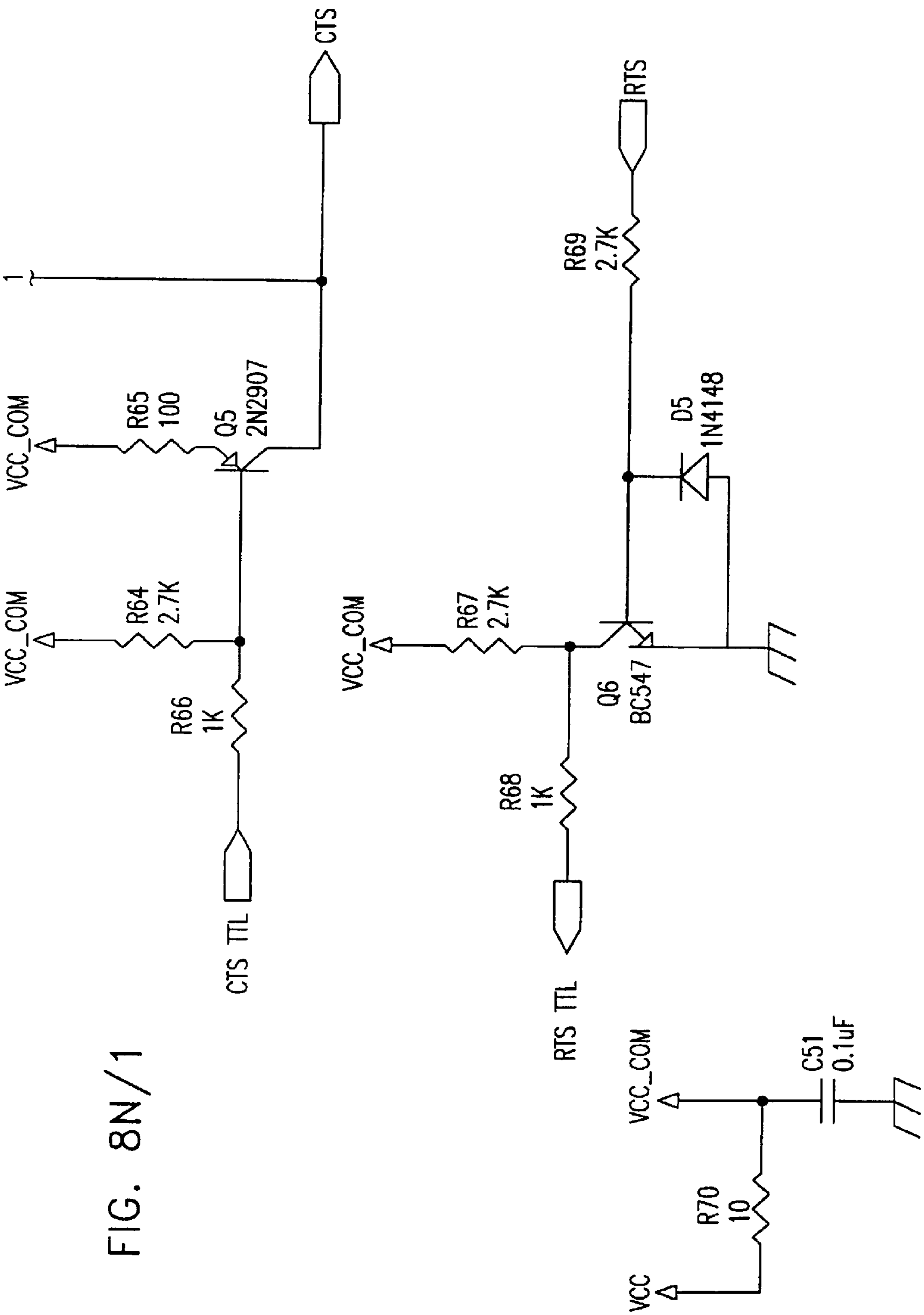
FIG. 8N/1

FIG. 8N/2
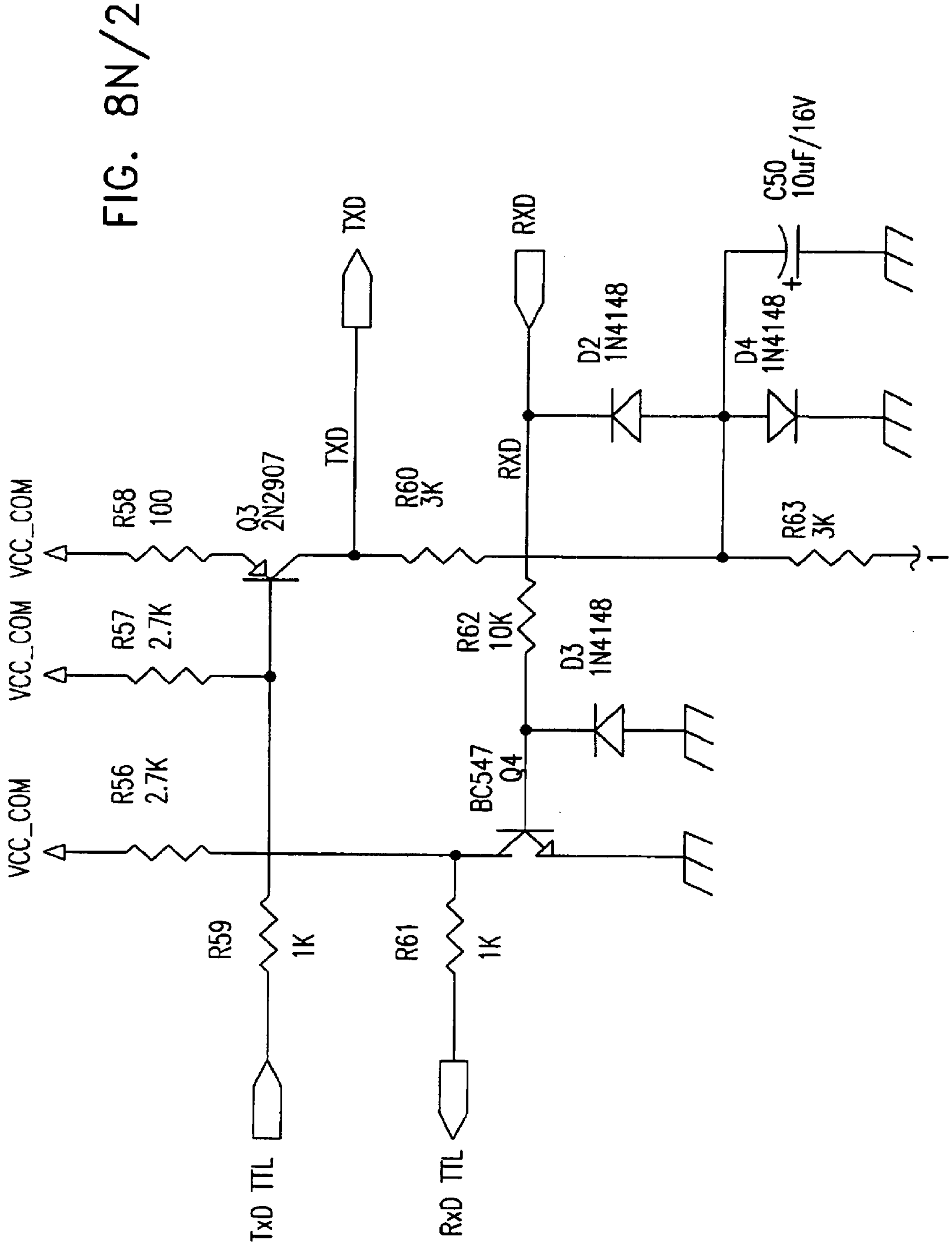

FIG. 9A/1
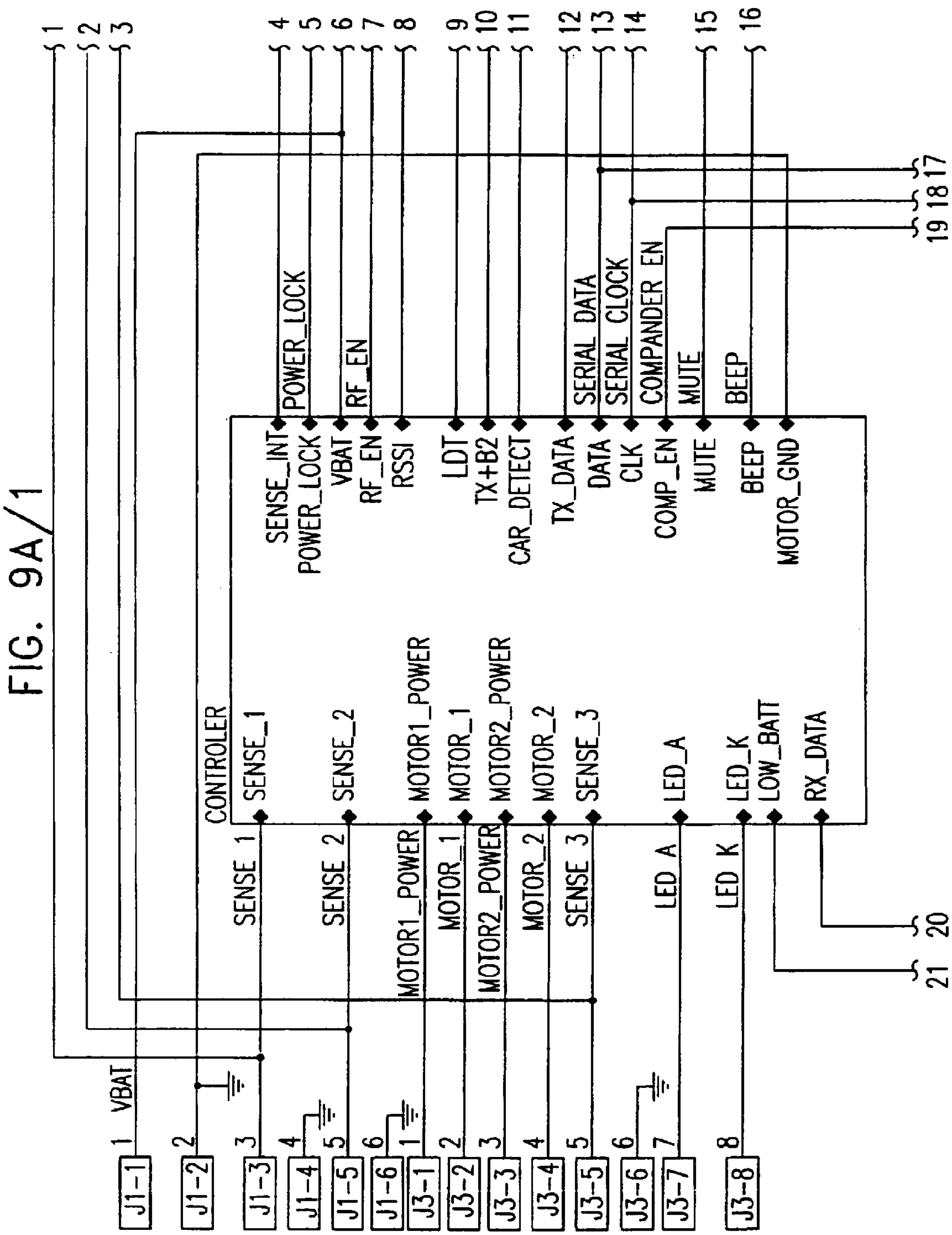

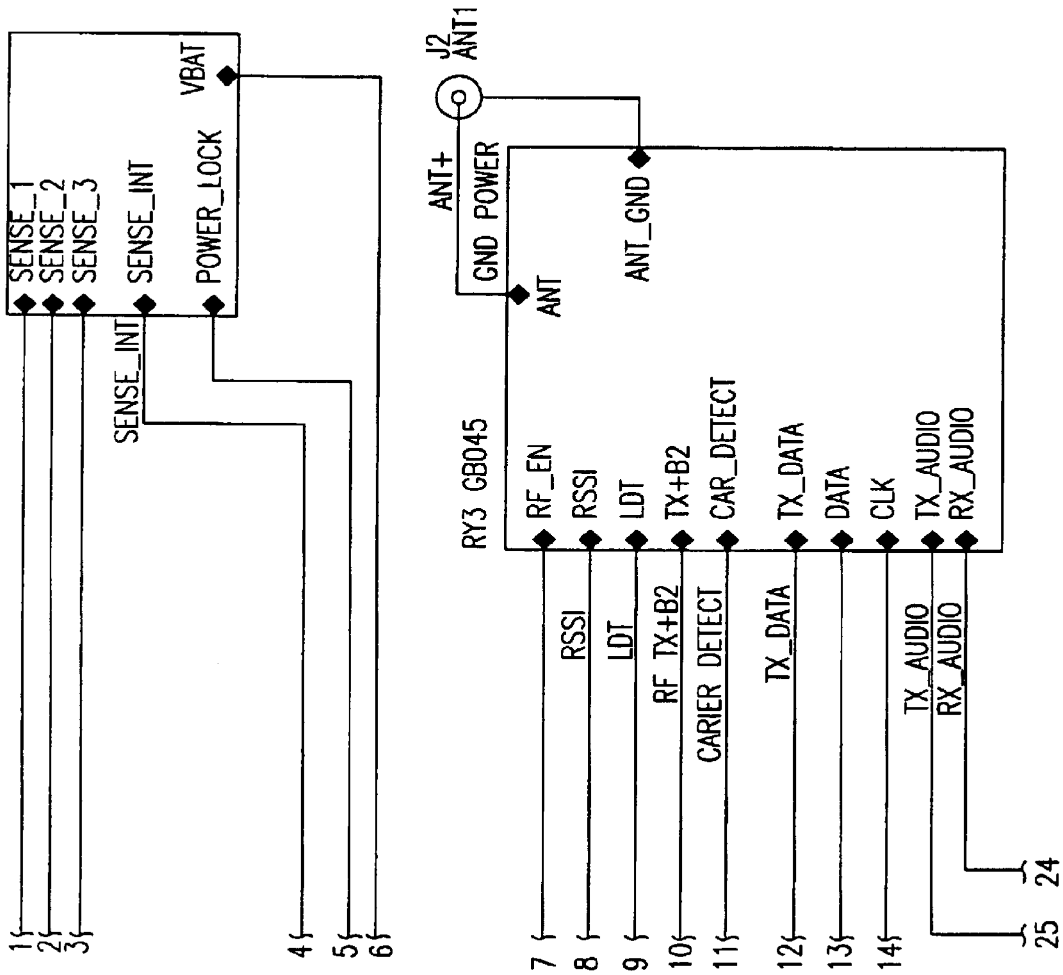
FIG. 9A/2

FIG. 9A/3
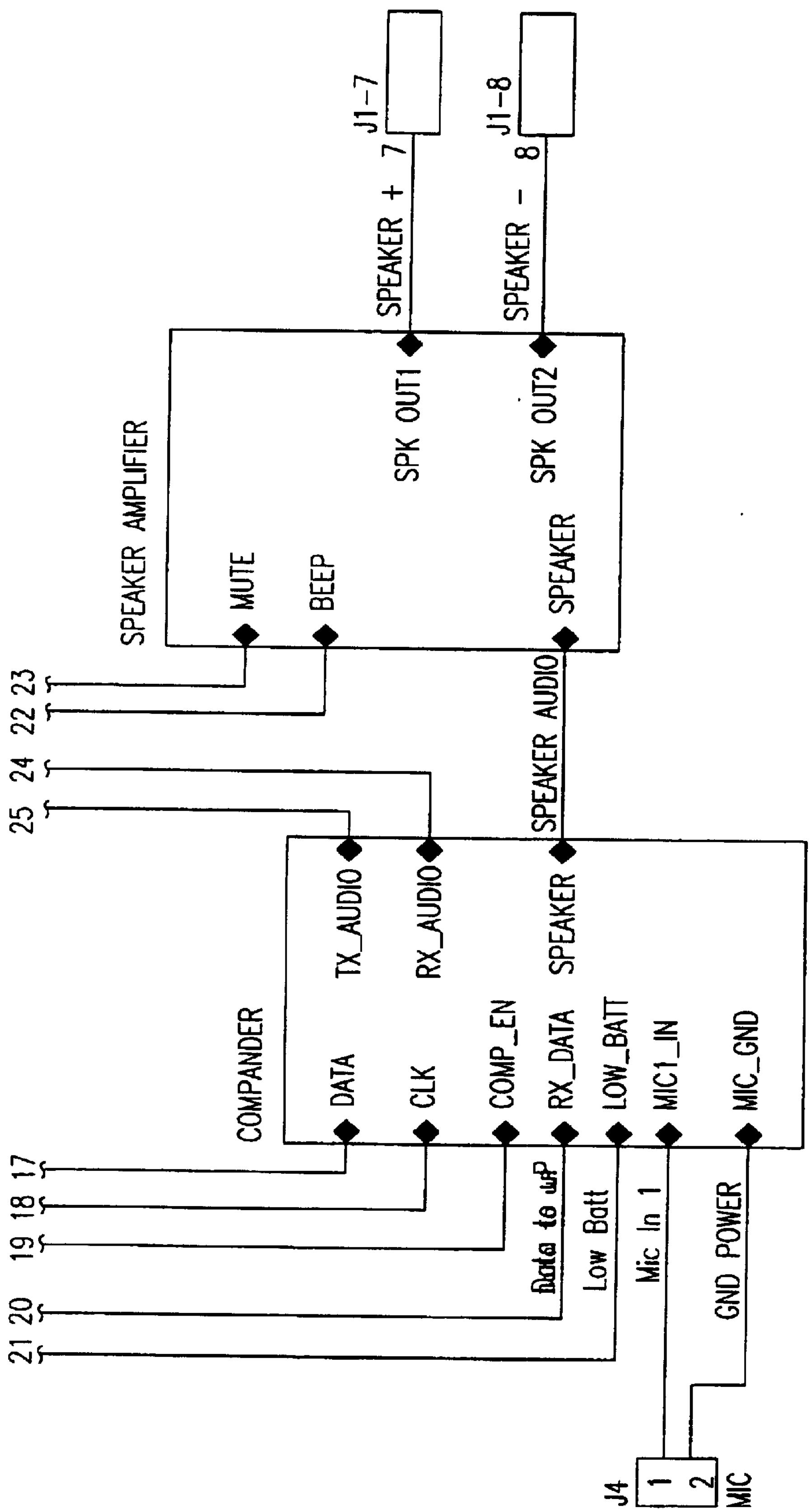

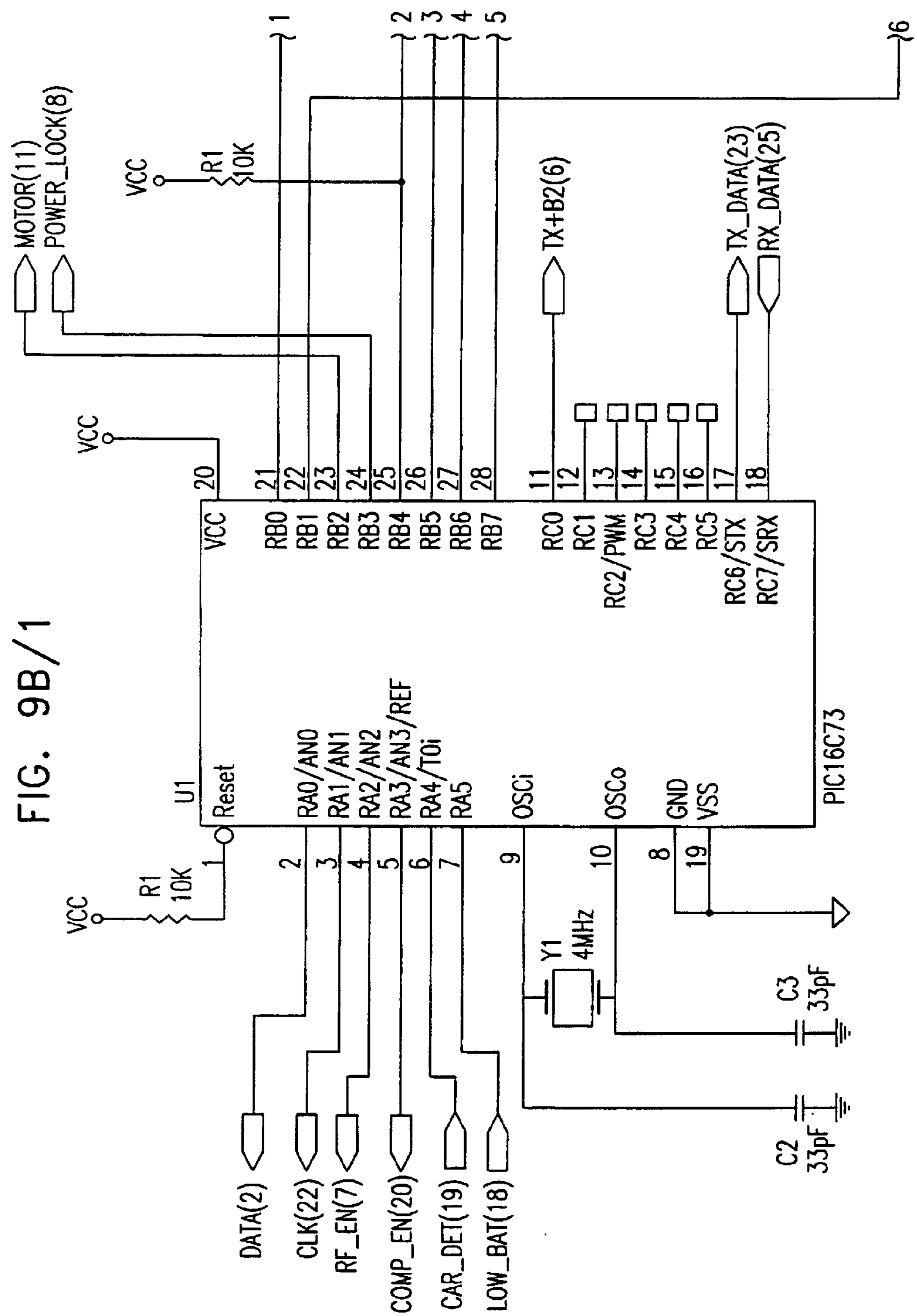
FIG. 9B/1

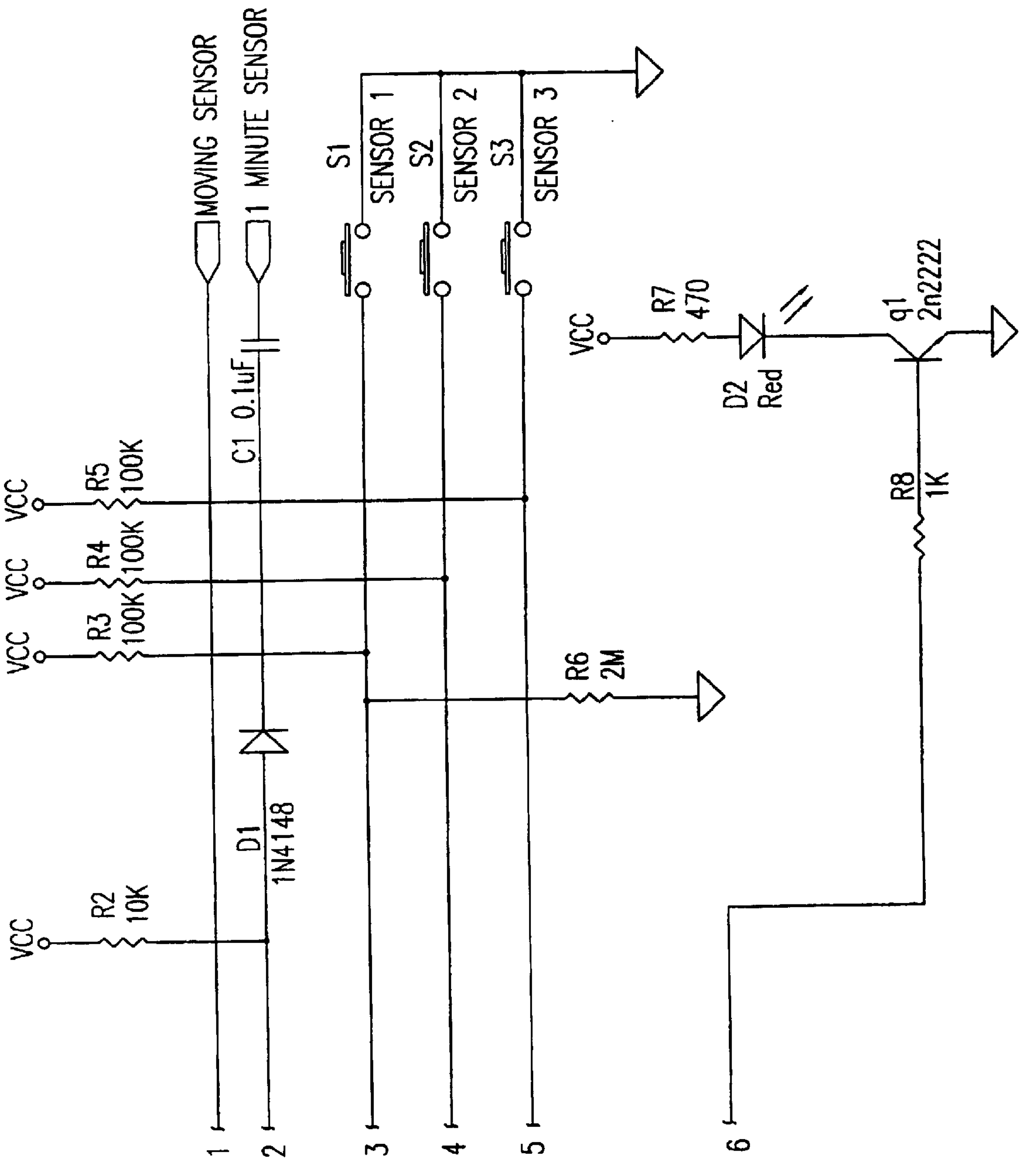
FIG. 9B/2

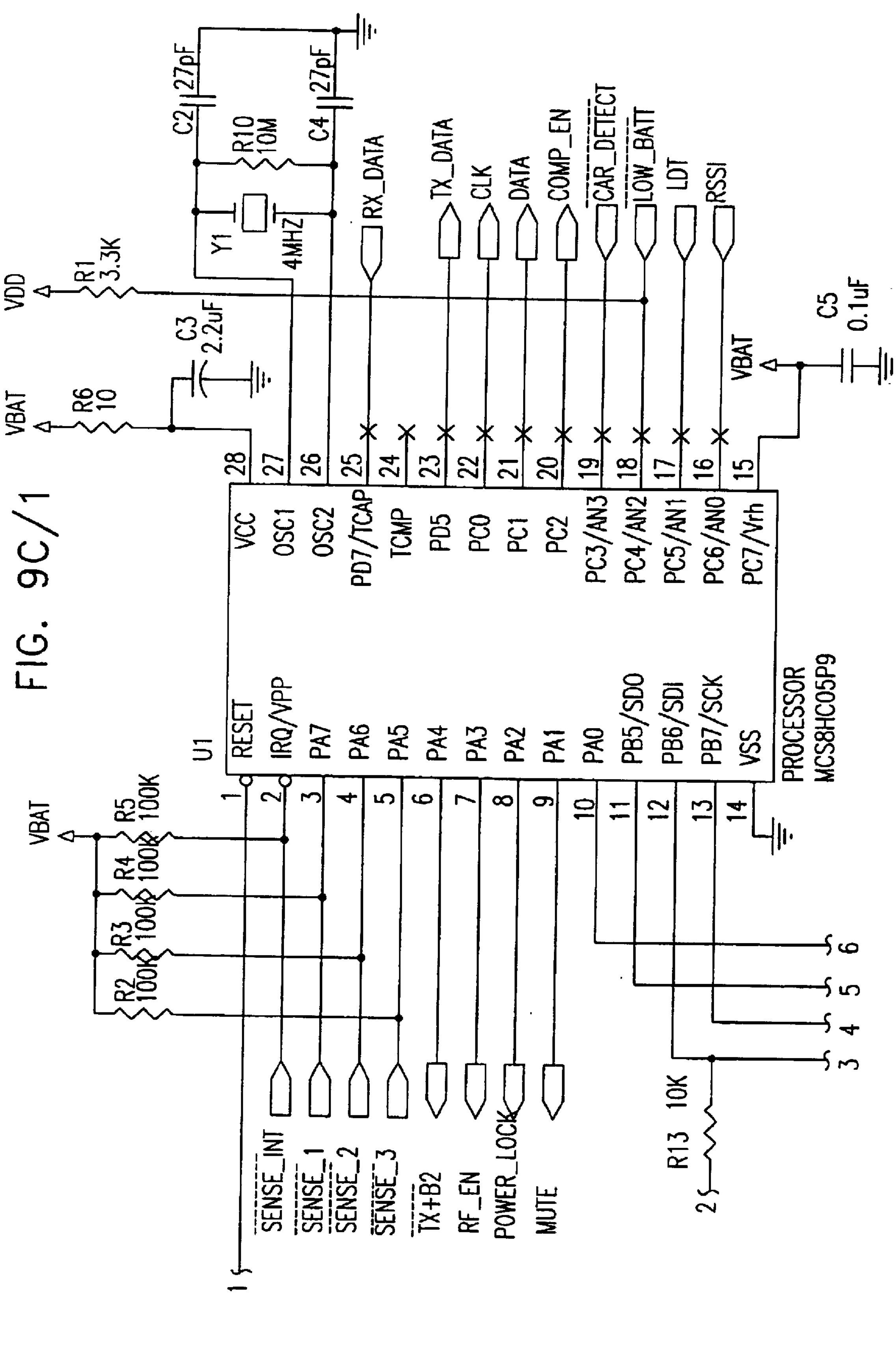
FIG. 9C/1

FIG. 9C/2
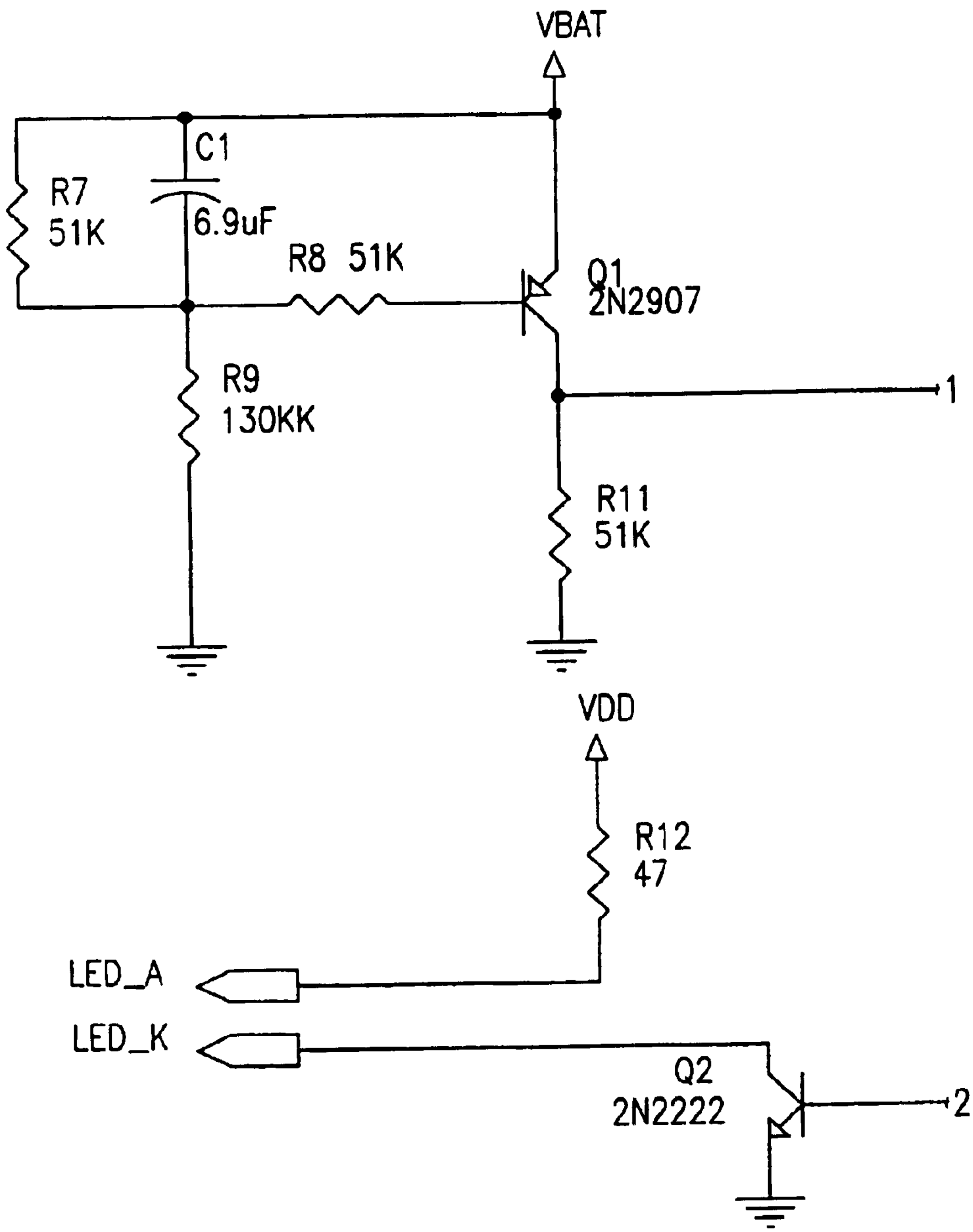

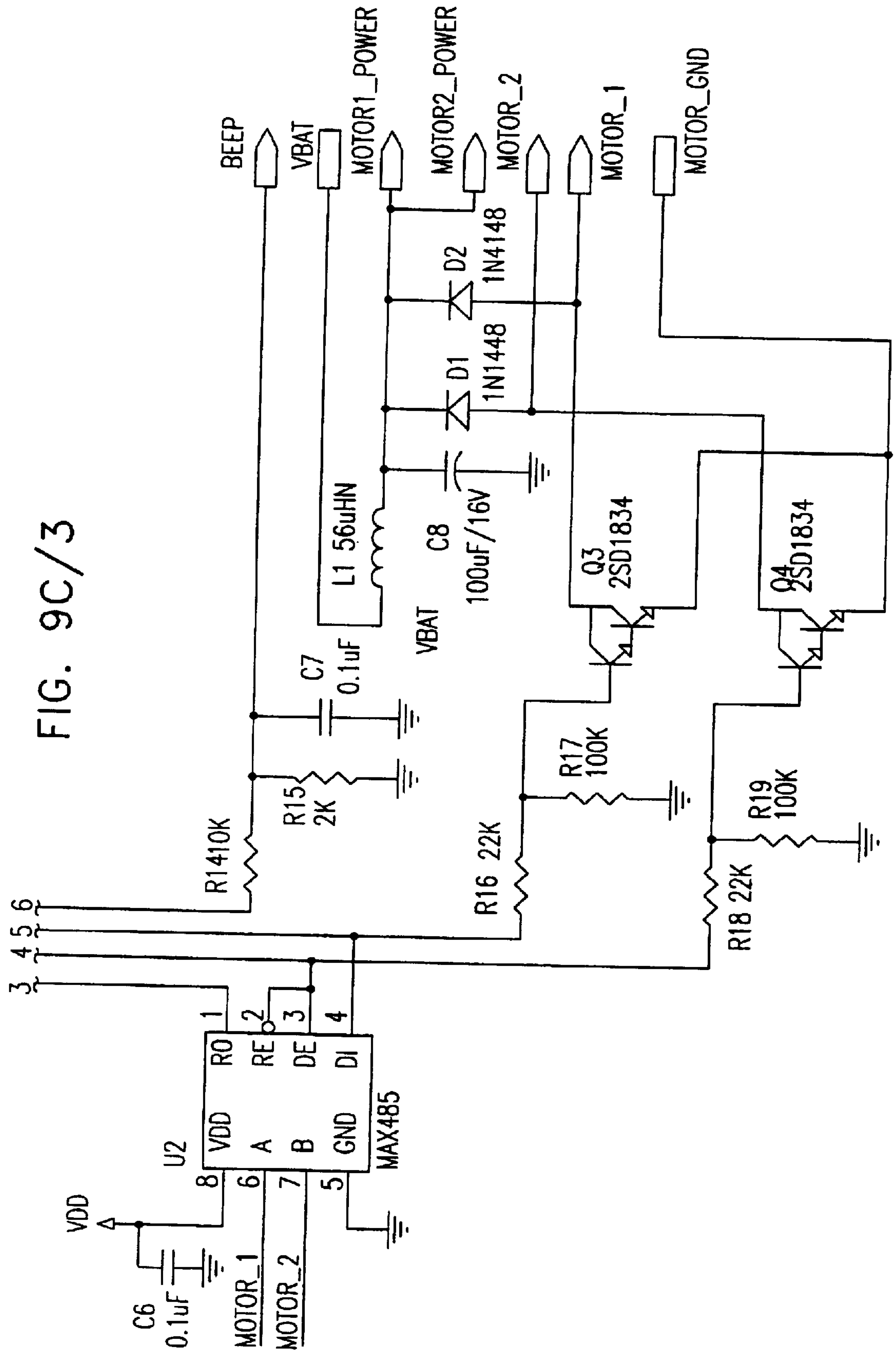
FIG. 9C/3

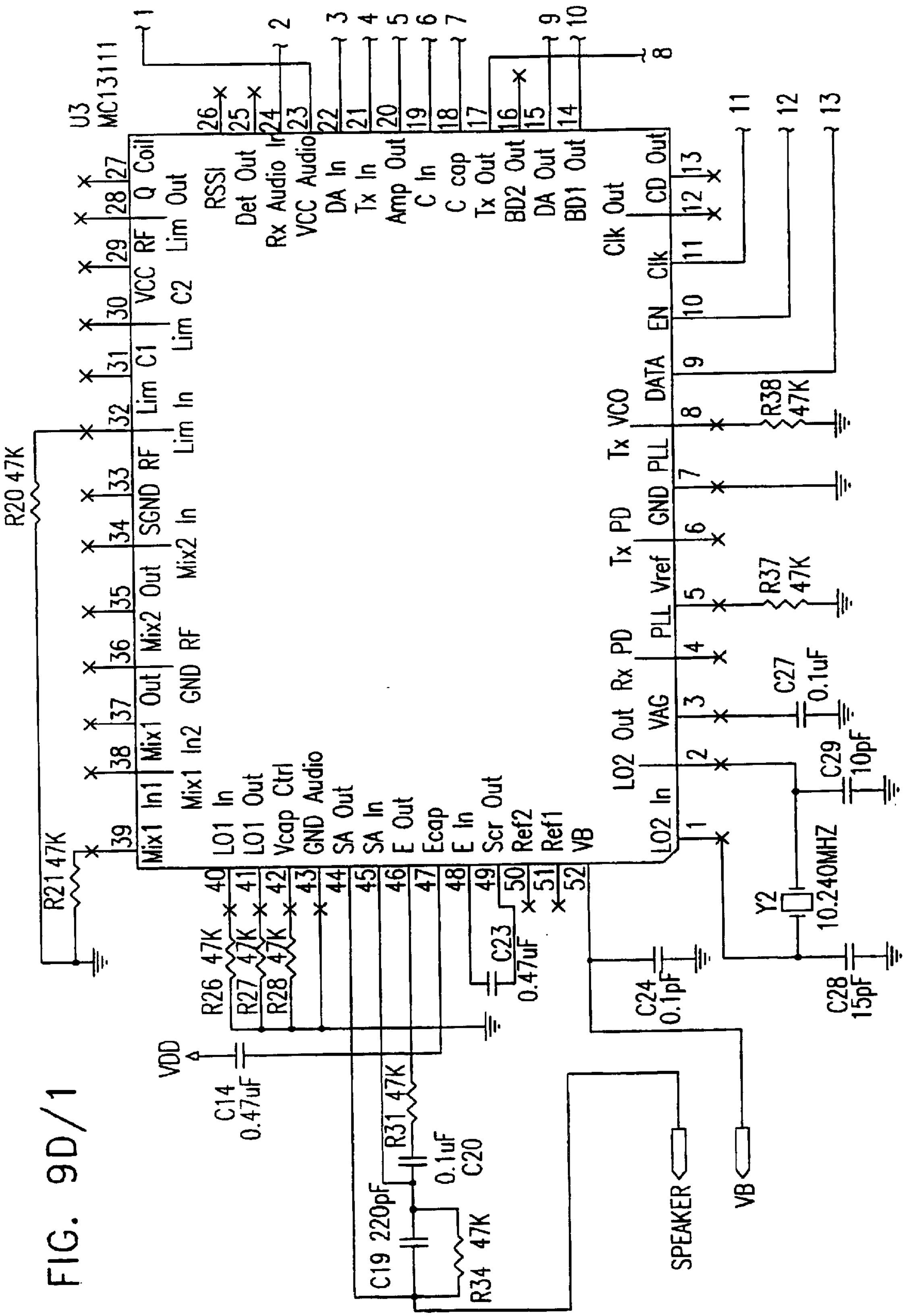
FIG. 9D/1

FIG. 9D/2
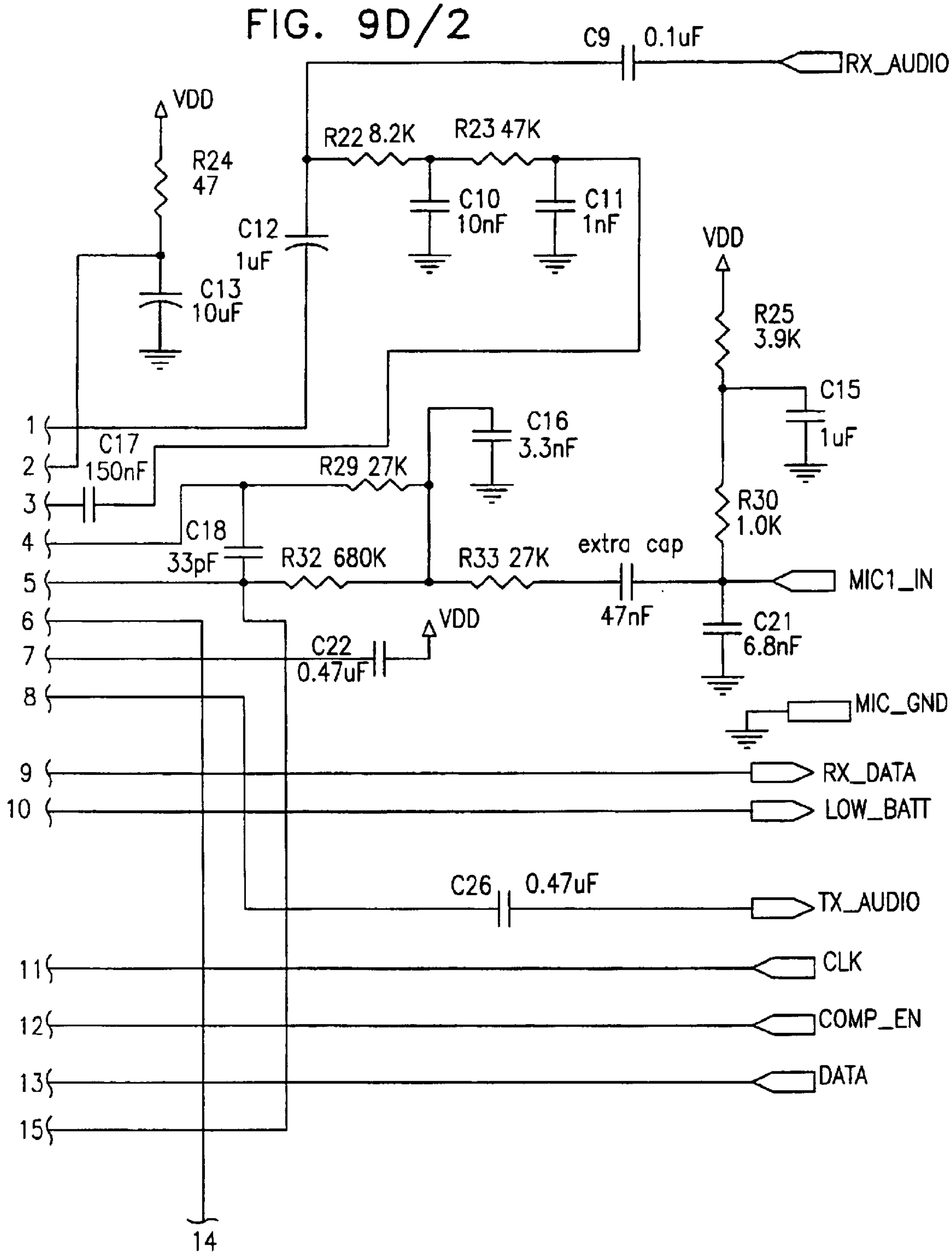

FIG. 9D/3
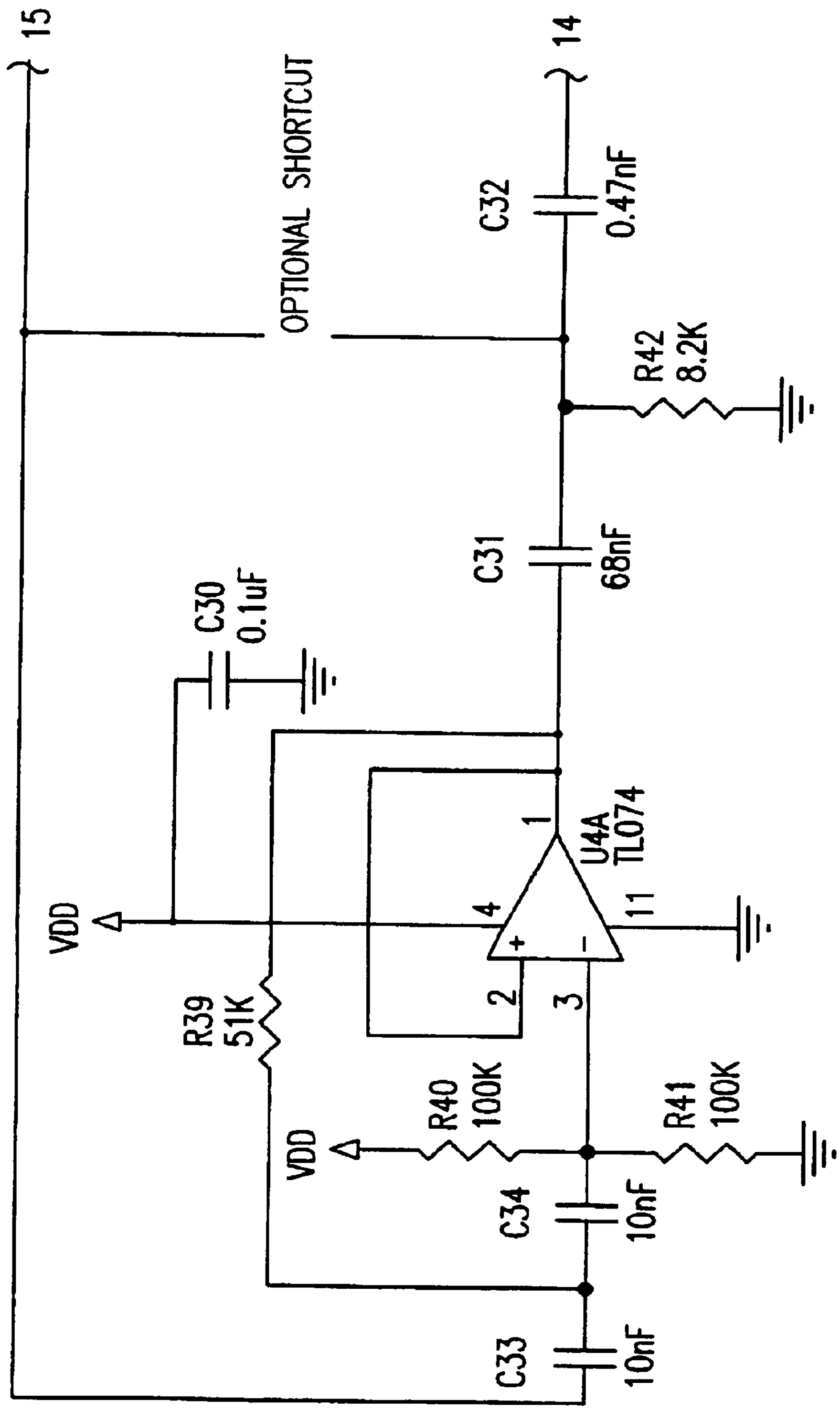

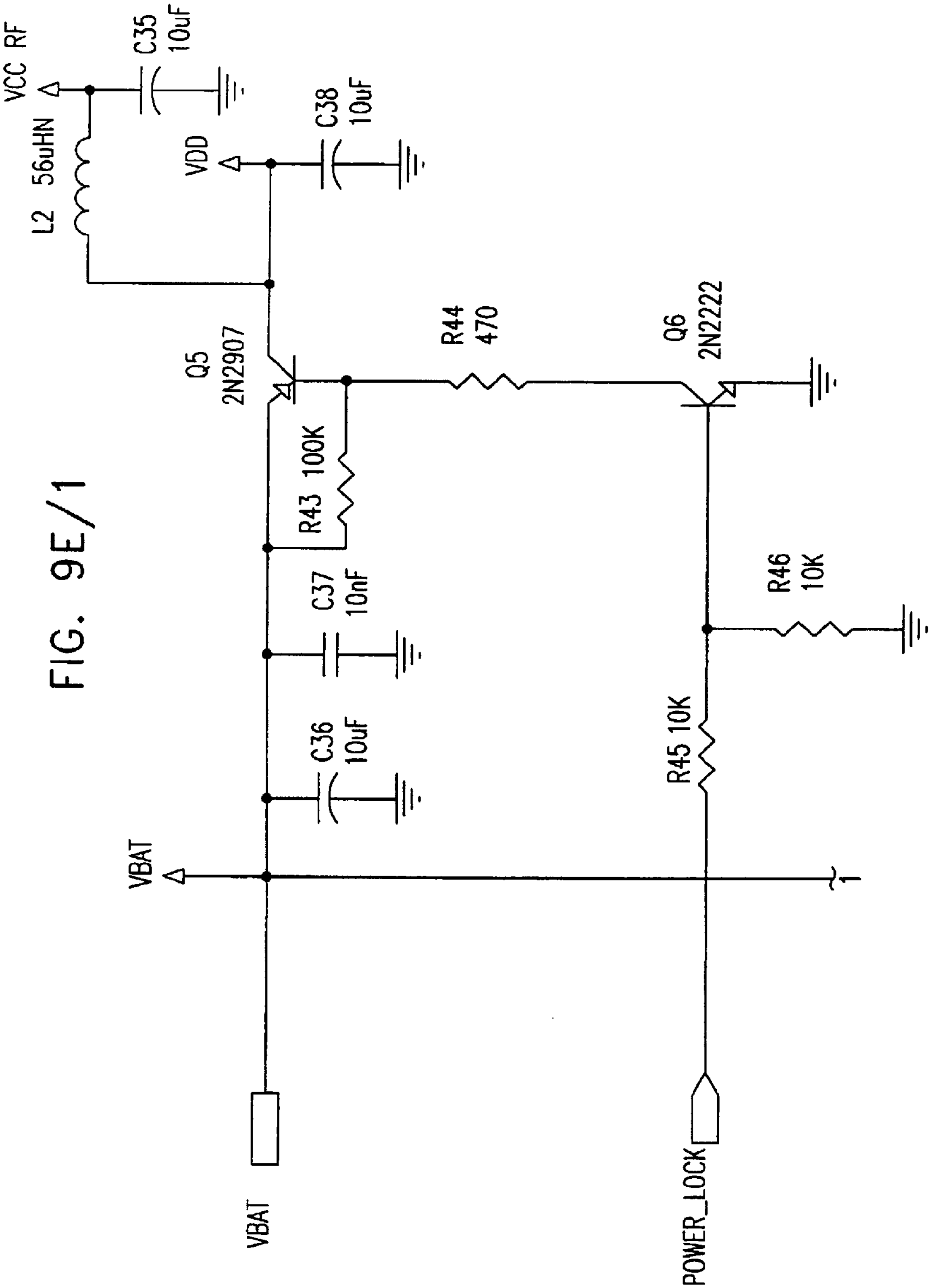
FIG. 9E/1

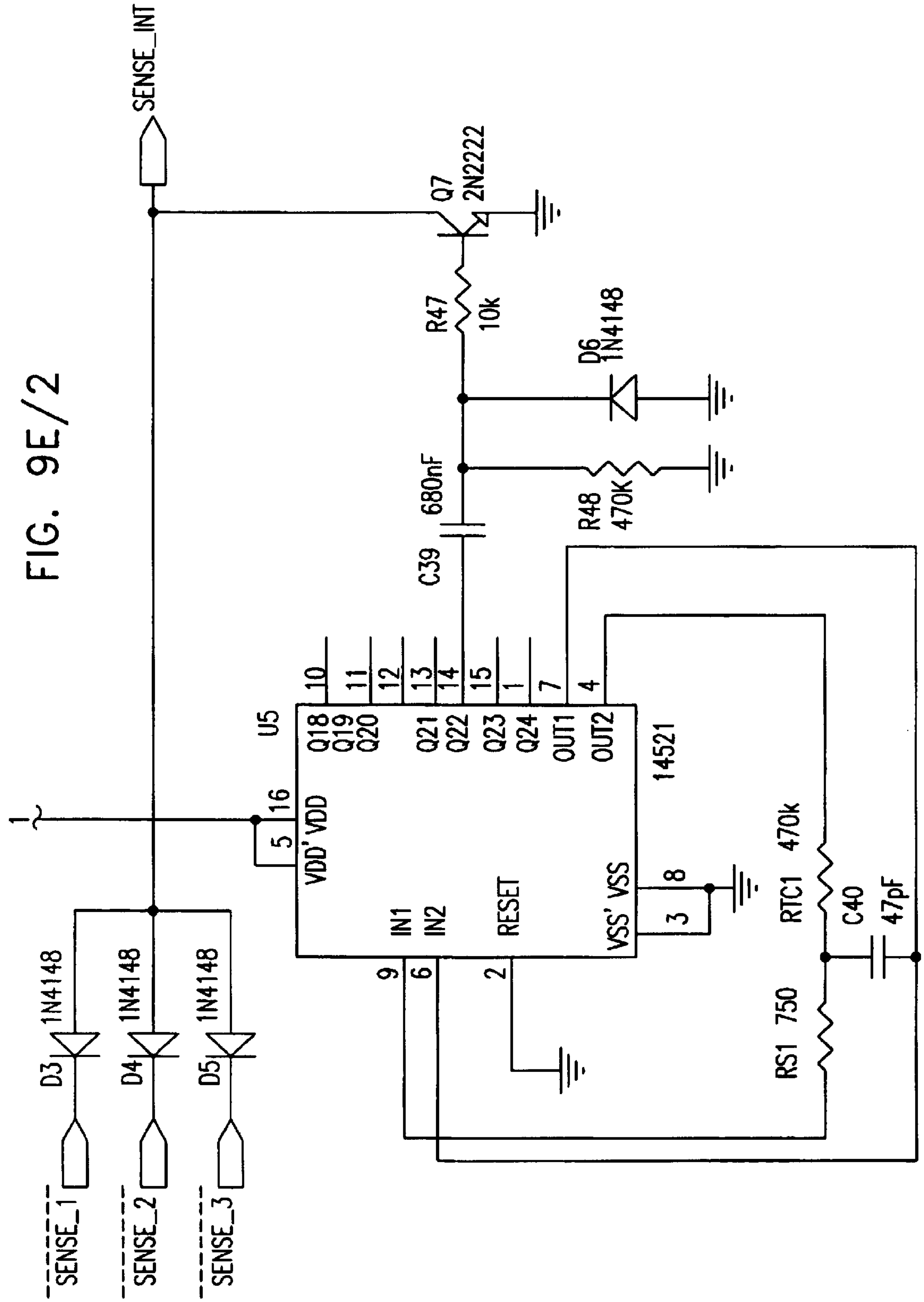
FIG. 9E/2

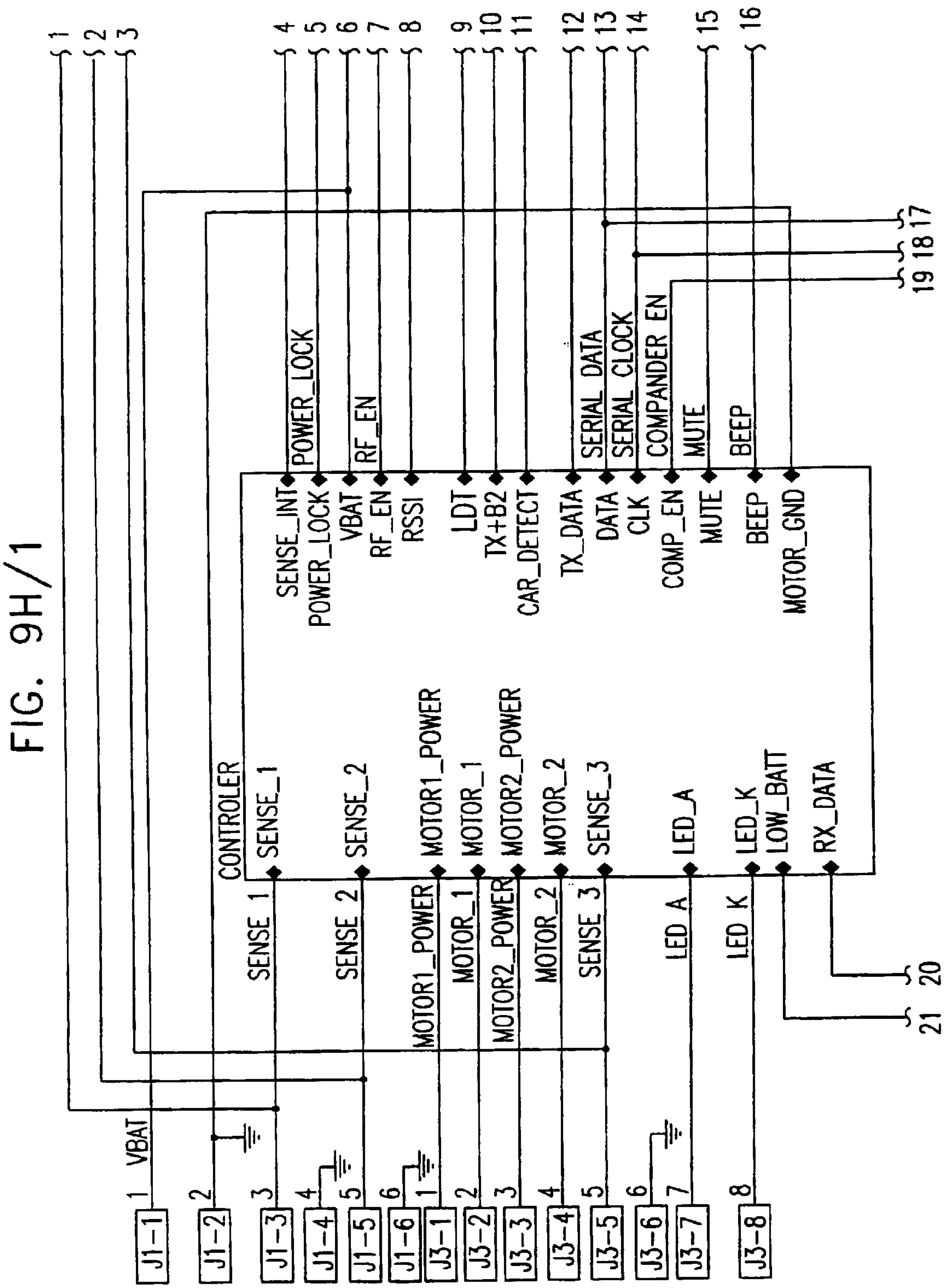
FIG. 9H/1

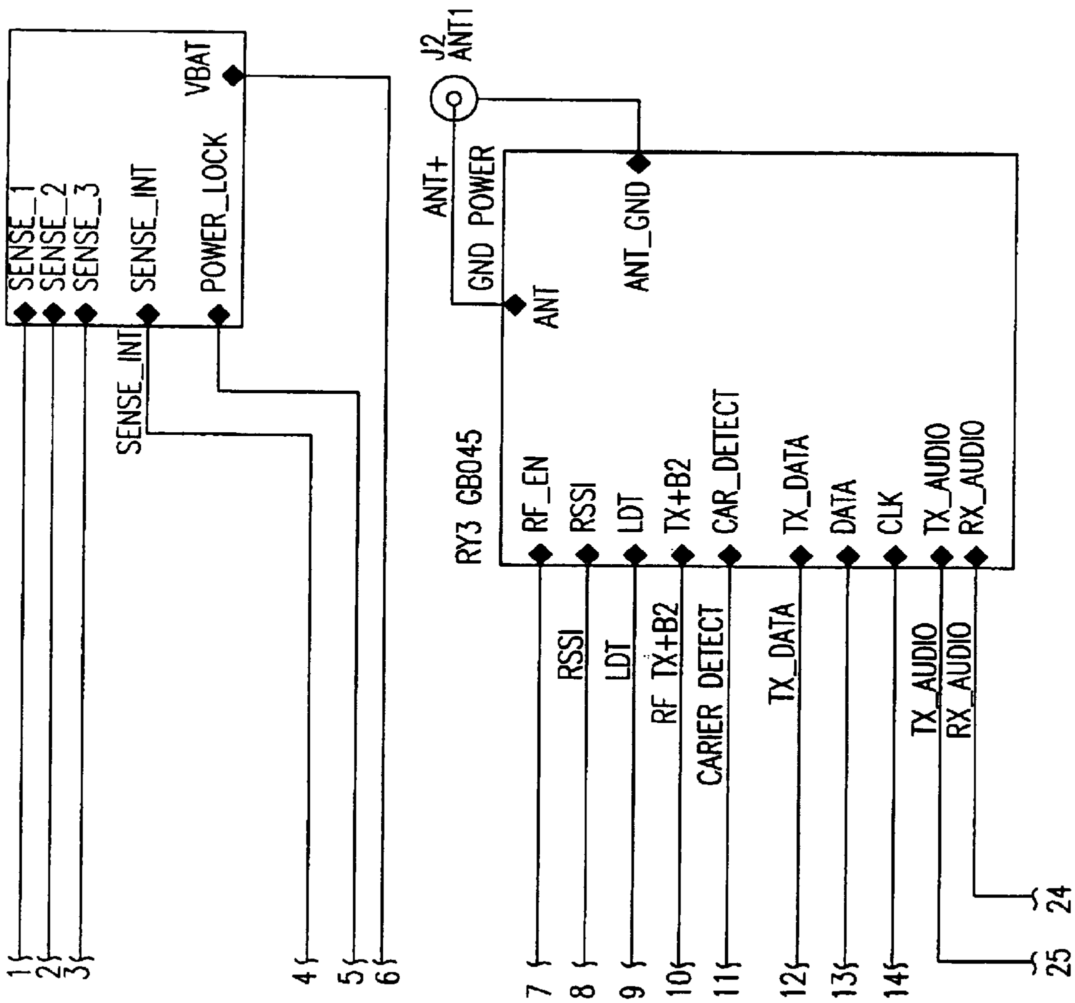
FIG. 9H/2

FIG. 9H/3
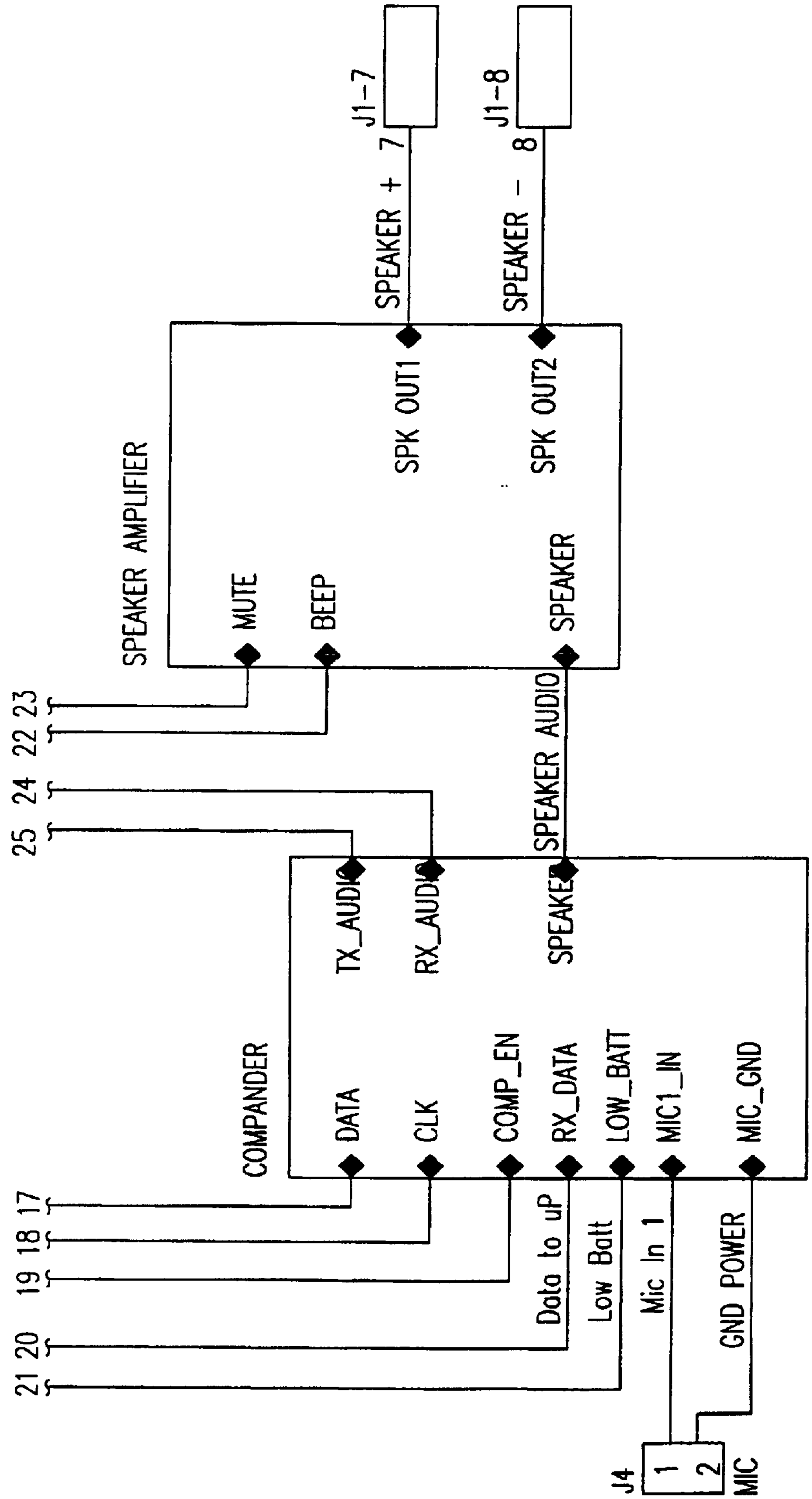

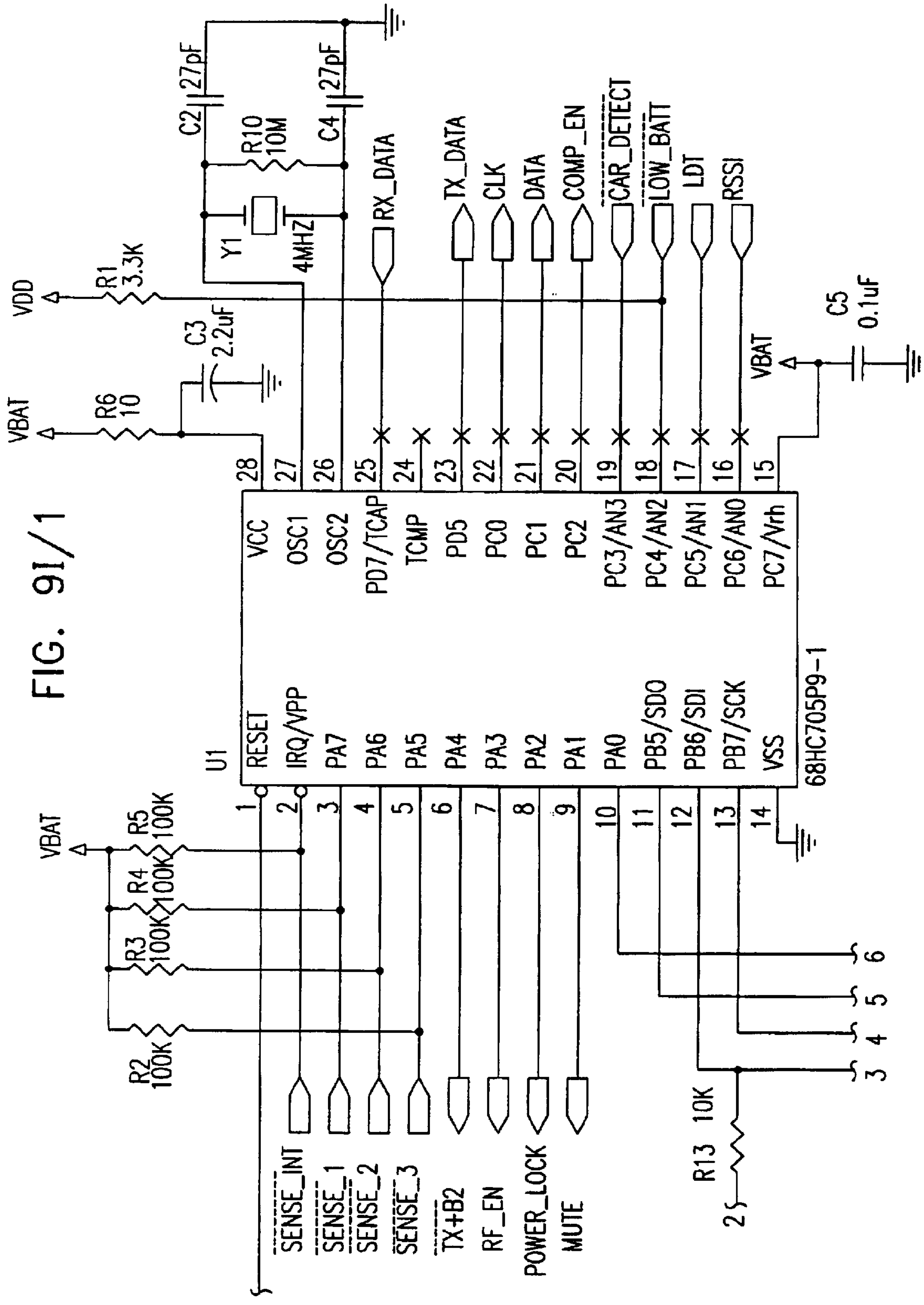
FIG. 9I/1

FIG. 9I/2
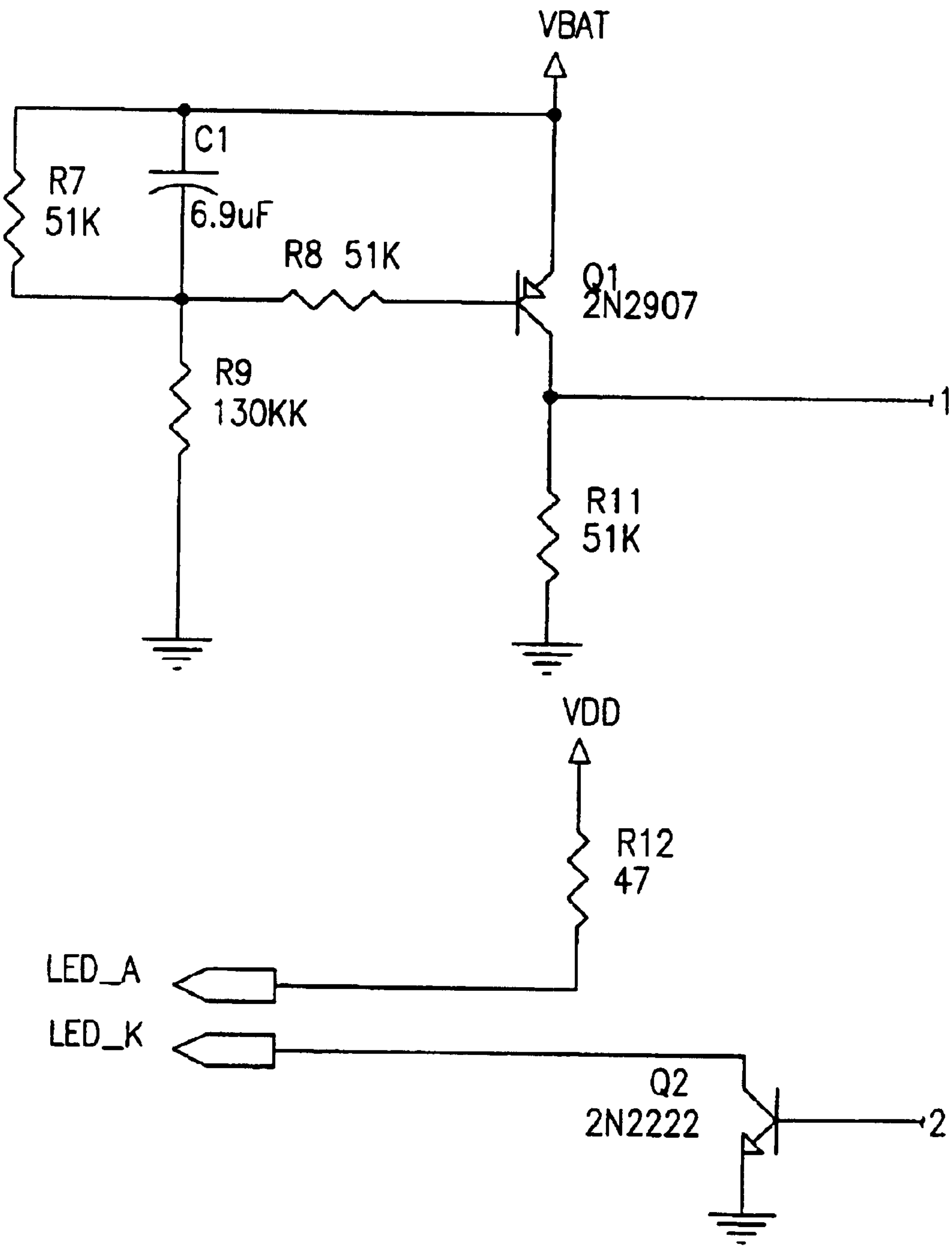

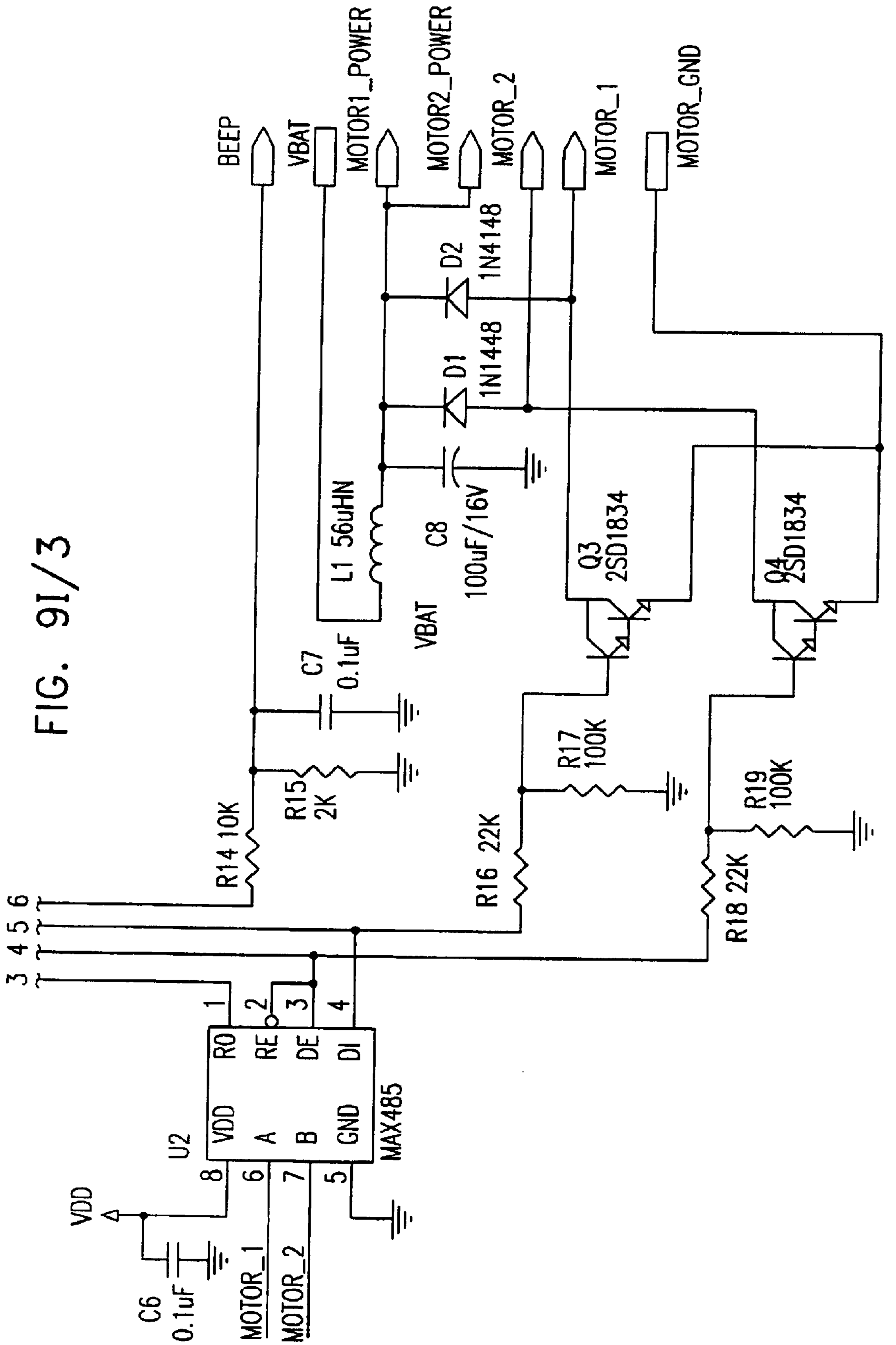
FIG. 9I/3

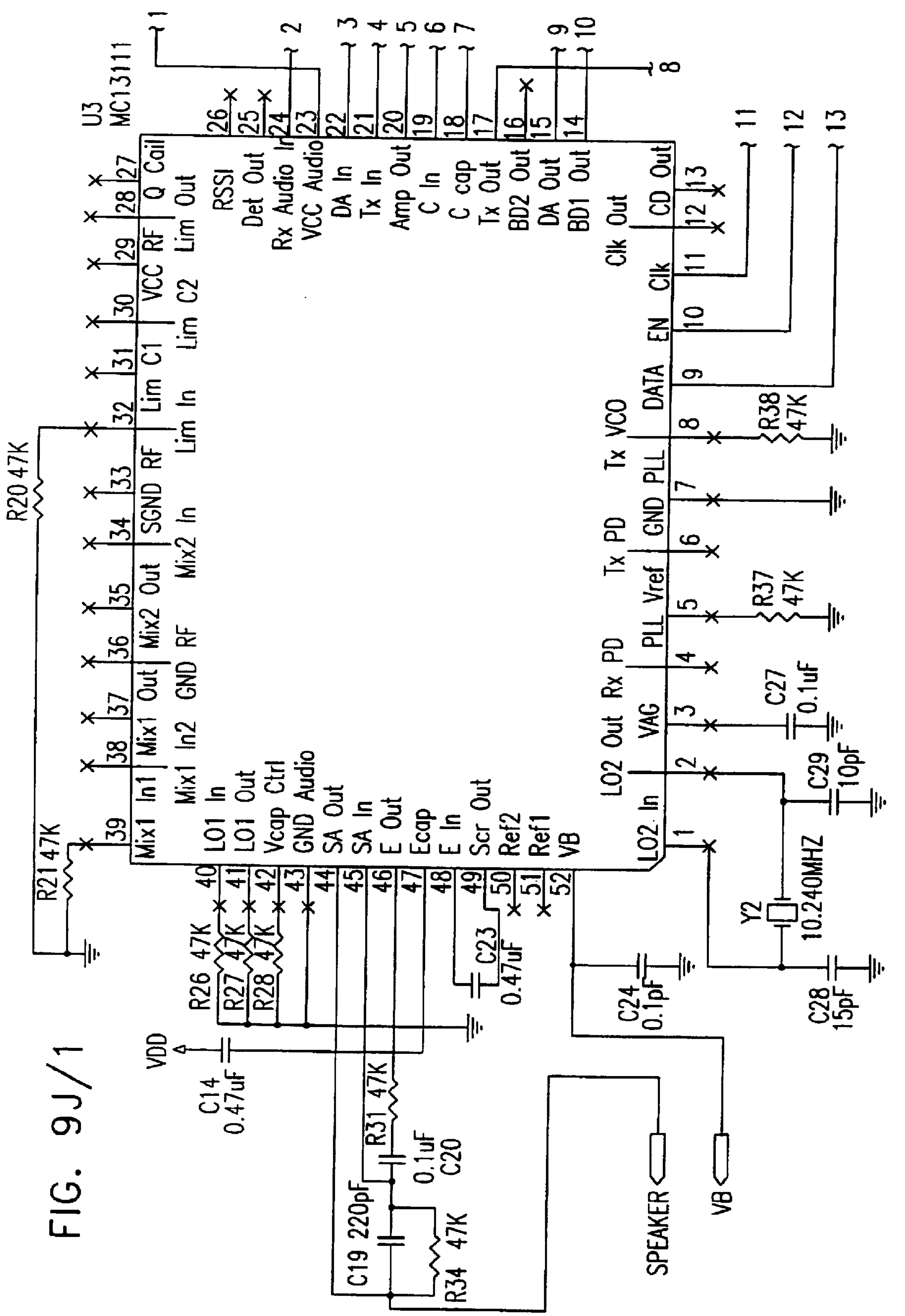
FIG. 9J/1

FIG. 9J/2
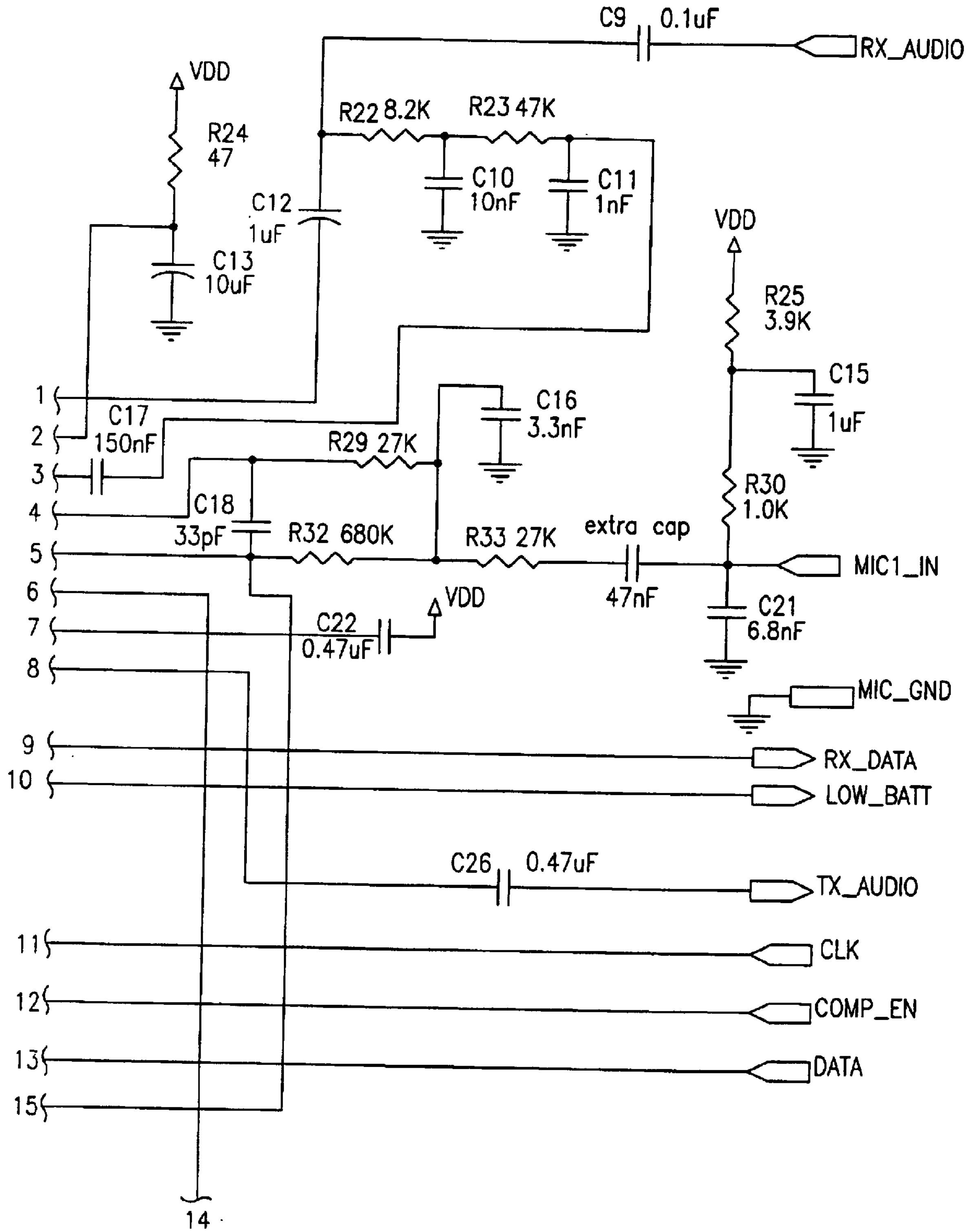

FIG. 9J/3
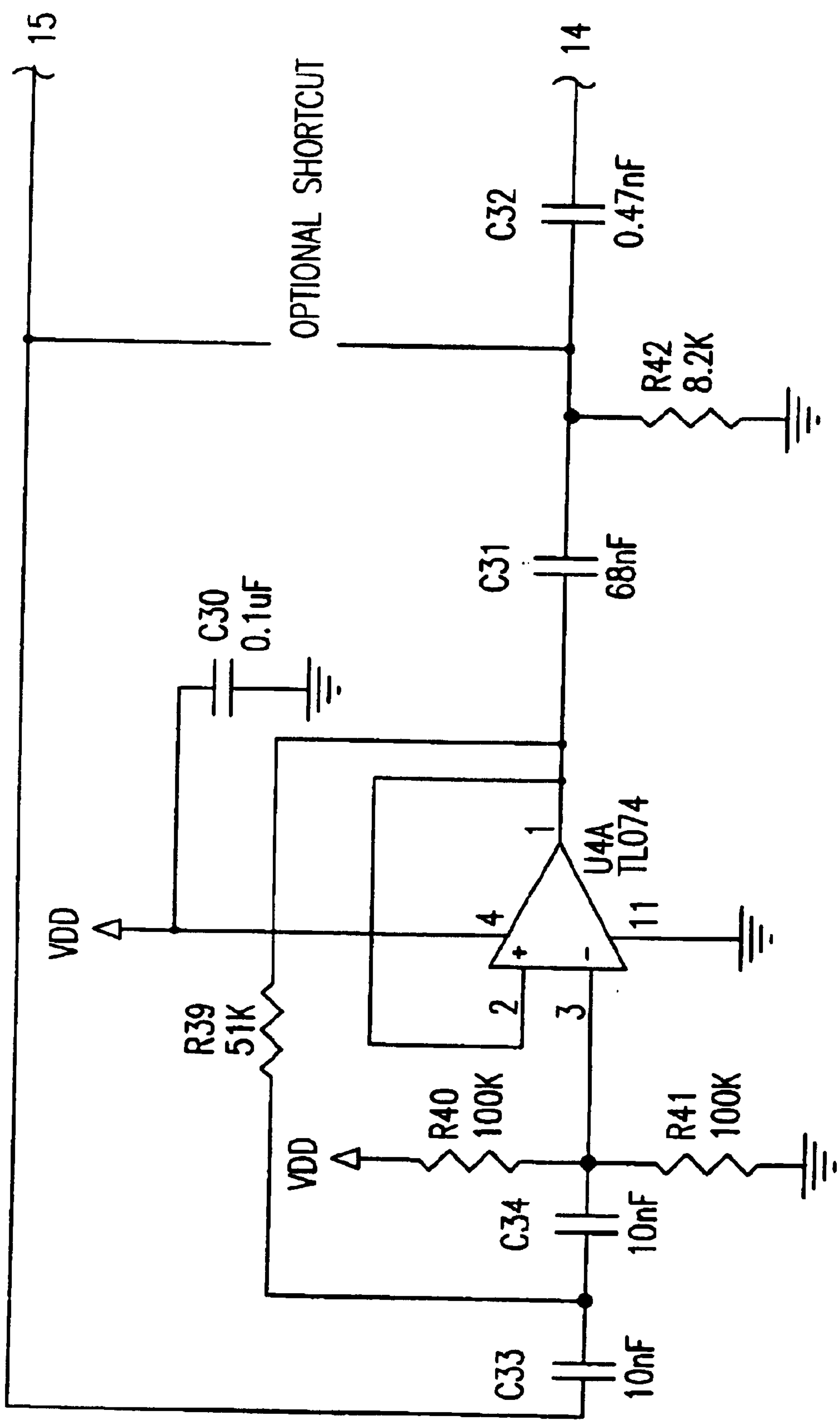

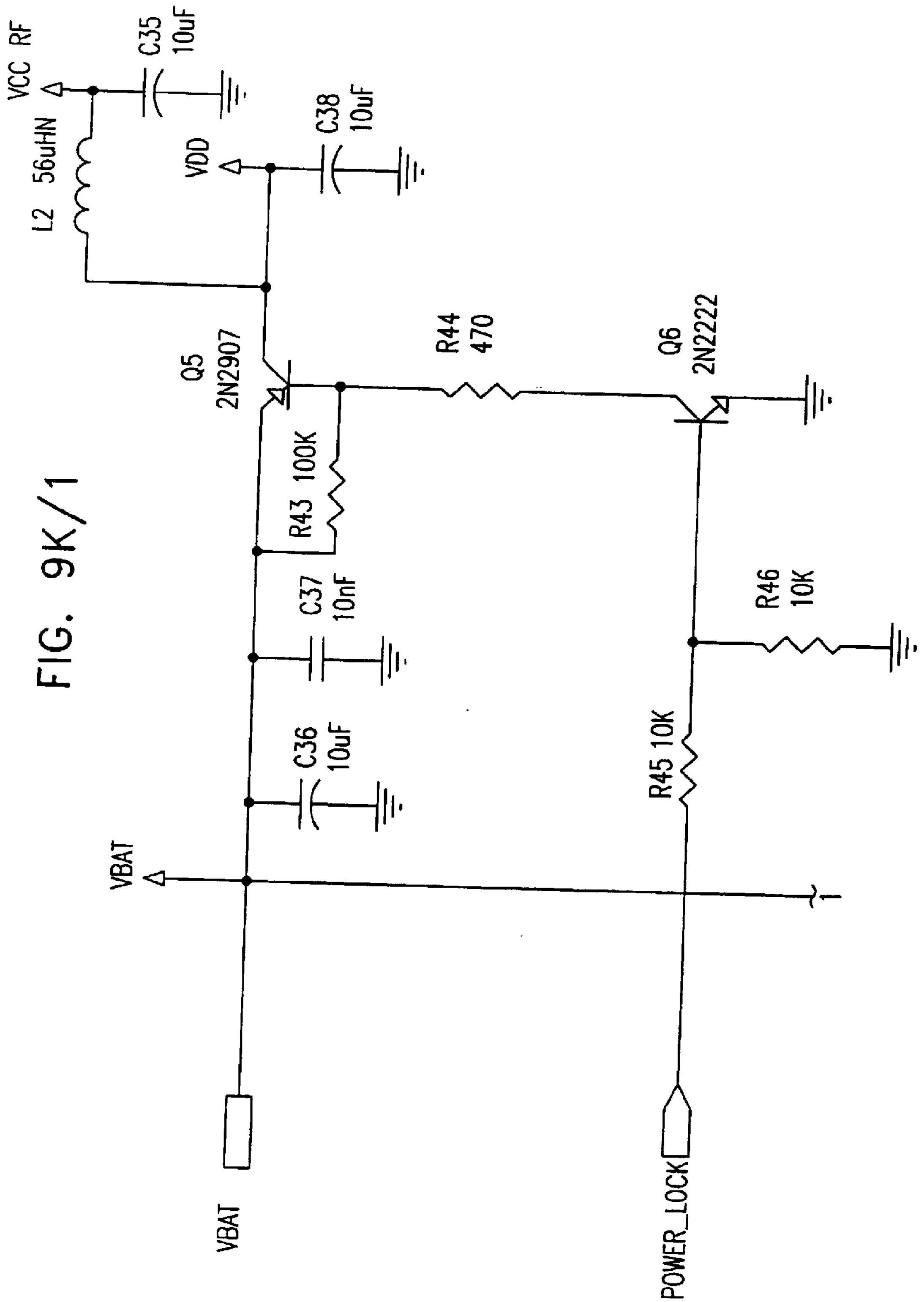
FIG. 9K/1

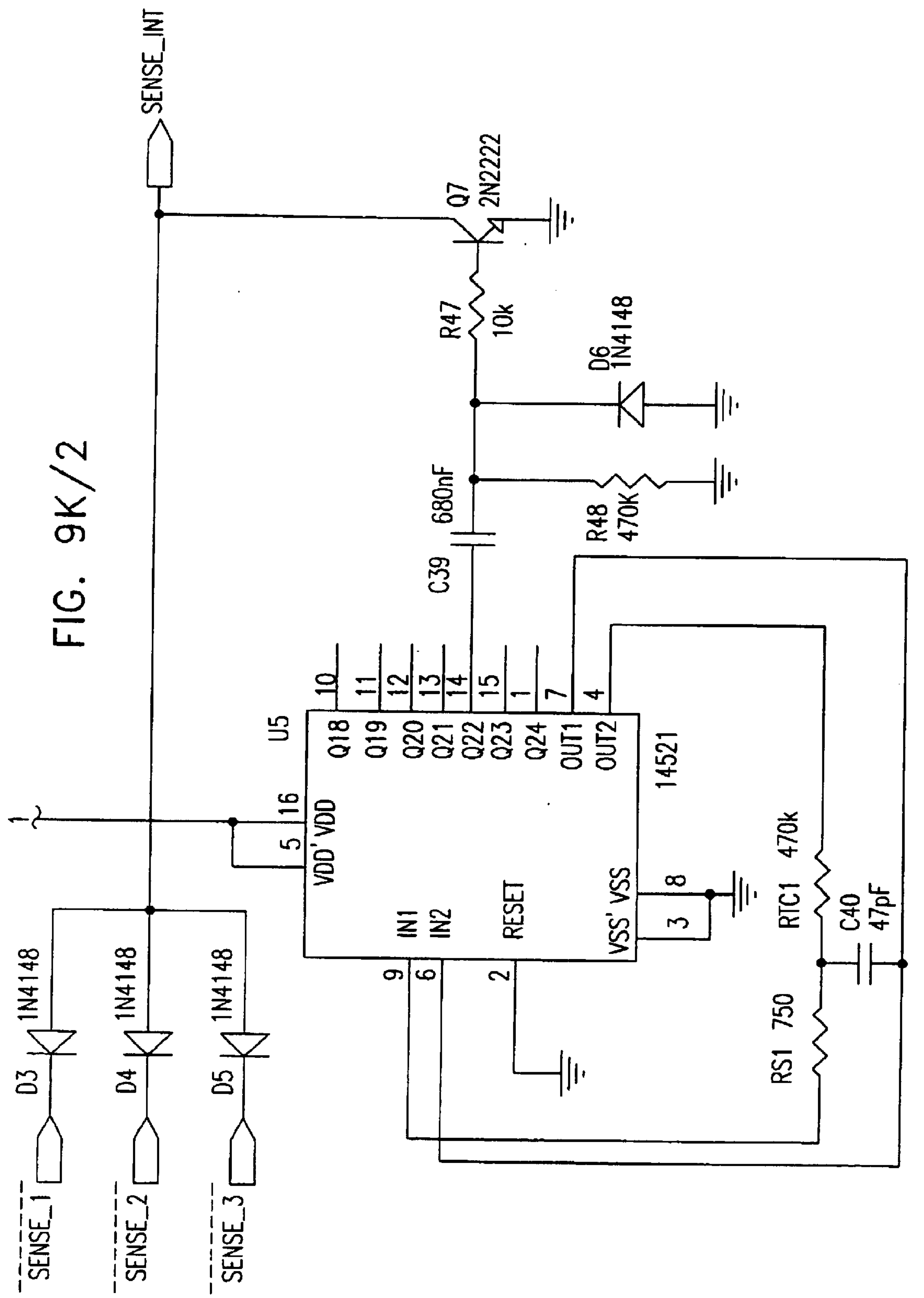
FIG. 9K/2

INTERACTIVE TOY

This is a continuation of application Ser. No. 09/081,255, filed May 19, 1998, now U.S. Pat. No. 6,160,986, which is hereby incorporated herein by reference in its entirety.

FIELD OF THE INVENTION

The present invention relates to computer systems and methods generally and more particularly to development of interactive constructs, to techniques for teaching such development, and to verbally interactive toys. This application includes a listing in the form of microfiche appendix comprising 4 sheets of microfiche which contain a total of 389 frames.

BACKGROUND OF THE INVENTION

Various types of verbally interactive toys are known in the art. Generally speaking, these toys may be divided into two categories, computer games and stand-alone toys. The stand-alone toys, which typically have electronic circuitry embedded therein, normally provide a relatively low level of speech recognition and a very limited vocabulary, which often lead to child boredom and frustration during play.

Computer games enjoy the benefit of substantial computing power and thus can provide a high level of speech recognition and user satisfaction. They are characterized by being virtual in their non-verbal dimensions and thus lack the capacity of bonding with children.

The following patents are believed to represent the state of the art in verbally interactive toys:

U.S. Pat. No. 4,712,184 to Haugerud describes a computer controlled educational toy, the construction of which teaches the user computer terminology and programming and robotic technology.

Haugerud describes computer control of a toy via a wired connection, wherein the user of the computer typically writes a simple program to control movement of a robot.

U.S. Pat. No. 4,840,602 to Rose describes a talking doll responsive to an external signal, in which the doll has a vocabulary stored in digital data in a memory which may be accessed to cause a speech synthesizer in the doll to simulate speech.

U.S. Pat. No. 5,021,878 to Lang describes an animated character system with real-time control.

U.S. Pat. No. 5,142,803 to Lang describes an animated character system with real-time control.

U.S. Pat. No. 5,191,615 to Aldava et al. describes an interrelational audio kinetic entertainment system in which movable and audible toys and other animated devices spaced apart from a television screen are provided with program synchronized audio and control data to interact with the program viewer in relationship to the television program.

U.S. Pat. No. 5,195,920 to Collier describes a radio controlled toy vehicle which generates realistic sound effects on board the vehicle. Communications with a remote computer allows an operator to modify and add new sound effects.

U.S. Pat. No. 5,270,480 to Hikawa describes a toy acting in response to a MIDI signal, wherein an instrument-playing toy performs simulated instrument playing movements.

U.S. Pat. No. 5,289,273 to Lang describes a system for remotely controlling an animated character. The system uses radio signals to transfer audio, video and other control signals to the animated character to provide speech, hearing vision and movement in real-time.

U.S. Pat. No. 5,388,493 describes a system for a housing for a vertical dual keyboard MIDI wireless controller for accordionists. The system may be used with either a conventional MIDI cable connection or by a wireless MIDI transmission system.

German Patent DE 3009-040 to Neuhierl describes a device for adding the capability to transmit sound from a remote control to a controlled model vehicle. The sound is generated by means of a microphone or a tape recorder and transmitted to the controlled model vehicle by means of radio communications. The model vehicle is equipped with a speaker that emits the received sounds.

The disclosures of all publications mentioned in the specification and of the publications cited therein are hereby incorporated by reference.

SUMMARY OF THE INVENTION

The present invention seeks to provide verbally interactive toys and methods thereto which overcome disadvantages of the prior art as described hereinabove.

There is thus provided in accordance with a preferred embodiment of the present invention interactive toy apparatus including a toy having a fanciful physical appearance, a speaker mounted on the toy, a user input receiver, a user information storage unit storing information relating to at least one user a content controller operative in response to current user inputs received via the user input receiver and to information stored in the storage unit for providing audio content to the user via the speaker.

Further in accordance with a preferred embodiment of the present invention the user input receiver includes an audio receiver.

Still further in accordance with a preferred embodiment of the present invention the current user input includes a verbal input received via the audio receiver.

Additionally in accordance with a preferred embodiment of the present invention the user input receiver includes a tactile input receiver.

Moreover in accordance with a preferred embodiment of the present invention the storage unit stores personal information relating to at least one user and the content controller is operative to personalize the audio content.

Further in accordance with a preferred embodiment of the present invention the storage unit stores information relating to the interaction of at least one user with the interactive toy apparatus and the content controller is operative to control the audio content in accordance with stored information relating to past interaction of the at least one user with the interactive toy apparatus.

Still further in accordance with a preferred embodiment of the present invention the storage unit also stores information relating to the interaction of at least one user with the interactive toy apparatus and the content controller also is operative to control the audio content in accordance with information relating to past interaction of the at least one user with the interactive toy apparatus.

Additionally in accordance with a preferred embodiment of the present invention the storage unit stores information input verbally by a user via the user input receiver.

Moreover in accordance with a preferred embodiment of the present invention the storage unit stores information input verbally by a user via the user input receiver.

Further in accordance with a preferred embodiment of the present invention the storage unit stores information input verbally by a user via the user input receiver.

Still further in accordance with a preferred embodiment of the present invention the interactive toy apparatus also includes a content storage unit storing audio contents of at least one content title to be played to a user via the speaker, the at least one content title being interactive and containing interactive branching.

Additionally in accordance with a preferred embodiment of the present invention the at least one content title includes a plurality of audio files storing a corresponding plurality of content title sections including at least one two alternative content title sections, and a script defining branching between the alternative user sections in response to any of a user input, an environmental condition, a past interaction, personal information related to a user, a remote computer, and a time-related condition.

Moreover in accordance with a preferred embodiment of the present invention the interactive toy apparatus also includes a content storage unit storing audio contents of at least one content title to be played to a user via the speaker, the at least one content title being interactive and containing interactive branching.

Further in accordance with a preferred embodiment of the present invention the at least one content title includes a plurality of parallel sections of content elements including at least two alternative sections and a script defining branching between alternative sections in a personalized manner.

Still further in accordance with a preferred embodiment of the present invention the user information storage unit is located at least partially in the toy.

Additionally in accordance with a preferred embodiment of the present invention the user information storage unit is located at least partially outside the toy.

Moreover in accordance with a preferred embodiment of the present invention the content storage unit is located at least partially in the toy.

Further in accordance with a preferred embodiment of the present invention the content storage unit is located at least partially outside the toy.

Still further in accordance with a preferred embodiment of the present invention the user input receiver includes a microphone mounted on the toy, and a speech recognition unit receiving a speech input from the microphone.

Additionally in accordance with a preferred embodiment of the present invention the user information storage unit is operative to store the personal information related to a plurality of users each identifiable with a unique code and the content controller is operative to prompt any of the users to provide the user's code.

Moreover in accordance with a preferred embodiment of the present invention the user information storage unit is operative to store information regarding a user's participation performance.

There is also provided in accordance with a preferred embodiment of the present invention toy apparatus having changing facial expressions, the toy including multi-featured face apparatus including a plurality of multi-positionable facial features, and a facial expression control unit operative to generate at least three combinations of positions of the plurality of facial features representing at least two corresponding facial expressions.

Further in accordance with a preferred embodiment of the present invention the facial expression control unit is operative to cause the features to fluctuate between positions at different rates, thereby to generate an illusion of different emotions.

Still further in accordance with a preferred embodiment of the present invention the toy apparatus also includes a speaker device, an audio memory storing an audio pronouncement, and an audio output unit operative to control output of the audio pronouncement by the speaker device, and the facial expression control unit is operative to generate the combinations of positions synchronously with output of the pronouncement.

There is also provided in accordance with a preferred embodiment of the present invention toy apparatus for playing an interactive verbal game including a toy, a speaker device mounted on the toy, a microphone mounted on the toy, a speech recognition unit receiving a speech input from the microphone, and an audio storage unit storing a multiplicity of verbal game segments to be played through the speaker device, and a script storage defining interactive branching between the verbal game segments.

Further in accordance with a preferred embodiment of the present invention the verbal game segments include at least one segment which prompts a user to generate a spoken input to the verbal game.

Still further in accordance with a preferred embodiment of the present invention the at least one segment includes two or more verbal strings and a prompt to the user to reproduce one of the verbal strings.

Additionally in accordance with a preferred embodiment of the present invention the at least one segment includes a riddle.

Moreover in accordance with a preferred embodiment of the present invention the at least one of the verbal strings has educational content.

Further in accordance with a preferred embodiment of the present invention the at least one of the verbal strings includes a feedback to the user regarding the quality of the user's performance in the game.

Still further in accordance with a preferred embodiment of the present invention the interactive toy apparatus further includes multi-featured face apparatus assembled with the toy including a plurality of multi-positionable facial features, and a facial expression control unit operative to generate at least three combinations of positions of the plurality of facial features representing at least two corresponding facial expressions.

Additionally in accordance with a preferred embodiment of the present invention the facial expression control unit is operative to cause the features to fluctuate between positions at different rates, thereby to generate an illusion of different emotions.

Moreover in accordance with a preferred embodiment of the present invention the interactive toy apparatus also includes an audio memory storing an audio pronouncement, and an audio output unit operative to control output of the audio pronouncement by the speaker device, and the facial expression control unit is operative to generate the combinations of positions synchronously with output of the pronouncement.

Further in accordance with a preferred embodiment of the present invention the interactive toy apparatus further includes a microphone mounted on the toy, a speech recognition unit receiving a speech input from the microphone, and an audio storage unit storing a multiplicity of verbal game segments of a verbal game to be played through the speaker device, and a script storage defining interactive branching between the verbal game segments.

Still further in accordance with a preferred embodiment of the present invention the verbal game segments include at least one segment which prompts a user to generate a spoken input to the verbal game.

Additionally in accordance with a preferred embodiment of the present invention the at least one segment includes two or more verbal strings and a prompt to the user to reproduce one of the verbal strings.

Moreover in accordance with a preferred embodiment of the present invention the at least one segment includes a riddle.

Further in accordance with a preferred embodiment of the present invention the at least one of the verbal strings has educational content.

Still further in accordance with a preferred embodiment of the present invention Interactive toy apparatus at least one of the verbal strings includes a feedback to the user regarding the quality of the user's performance in the game.

There is also provided in accordance with a preferred embodiment of the present invention a method of toy interaction including providing a toy having a fanciful physical appearance, providing a speaker mounted on the toy, providing a user input receiver, storing in a user information storage unit information relating to at least one user providing, via a content controller operative in response to current user inputs received via the user input receiver and to information stored in the storage unit, audio content to the user via the speaker.

Further in accordance with a preferred embodiment of the present invention the storing step includes storing personal information relating to at least one user and personalizing, via the content controller, the audio content.

Still further in accordance with a preferred embodiment of the present invention the storing step includes storing information relating to the interaction of at least one user with the interactive toy apparatus and controlling, via the content controller, the audio content in accordance with stored information relating to past interaction of the at least one user with the interactive toy apparatus.

Additionally in accordance with a preferred embodiment of the present invention the method further includes storing, in a content storage unit, audio contents of at least one content title to be played to a user via the speaker, the at least one content title being interactive and containing interactive branching.

Moreover in accordance with a preferred embodiment of the present invention the method further includes storing personal information related to a plurality of users each identifiable with a unique code and prompting, via the content controller, any of the users to provide the user's code.

Further in accordance with a preferred embodiment of the present invention the method further includes storing information regarding a user's participation performance.

Still further in accordance with a preferred embodiment of the present invention the method further includes providing multi-featured face apparatus including a plurality of multi-positionable facial features, and generating at least three combinations of positions of the plurality of facial features representing at least two corresponding facial expressions.

Additionally in accordance with a preferred embodiment of the present invention the method further includes causing the features to fluctuate between positions at different rates, thereby to generate an illusion of different emotions.

Moreover in accordance with a preferred embodiment of the present invention the method also includes storing an audio pronouncement, and providing the audio pronouncement by the speaker, and generating combinations of facial positions synchronously with output of the pronouncement.

There is also provided, in accordance with a preferred embodiment of the present invention, a system for teaching programming to students, such as school-children, using interactive objects, the system including a computerized student interface permitting a student to breathe life into an interactive object by defining characteristics of the interactive object, the computerized student interface be being operative to at least partially define, in response to student inputs, interactions between the interactive object and humans; and a computerized teacher interface permitting a teacher to monitor the student's progress in defining characteristics of the interactive object.

Further in accordance with a preferred embodiment of the present invention, the computerized teacher interface permits the teacher to configure the computerized student interface.

Also provided, in accordance with a preferred embodiment of the present invention, is a teaching system for teaching engineering and programming of interactive objects to students, the system including a computerized student interface permitting a student to breathe life into an interactive object by defining characteristics of the interactive object, the computerized user interface being operative to at least partially define, in response to student inputs, interactions between the interactive object and humans, and a computerized teacher interface permitting a teacher to configure the computerized student interface.

Also provided, in accordance with another preferred embodiment of the present invention, is a computer system for development of emotionally perceptive computerized creatures including a computerized user interface permitting a user to develop an emotionally perceptive computer-controlled creature by defining interactions between the emotionally perceptive computer-controlled creature and natural humans including at least one response of the emotionally perceptive computer-controlled creature to at least one parameter, indicative of natural human emotion, derived from a stimulus provided by the natural human and a creature control unit operative to control the emotionally perceptive creature in accordance with the characteristics and interactions defined by the user.

Further in accordance with a preferred embodiment of the present invention, the parameter indicative of natural human emotion includes a characteristic of natural human speech other than language content thereof.

Also provided, in accordance with a preferred embodiment of the present invention, is a method for development of emotionally perceptive computerized creatures, the method including defining interactions between the emotionally perceptive computer-controlled creature and natural humans including at least one response of the emotionally perceptive computer-controlled creature to at least one parameter, indicative of natural human emotion, derived from a stimulus provided by the natural human, and controlling the emotionally perceptive creature in accordance with the characteristics and interactions defined by the user.

Additionally provided, in accordance with a preferred embodiment of the present invention, is a method for teaching programming to school-children, the method including providing a computerized visual-programming based school-child interface permitting a school-child to perform visual programming and providing a computerized teacher interface permitting a teacher to configure the computerized school-child interface.

Also provided is a computerized emotionally perceptive computerized creature including a plurality of interaction modes operative to carry out a corresponding plurality of interactions with natural humans including at least one response to at least one natural human emotion parameter, indicative of natural human emotion and an emotion perception unit operative to derive at least one natural human emotion parameter from a stimulus provided by the natural human, and to supply the parameter to at least one of the plurality of interaction modes, and, optionally, a physical or virtual, e.g. on-screen, body operative to participate in at least one of the plurality of interactions.

BRIEF DESCRIPTION OF THE DRAWINGS

The present invention will be understood and appreciated from the following detailed description, taken in conjunction with the drawings in which:

FIGS. 8A–8G, taken together, comprise a schematic diagram of base communication unit 62 of FIG. 5;

FIGS. 8H–8N, taken together, comprise a schematic diagram of base communication unit 62 of FIG. 5, according to an alternative embodiment;

FIGS. 9A–9G, taken together, comprise a schematic diagram of toy control device 24 of FIG. 5;

FIGS. 9H–9M, taken together, comprise a schematic diagram of toy control device 24 of FIG. 5, according to an alternative embodiment;

FIGS. 10–15, taken together, are simplified flowchart illustrations of a preferred method of operation of the interactive toy system of FIGS. 1–9G;

FIGS. 16A and 16B, taken together, form a simplified operational flow chart of one possible implementation of the opening actions of a script executed by the "Play" sub-module of FIG. 10;

FIGS. 17A–17E, taken together, form a simplified operational flow chart of one possible implementation of a story script executed by the "Play" sub-module of FIG. 10;

FIGS. 18A–18E, taken together, form a simplified operational flow chart of one possible implementation of a game script executed by the "Play" sub-module of FIG. 10;

FIGS. 19A–19C, taken together, form a simplified operational flow chart of one possible implementation of a song script executed by the "Play" sub-module of FIG. 10;

FIGS. 20A–20C, taken together, form a simplified operational flow chart of one possible implementation of the "Bunny Short" story script of FIGS. 17A–17E and executed by the "Play" sub-module of FIG. 10;

FIGS. 21A–21F, taken together, form a simplified operational flow chart of one possible implementation of the "Bunny Long" story script of FIGS. 17A–17E and executed by the "Play" sub-module of FIG. 10;

FIG. 22 is a simplified operational flow chart of the "Theme Section" referred to in FIGS. 17D, 18C, 19B, and 19C;

FIG. 23A is a pictorial illustration of the development and operation of a physical toy living creature in accordance with a preferred embodiment of the present invention;

FIG. 23B is a pictorial illustration of the development and operation of a virtual living creature in accordance with a preferred embodiment of the present invention;

FIG. 23C is a simplified semi-pictorial semi-block diagram illustration of a system which is a variation on the systems of FIGS. 23A–23B in that a remote content server is provided which serves data, programs, voice files and other contents useful in breathing life into a computerized living creature;

FIG. 24A is a pictorial illustration of a school-child programming a computerized living creature;

FIG. 24B is a pictorial illustration of human, at least verbal interaction with a computerized living creature wherein the interaction was programmed by a student as described above with reference to FIG. 24A;

FIG. 24C is a drawing showing a creature equipped with a built-in video camera and video display.

FIG. 25 is a simplified software design diagram of preferred functionality of a system administrator;

FIG. 26 is a simplified software diagram of preferred functionality of teacher workstation 312 in a system for teaching development of interactive computerized constructs such as the system of FIGS. 23A–23C;

FIG. 27 is a simplified software diagram of preferred functionality of student workstation 10 in a system for teaching development of interactive computerized constructs such as the system of FIGS. 23A–23C;

FIGS. 28–31 are examples of screen displays which are part of a human interface for the Visual Programming block 840;

FIG. 32 is a screen display which includes an illustration of an example of a state machine view of a project;

FIG. 33 is a screen display which enables a student to create an environment in which a previously generated module can be tested;

FIGS. 34–37 are examples of display screens presented by the teacher workstation 312 of any of FIG. 23A, 23B or 23C;

FIG. 38 is a simplified flowchart illustration of the process by which the student typically uses the student workstation of any of FIG. 23A, 23B or 23C;

FIG. 39 is an example of a display screen generated by selecting Event in the Insert menu in the student workstation 310;

FIG. 40 is an example of a display screen generated by selecting Function in the Insert menu in the student workstation 310;

FIG. 41 is a simplified flowchart illustration of processes performed by the student in the course of performing steps 910 and 920 of FIG. 38;

FIG. 42 is a simplified flowchart illustration of an emotional interaction flowchart design process;

FIGS. 43–102 illustrate preferred embodiments of a computerized programming teaching system constructed and operative in accordance with a preferred embodiment of the present invention.

FIG. 103 is a table illustration of an emotional analysis database; and

FIG. 104 is an emotional analysis state chart.

In some instances, a group of figures, for example, FIGS. 18A–18E may be referred to collectively by a single figure number, for example, FIG. 18.

Attached herewith are the following appendices which aid in the understanding and appreciation of one preferred embodiment of the invention shown and described herein:

Appendix A is a computer listing of a preferred software implementation of the interactive toy system of the present invention;

Appendix B is a preferred parts list for the apparatus of FIGS. 8A–8G; and Appendix C is a preferred parts list for the apparatus of FIGS. 9A–9G.

DETAILED DESCRIPTION OF PREFERRED EMBODIMENTS

Figure 1A:
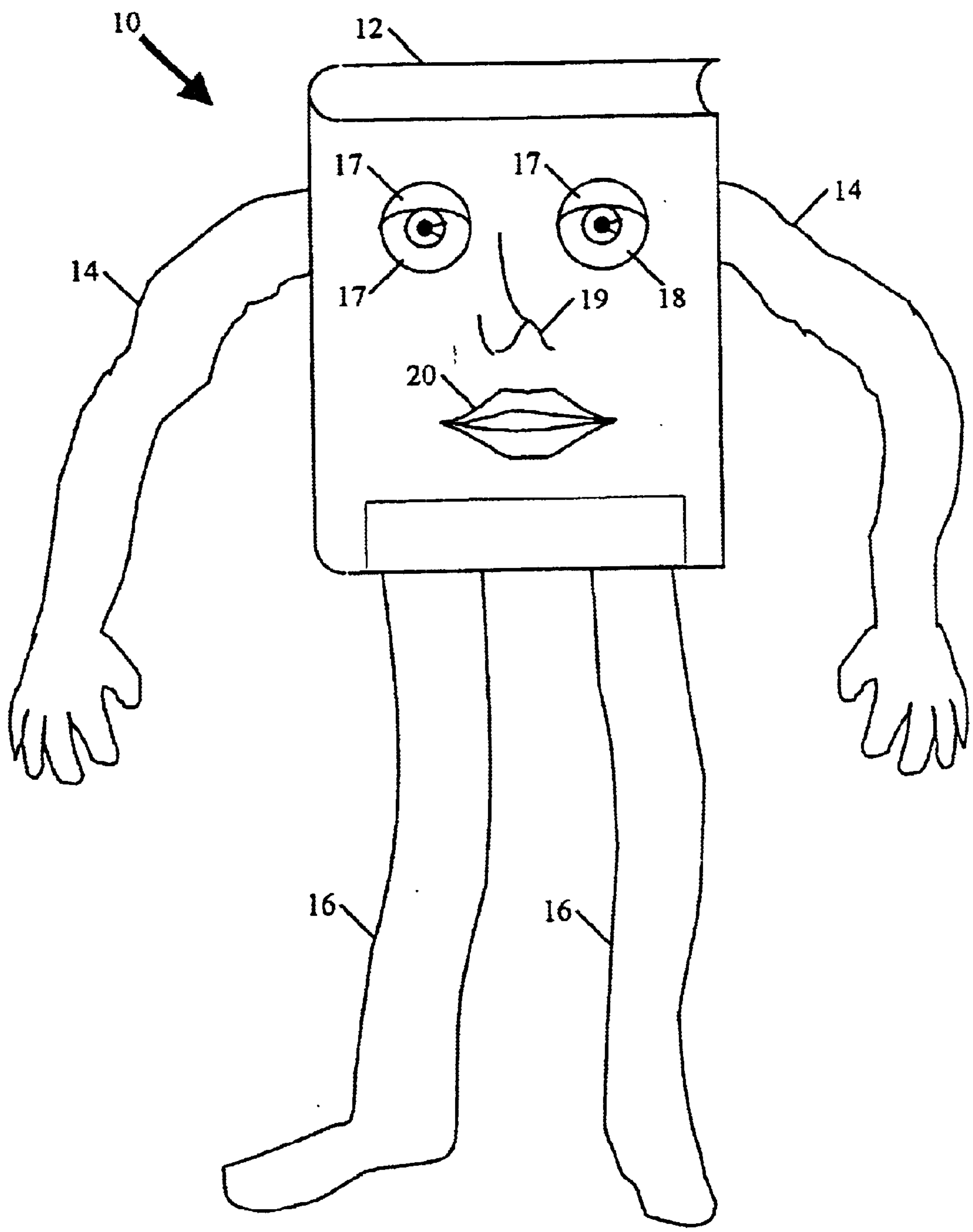
FIG. 1A is a simplified pictorial illustration of a toy forming at least part of an interactive toy system constructed and operative in accordance with a preferred embodiment of the present invention.

Reference is now made to FIG. 1A which is a simplified pictorial illustration of a toy, generally designated 10, forming at least part of an interactive toy system constructed and operative in accordance with a preferred embodiment of the present invention. While toy 10 may be implemented in any number of physical configurations and still maintain the functionality of an interactive toy system as is described herein, for illustration purposes only toy 10 is shown in FIG. 1A as typically having a fanciful physical appearance and comprising a body portion 12 having a number of appendages, such as arms 14, legs 16, eyelids 17, eyes 18, a nose 19, and a mouth 20. Arms 14 and legs 16 may be passive "appendages" in that they are not configured to move, while eyelids 17, eyes 18 and mouth 20 may be "active" appendages in that they are configured to move as is described in greater detail hereinbelow with reference to FIGS. 3–4E.

Figure 1B:
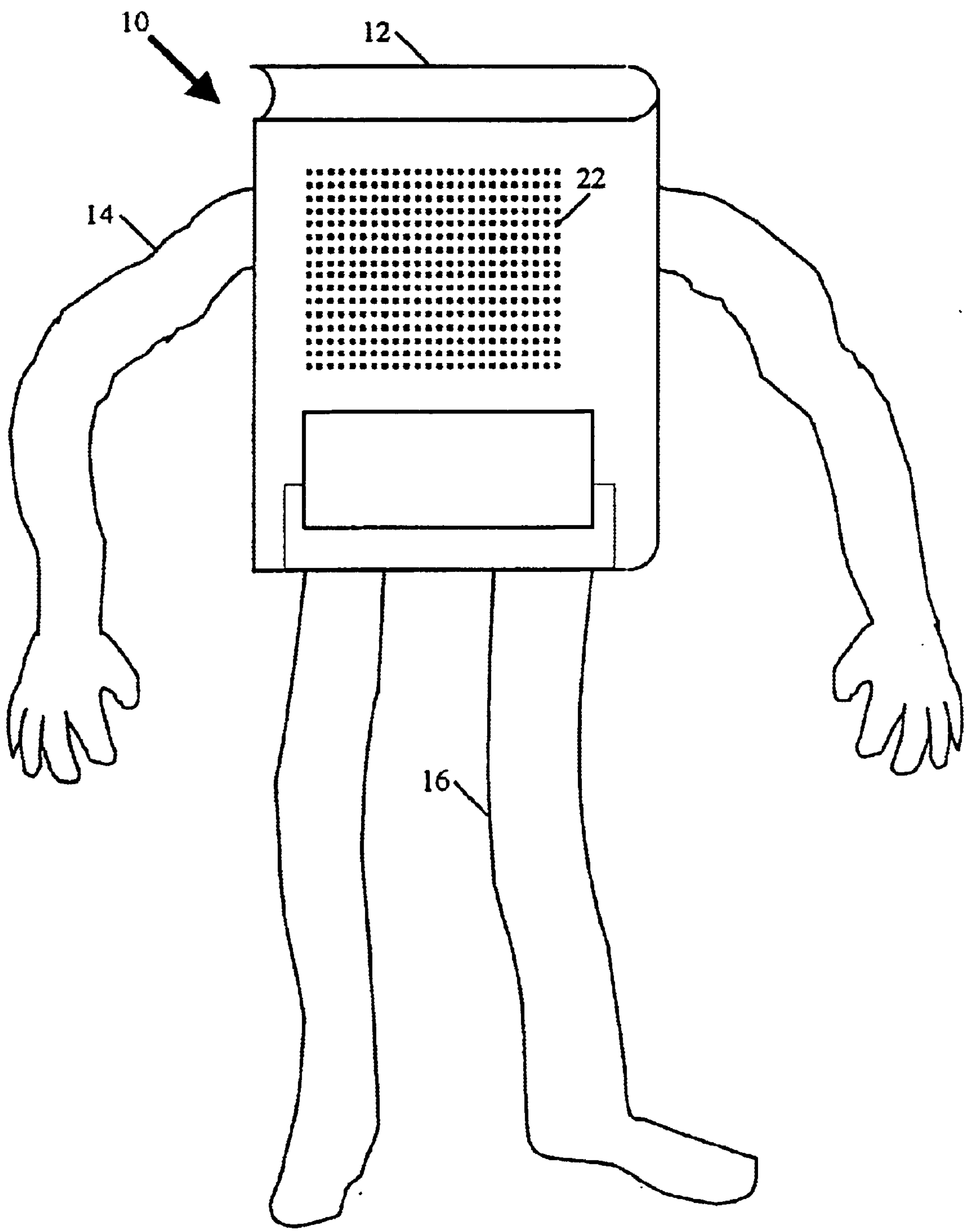
FIG. 1B is a back view of the toy of FIG. 1.

FIG. 1B is a back view of the toy of FIG. 1 and additionally shows toy 10 as typically having an apertured area 22, behind which a speaker may be mounted as will be described in greater detail hereinbelow.

Figure 2:
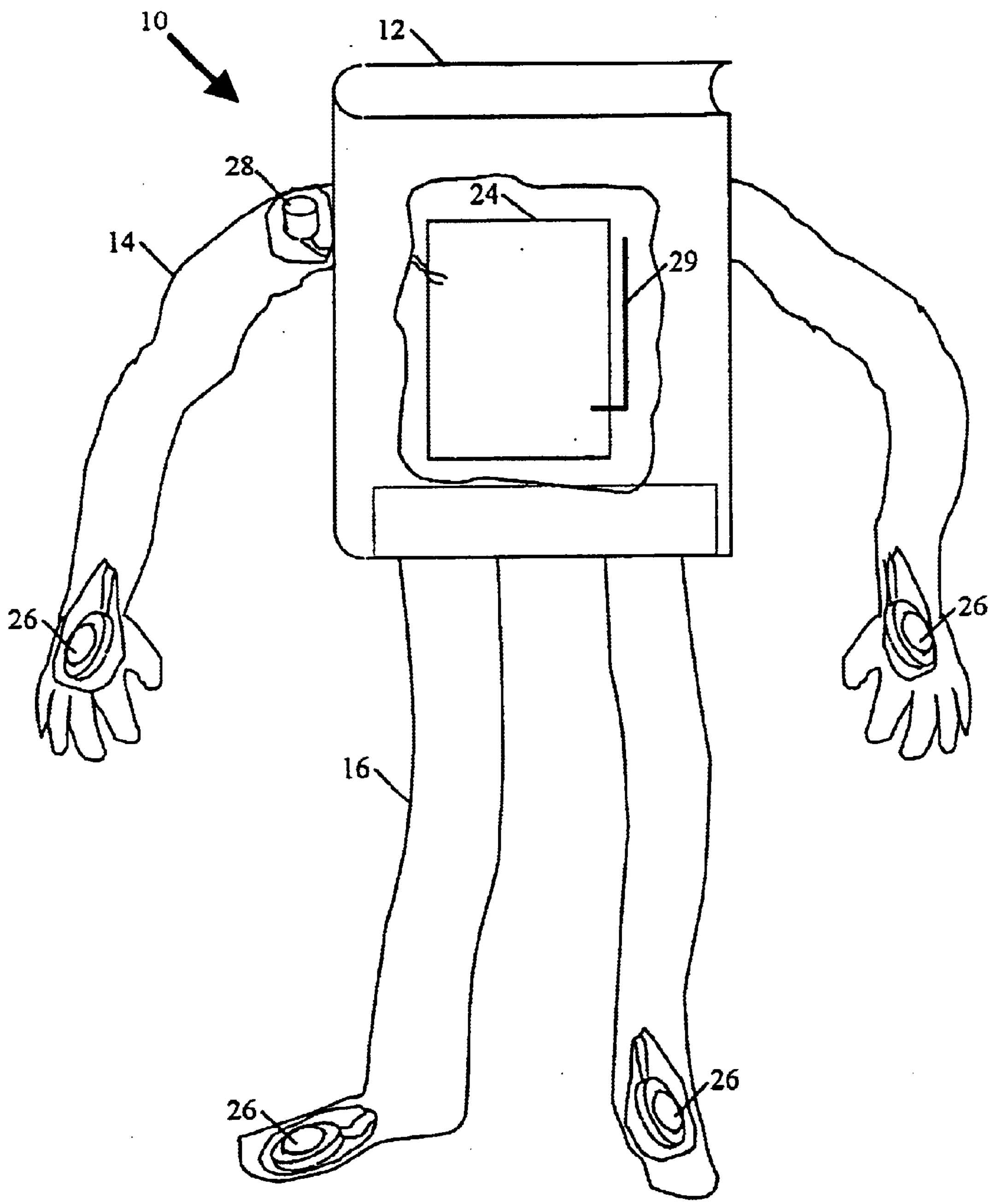
FIG. 2 is a partially cut away pictorial illustration of the toy of FIGS. 1A and 1B.

FIG. 2 is a partially cut away pictorial illustration of the toy of FIGS. 1A and 1B showing a toy control device 24, typically housed within body potion 12, and a number of user input receivers, such as switches 26 in arms 14 and legs 16 for receiving tactile user inputs, and a microphone 28 for receiving audio user inputs. It is appreciated that the various user input receivers described herein may be located anywhere within toy 10, such as behind nose 19, provided that they may be accessed by a tactile or audio user input, such as verbal input, as required.

It is appreciated any of a multitude of known sensors and input devices, such as accelerometers, orientation sensors, proximity sensors, temperature sensors, video input devices, etc., although not particularly shown, may be incorporated into toy 10 for receiving inputs or other stimuli for incorporation into the interactive environment as described herein regarding the interactive toy system of the present invention.

Figure 3:
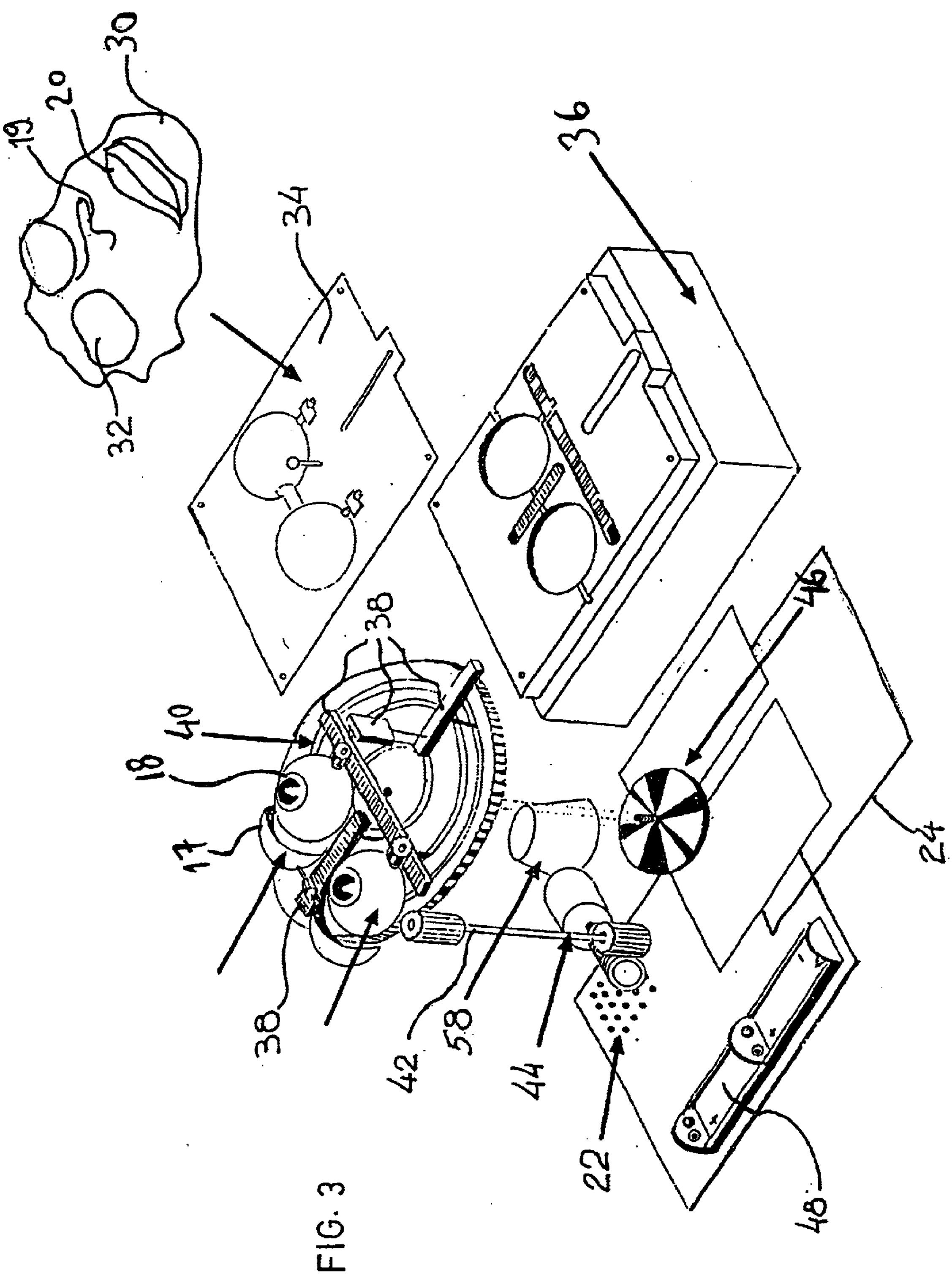
FIG. 3 is a simplified exploded illustration of elements of the toy of FIGS. 1A, 1B, and 2.

Additional reference is now made to FIG. 3 which is a simplified exploded illustration of elements of the toy 10 of FIGS. 1A, 1B, and 2. A facial portion 30 of body portion 12 of FIG. 1 is shown together with nose 19 and mouth 20, and having two apertures 32 for receiving eyelids 17 and eyes 18. Facial portion 30 typically sits atop a protective cover 34 which is mounted on a protective box 36. Eyelids 17, eyes 18, and mouth 20 each typically cooperate with a motion element 38 which provides a movement to each appendage. Motion elements 38 are typically driven by a gear plate 40 which is in turn controlled by a gear shaft 42 and a motor 44. Circuitry 24 effects a desired movement of a specific appendage via a corresponding motion element 38 by controlling motor 44 and gear shaft 42 to orient and move gear plate 40 depending on the desired rotational orientation of gear plate 40 relative to the current rotational orientation as determined by an optical positioning device 46. Gear plate 40 preferably selectably cooperates with a single one of motion elements 38 at a time depending on specific rotational orientations of gear plate 40. A speaker 58 is also provided for audio output. Power is typically provided by a power source 48, typically a DC power source.

Figure 4A:
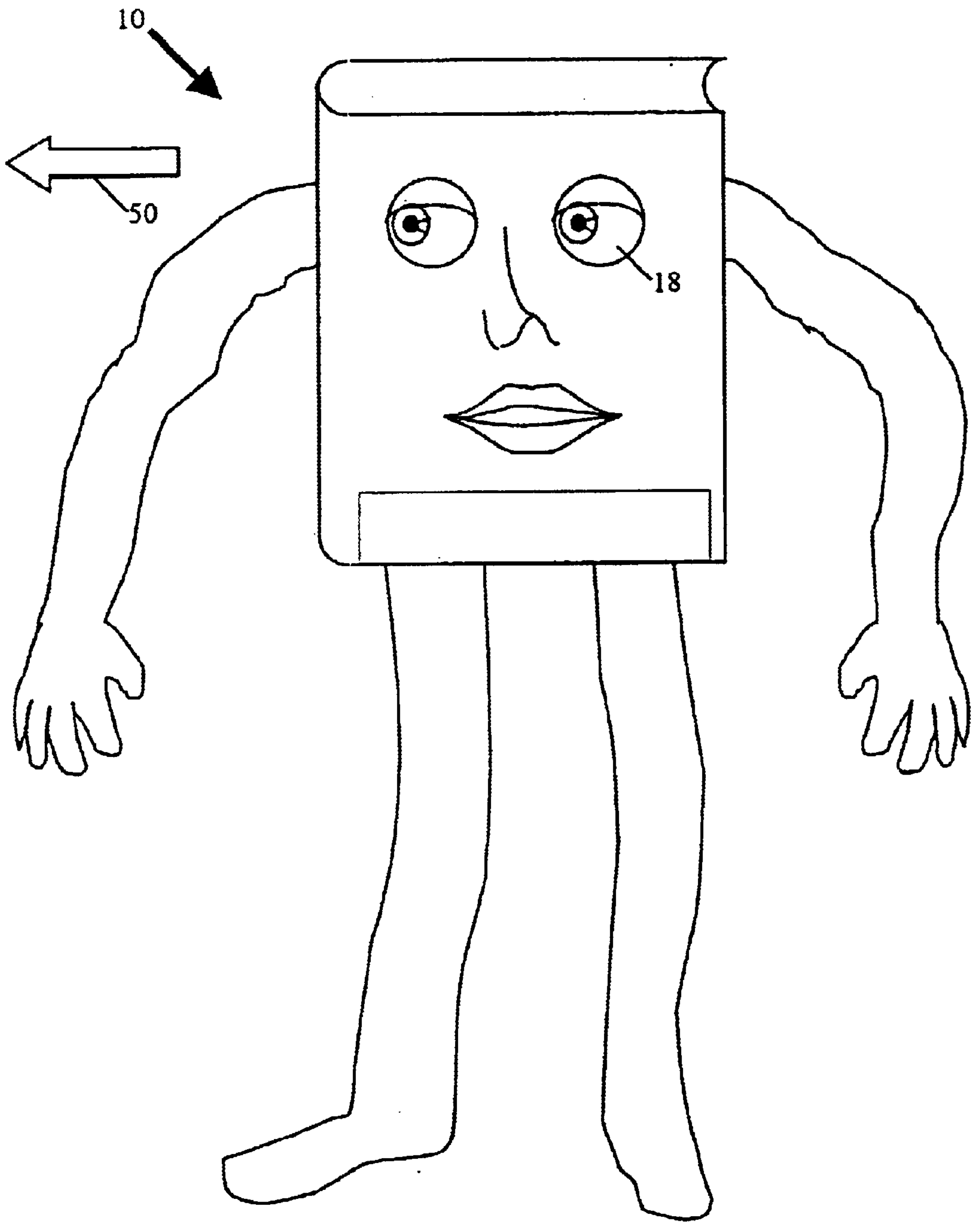
FIGS. 4A, 4B, 4C, 4D and 4E are illustrations of the toy of FIGS. 1A–3 indicating variations in facial expressions thereof.
Figure 4B:
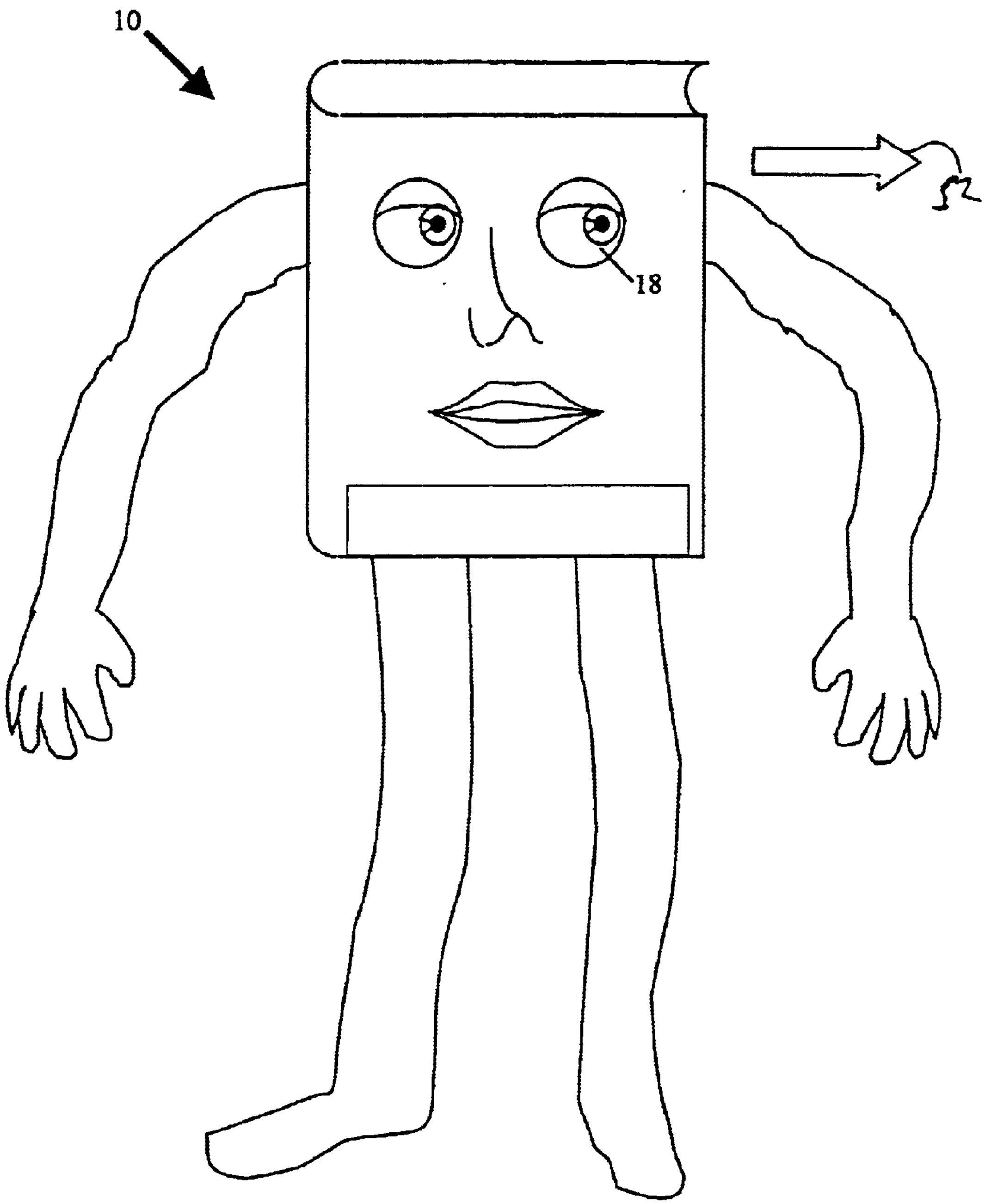
Figure 4C:
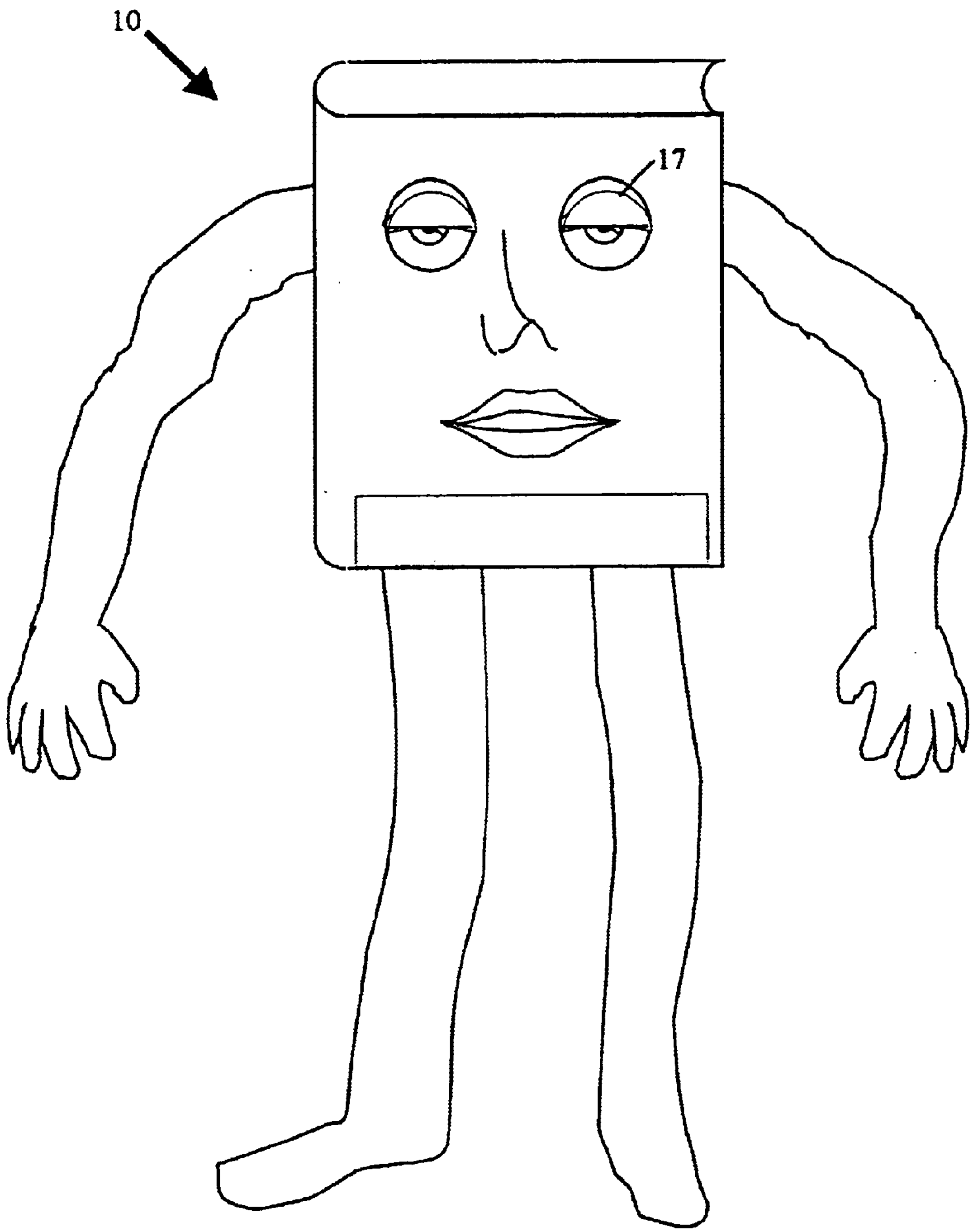
Figure 4D:
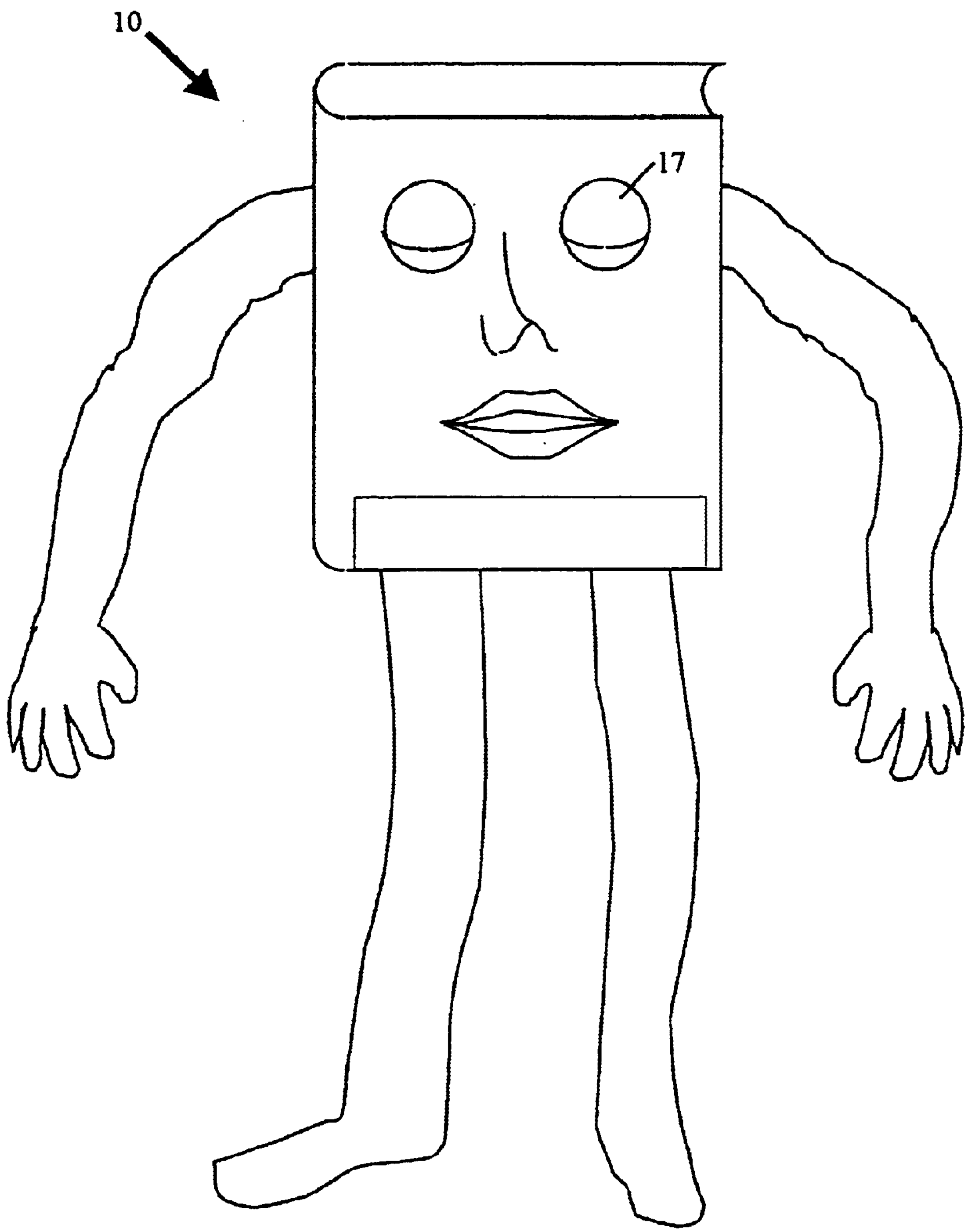
Figure 4E:
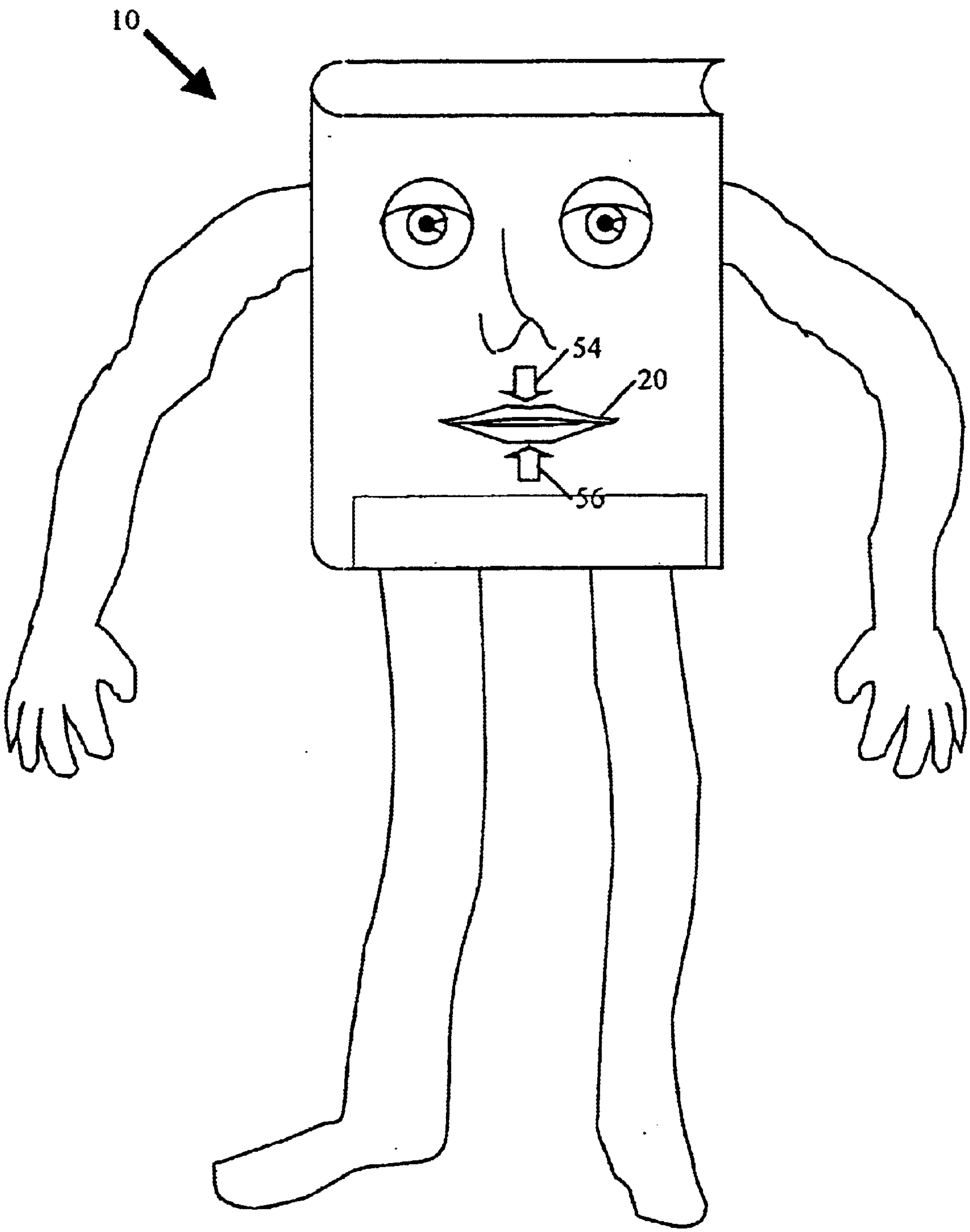

FIGS. 4A, 4B, 4C, 4D and 4E are illustrations of toy 10 of FIGS. 1A–3 indicating variations in facial expressions thereof. FIG. 4A shows eyes 18 moving in the direction indicated by an arrow 50, while FIG. 4B shows eyes 18 moving in the direction indicated by an arrow 52. FIG. 4C shows eyelids 17 having moved to a half-shut position, while FIG. 4D shows eyelids 17 completely shut. FIG. 4E shows the lips of mouth 20 moving in the directions indicated by an arrow 54 and an arrow 56. It is appreciated that one or both lips of mouth 20 may move.

Figure 5:
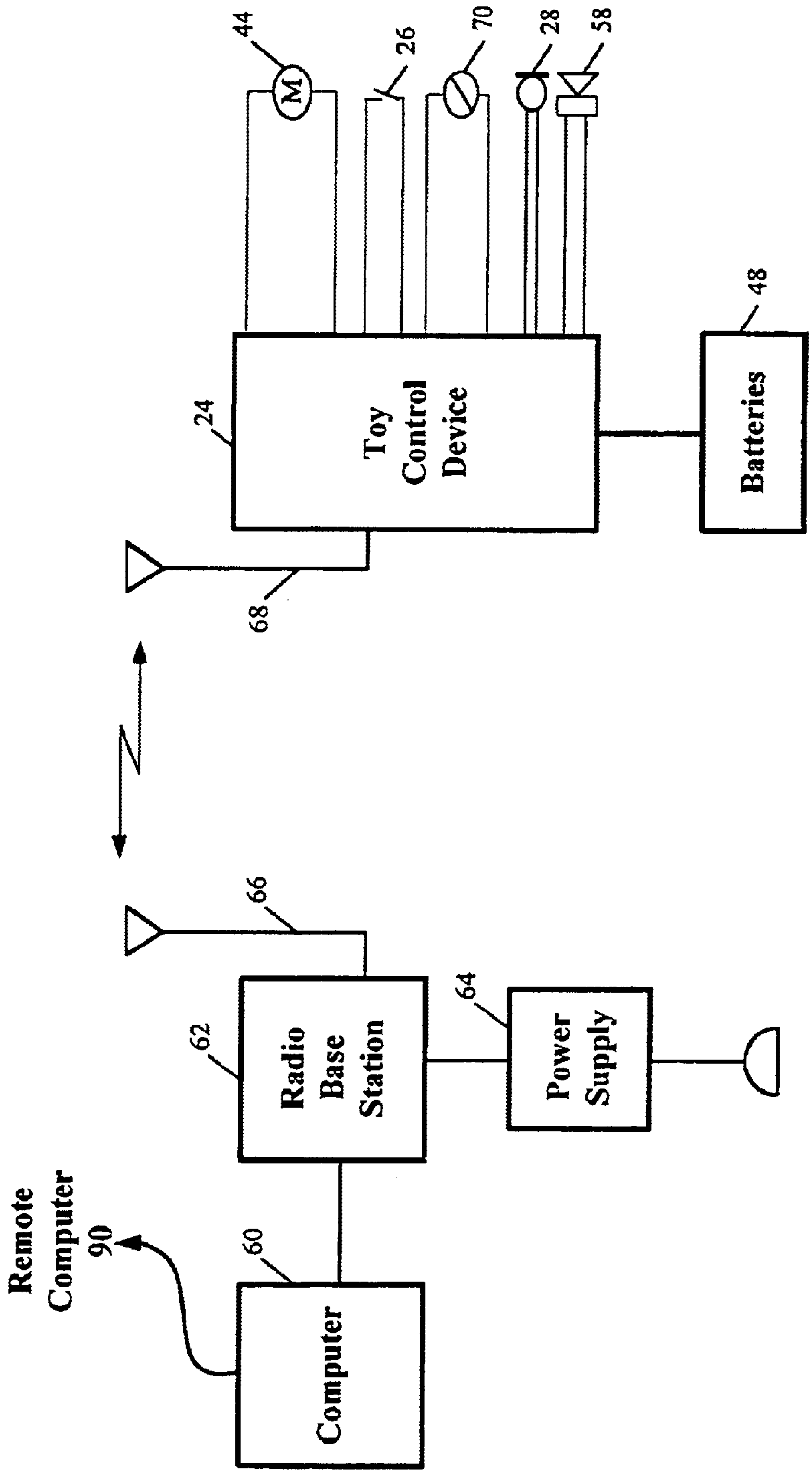
FIG. 5 is a simplified block diagram illustration of the interactive toy apparatus of a preferred embodiment of the present invention.

Reference is now made to FIG. 5 which is a simplified block diagram illustration of the interactive toy apparatus constructed and operative in accordance with a preferred embodiment of the present invention. Typically, a computer 60, such as a personal computer based on the PENTIUM microprocessor from Intel Corporation, is provided in communication with a base communication unit 62, typically a radio-based unit, via a RS-232 serial communications port. It is appreciated that communication between the computer 60 and the base unit 62 may be effected via parallel port, MIDI and audio ports of a sound card, a USB port, or any known communications port. Unit 62 is typically powered by a power supply 64 which may be fed by an AC power source. Unit 62 preferably includes an antenna 66 for communication with toy control device 24 of toy 10 (FIG. 2) which is similarly equipped with an antenna 68. Toy control device 24 typically controls motor 44 (FIG. 3), switches 26 (FIG. 2), one or more movement sensors 70 for detecting motion of toy 10, microphone 28 (FIG. 2), and speaker 58 (FIG. 3). Any of the elements 24, 44, 26, 28, 58 and 70 may be powered by power source 48 (FIG. 3).

Computer 60 typically provides user information storage, such as on a hard disk or any known and preferably non-volatile storage medium, for storing information relating to a user, such as personal information including the user's name, a unique user code alternatively termed herein as a "secret name" that may be a made-up or other fanciful name for the user, typically predefined and selected by the user, the age of the user, etc.

Computer 60 also acts as what is referred to herein as a "content controller" in that it identifies the user interacting with toy 10 and controls the selection and output of content via toy 10, such as via the speaker 58 as is described in greater detail hereinbelow. The content controller may utilize the information relating to a user to personalize the audio content delivered to the user, such as by referring to the user with the user's secret name or speaking in a manner that is appropriate to the gender of the user. Computer 60 also typically provides content storage for storing content titles each comprising one or more content elements used in response to user inputs received via the user input receivers described above with reference to toy 10, in response to environmental inputs, or at random. For example, a content title may be a joke, a riddle, or an interactive story. An interactive story may contain many content elements, such as audio elements, generally arranged in a script for sequential output. The interactive story is typically divided into several sections of content element sequences, with multiple sections arranged in parallel to represent alternative interactive branches at each point in the story. The content controller selects a branch according to a current user input with toy 10, previous branch selections, or other user information such as past interactions, preferences, gender, or environmental or temporal conditions, etc.

Computer 60 may be in communication with one or more other computers, such as a remote computer by various known means such as by fixed or dial-up connection to a BBS or to the Internet. Computer 60 may download from the remote server, either in real-time or in a background or batch process, various types of content information such as entirely new content titles, additional sections or content elements for existing titles such as scripts and voice files, general information such as weather information and advertisements, and educational material. Information downloaded from a remote computer may be previously customized for a specific user such as by age, user location, purchase habits, educational level, and existing user credit.

The content controller may also record and store user information received from a user via a user input receiver such as verbal or other audio user inputs. Computer 60 preferably includes speech recognition capabilities, typically implemented in hardware and/or software, such as the Automatic Speech Recognition Software Development Kit for WINDOWS 95 version 3.0, commercially available from Lernout & Hauspie Speech Products, Sint-Krispisnstraat 7, 8900 Leper, Belgium. Speech recognition may be used by the content controller to analyze speech inputs from a user to determine user selections, such as in connection with an interactive story for selecting a story branch. Speech recognition may also be used by the content controller to identify a user by the secret name or code spoken by the user and received by microphone 28.

The content controller also provides facial expression control. The facial mechanism (FIG. 5) may provide complex dynamic facial expressions by causing the facial features to fluctuate between various positions at different rates. Preferably, each facial feature has at least two positions that it may assume. Two or more facial features may be moved into various positions at generally the same time and at various rates in order to provide a variety of facial expression combinations to generate a variety different emotions. Preferably, the content controller controls the facial feature combinations concurrent with a user interaction or a content output to provide a natural accompanying expression such as lip synchronization and natural eye movements.

The content controller preferably logs information relating to content provided to users and to the interactions between each user and toy 10, such as the specific jokes and songs told and sung to each user, user responses and selections to prompts such as questions or riddles or interactive stories, and other user inputs. The content may utilize the information relating to these past interactions of each user to subsequently select and output content and otherwise control toy 10 as appropriate, such as play games with a user that were not previously played with that user or affect the level of complexity of an interaction.

It is appreciated that computer 60 may be housed within or otherwise physically assembled with toy 10 in a manner in which computer 60 communicates directly with toy control device 24 not via base unit 62 and antennae 66 and 68, such as through wired means or optical wireless communications methods. Alternatively, computer 60 may be electronically integrated with toy control device 24.

Figure 6:
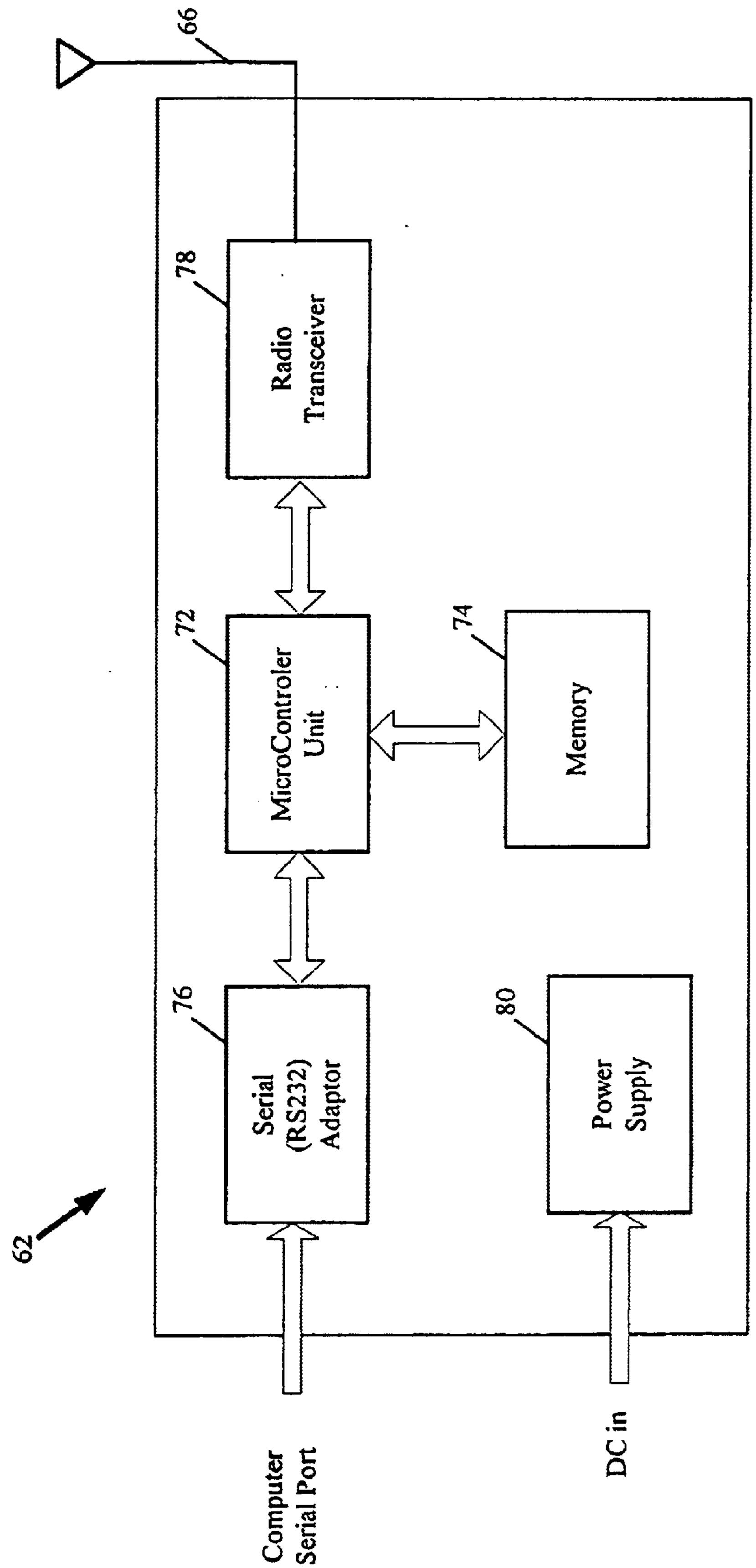
FIG. 6 is a functional block diagram of a base station forming part of the apparatus of FIG. 5.

FIG. 6 is a functional block diagram of base communication unit 62 of FIG. 5. Unit 62 typically comprises a micro controller unit 72 having a memory 74. Unit 72 communicates with computer 60 of FIG. 5 via an adapter 76, typically connected to computer 60 via an RS-232 port or otherwise as described above with reference to FIG. 5. Unit 72 communicates with toy control device 24 of toy 10 (FIG. 2) via a transceiver 78, typically a radio transceiver, and antenna 66.

Figure 7:
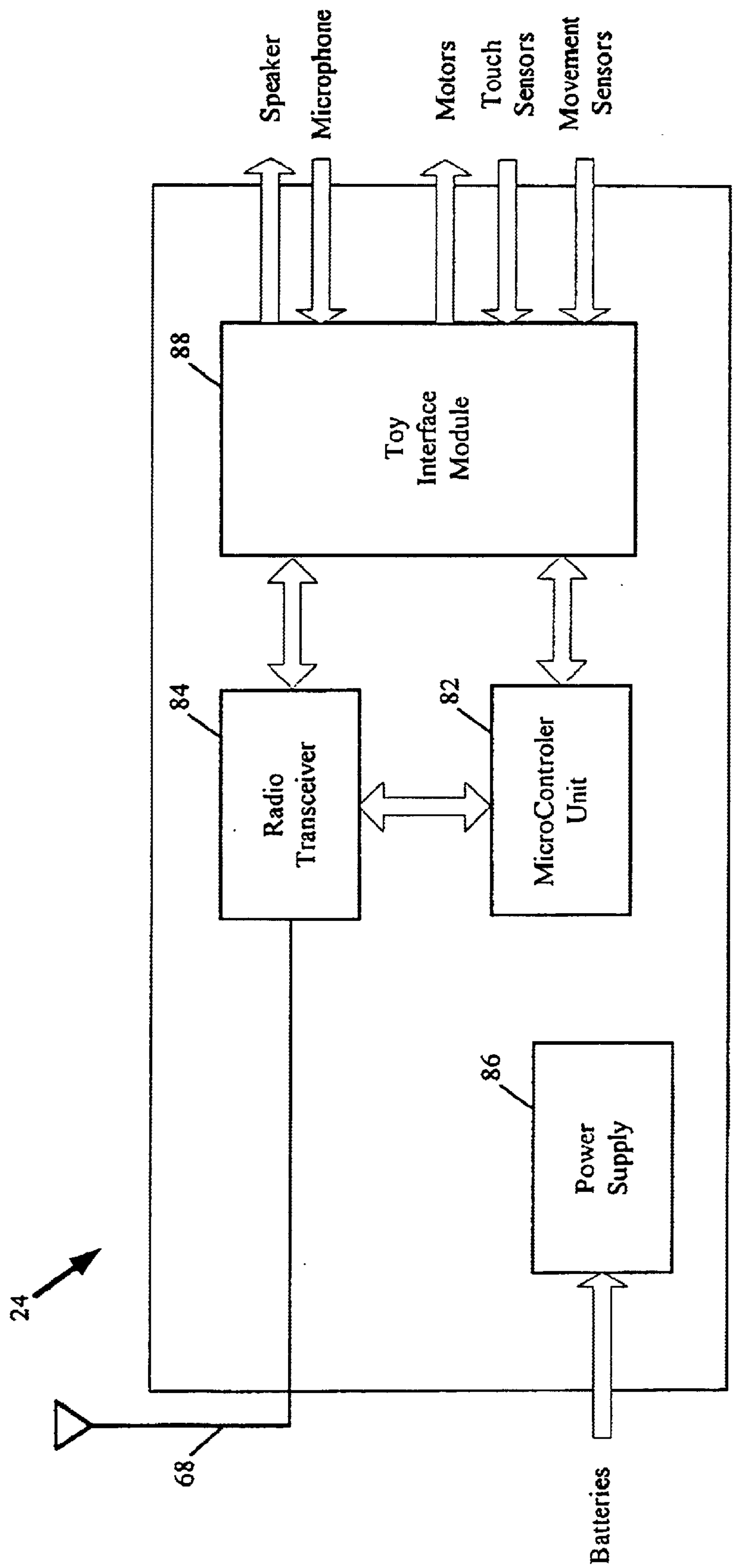
FIG. 7 is a functional block diagram of a circuitry embedded in a toy forming part of the apparatus of FIG. 5.
Figure 8E:
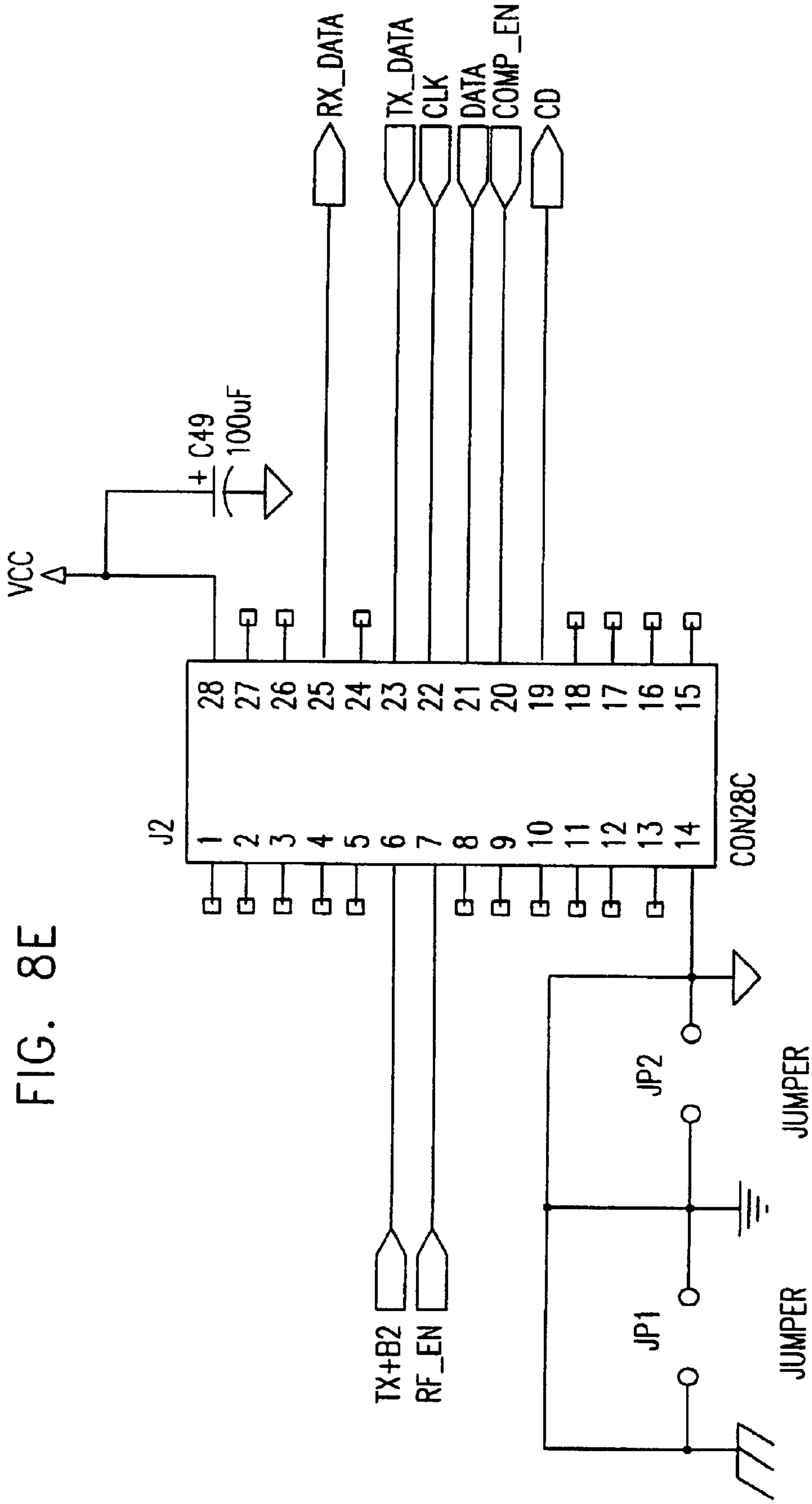
Figure 8F:
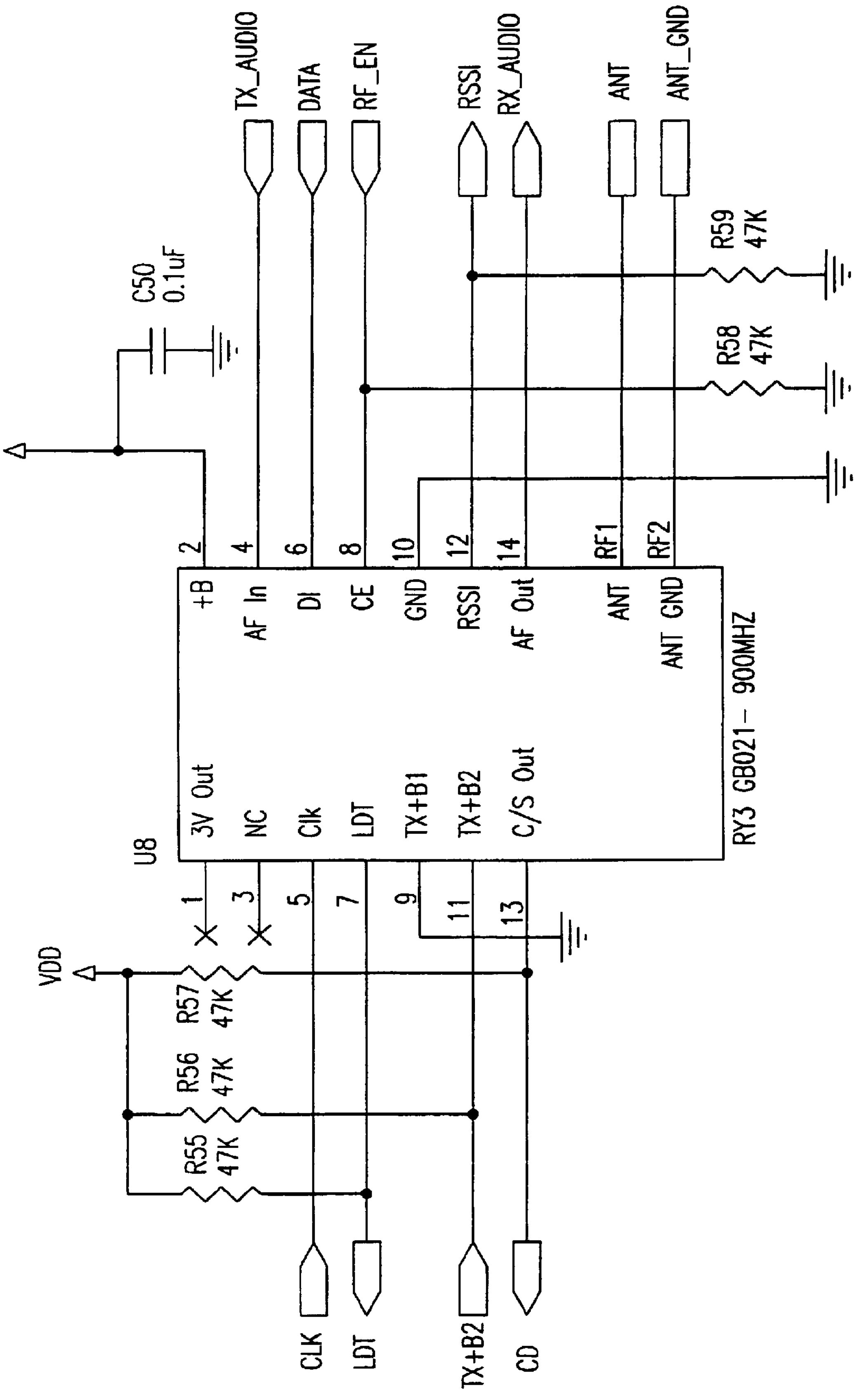
Figure 8L:
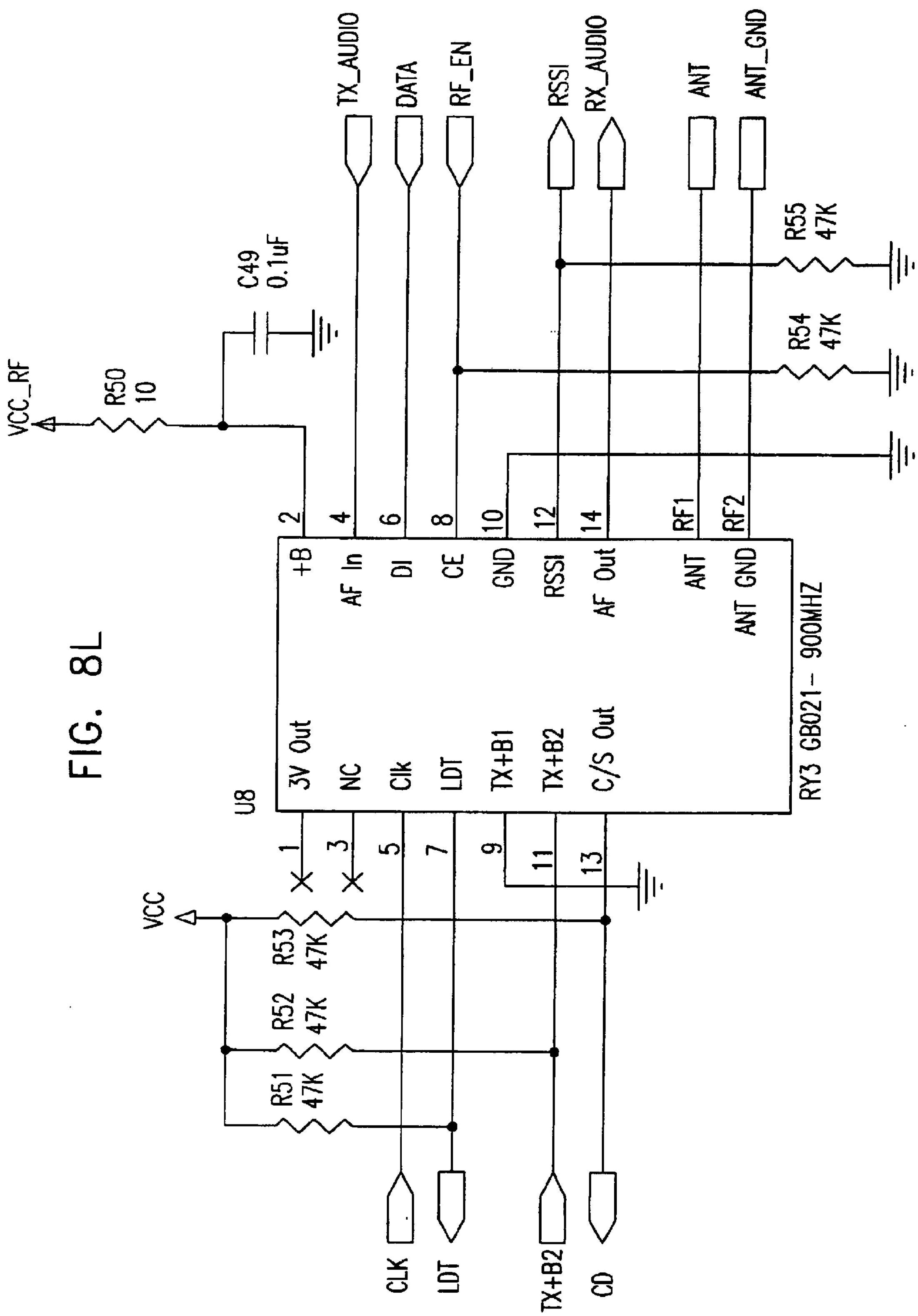
Figure 8M:
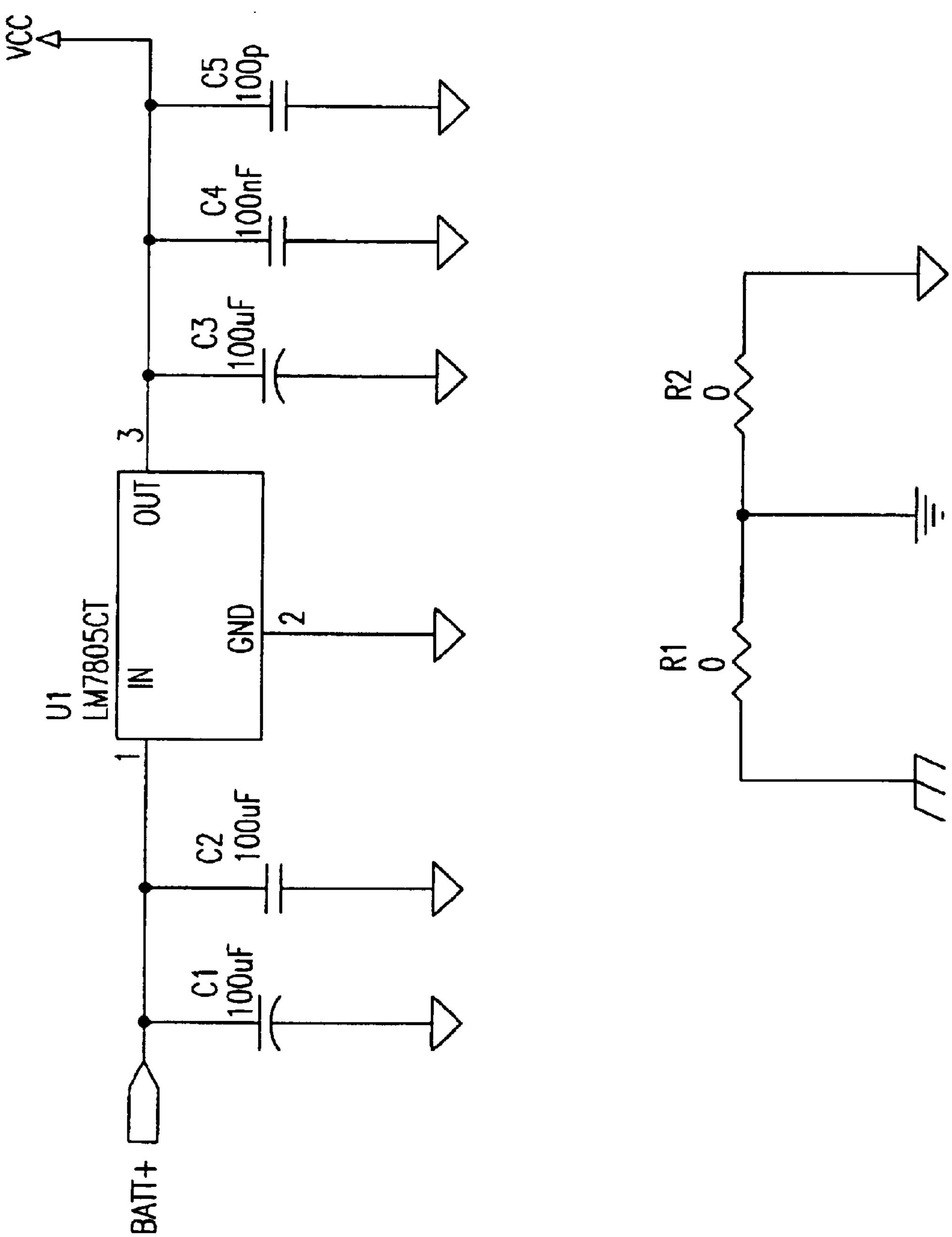
Figure 9F:
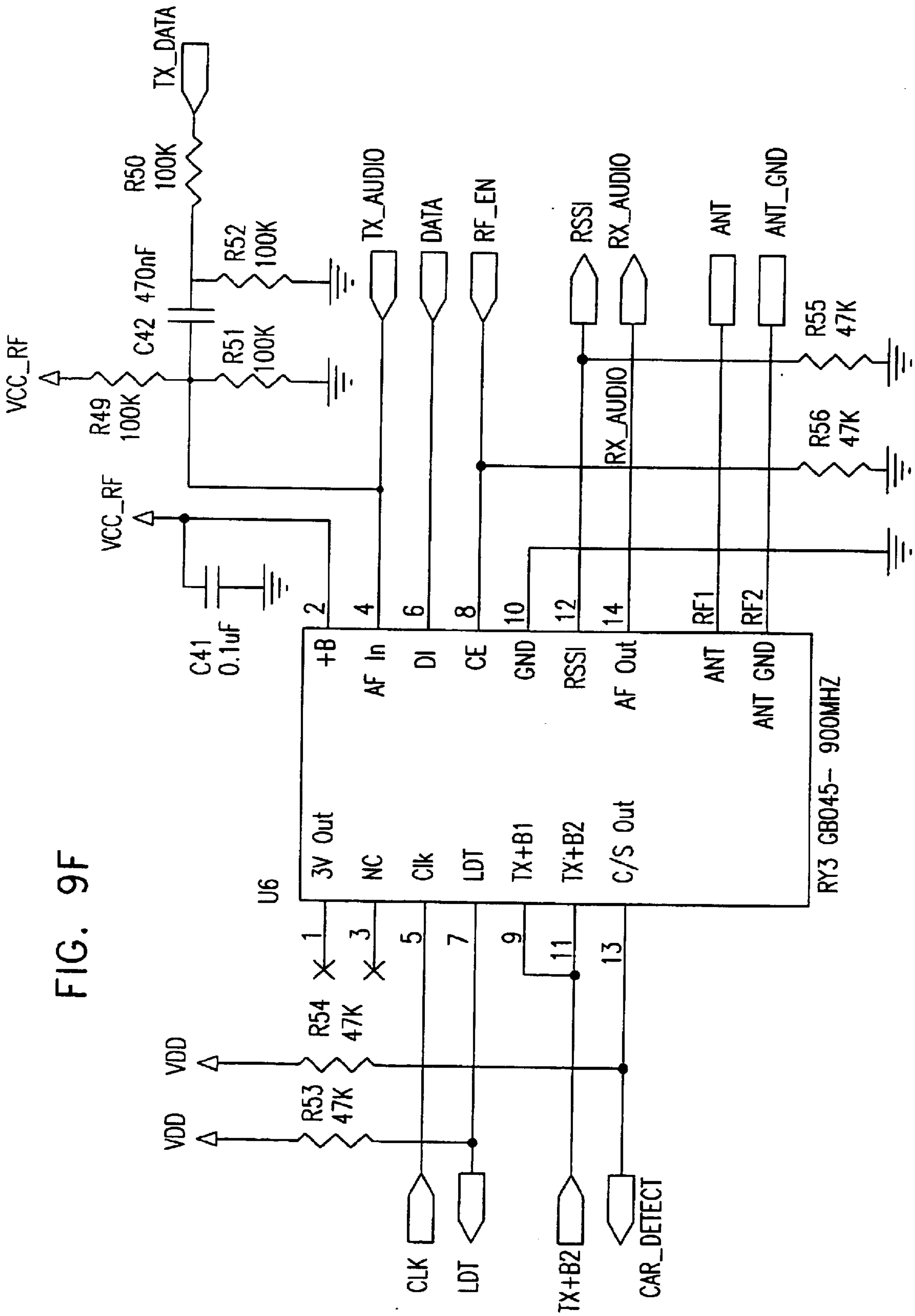
Figure 9G:
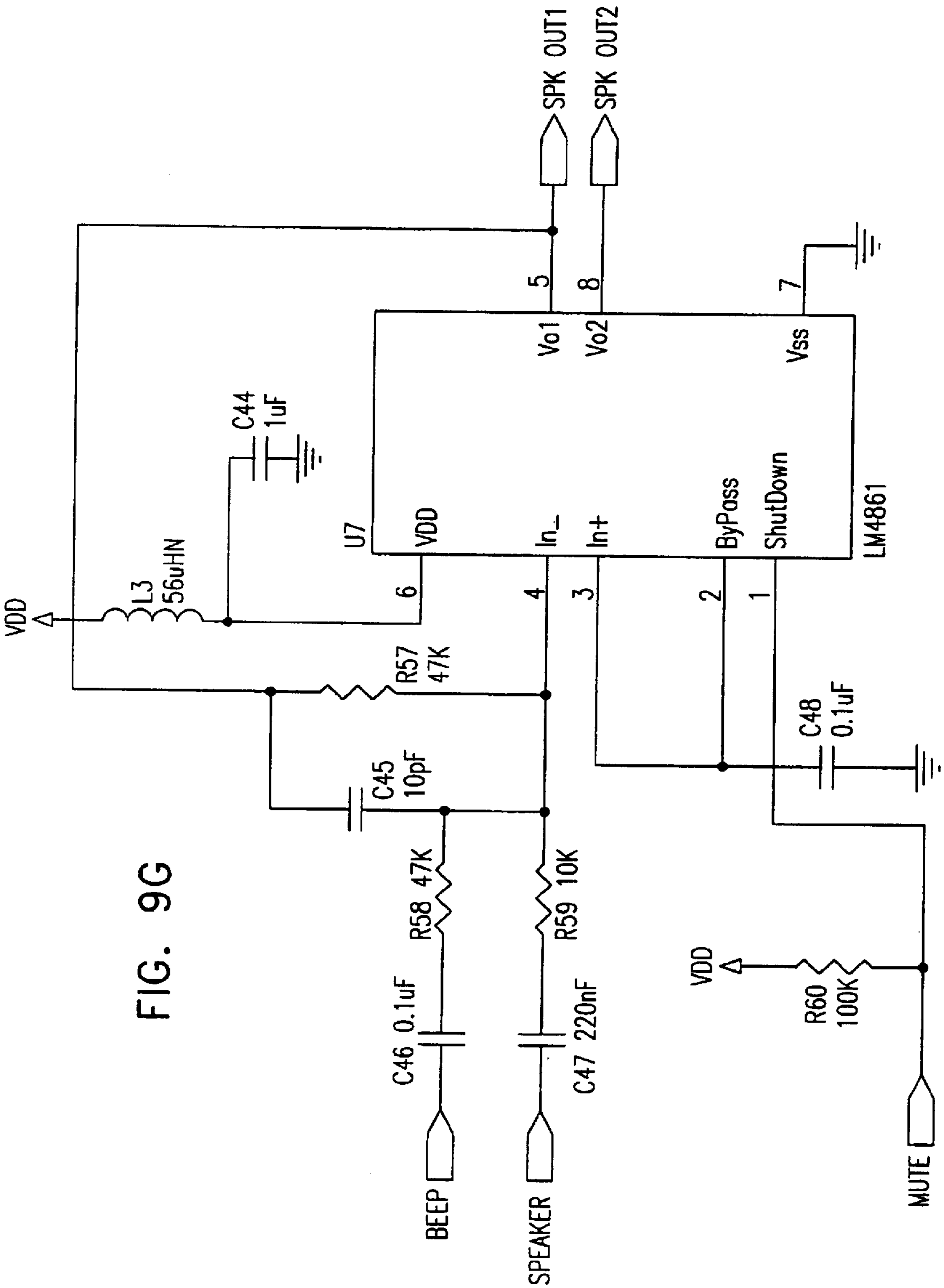
Figure 9L:
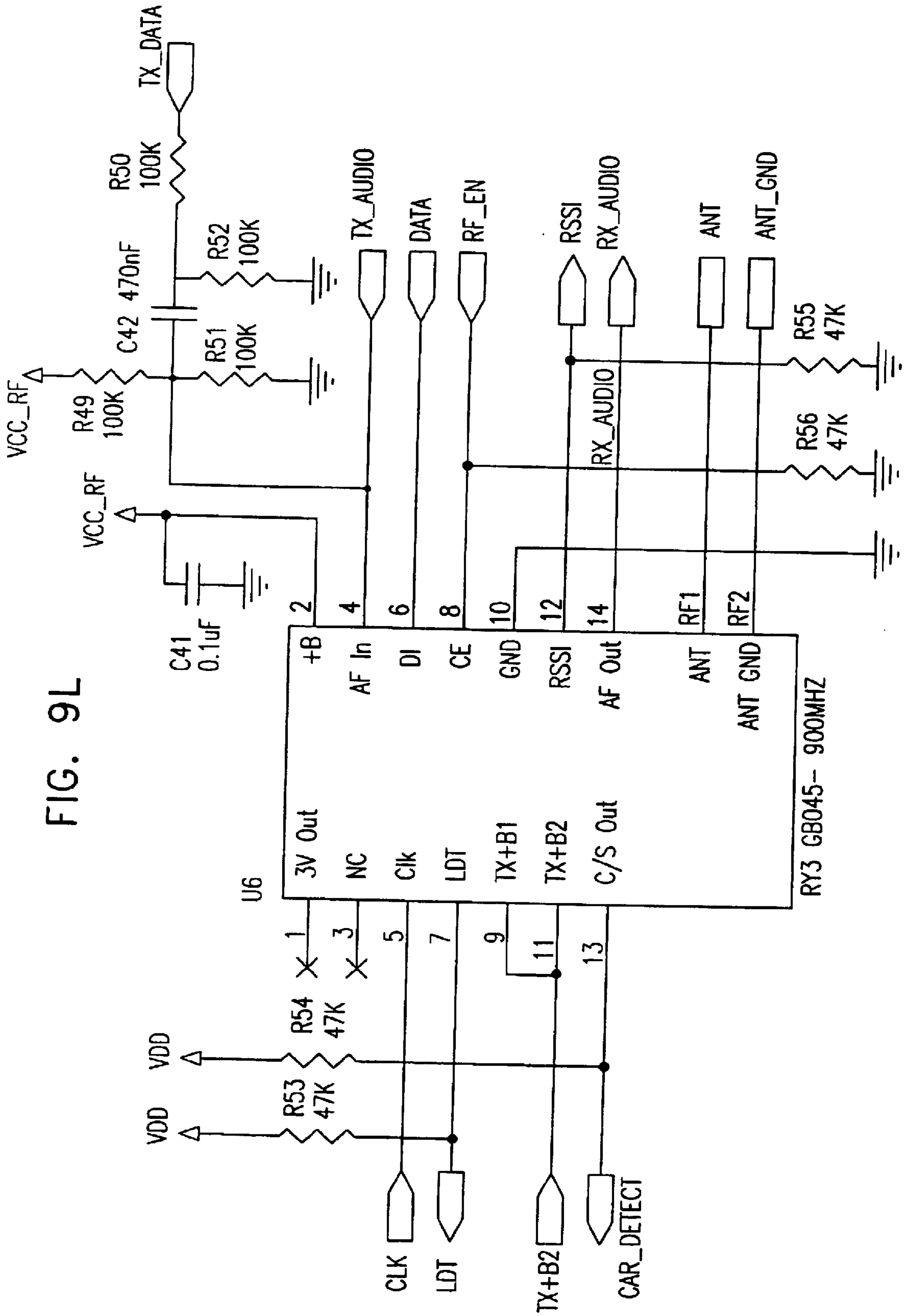
Figure 9M:
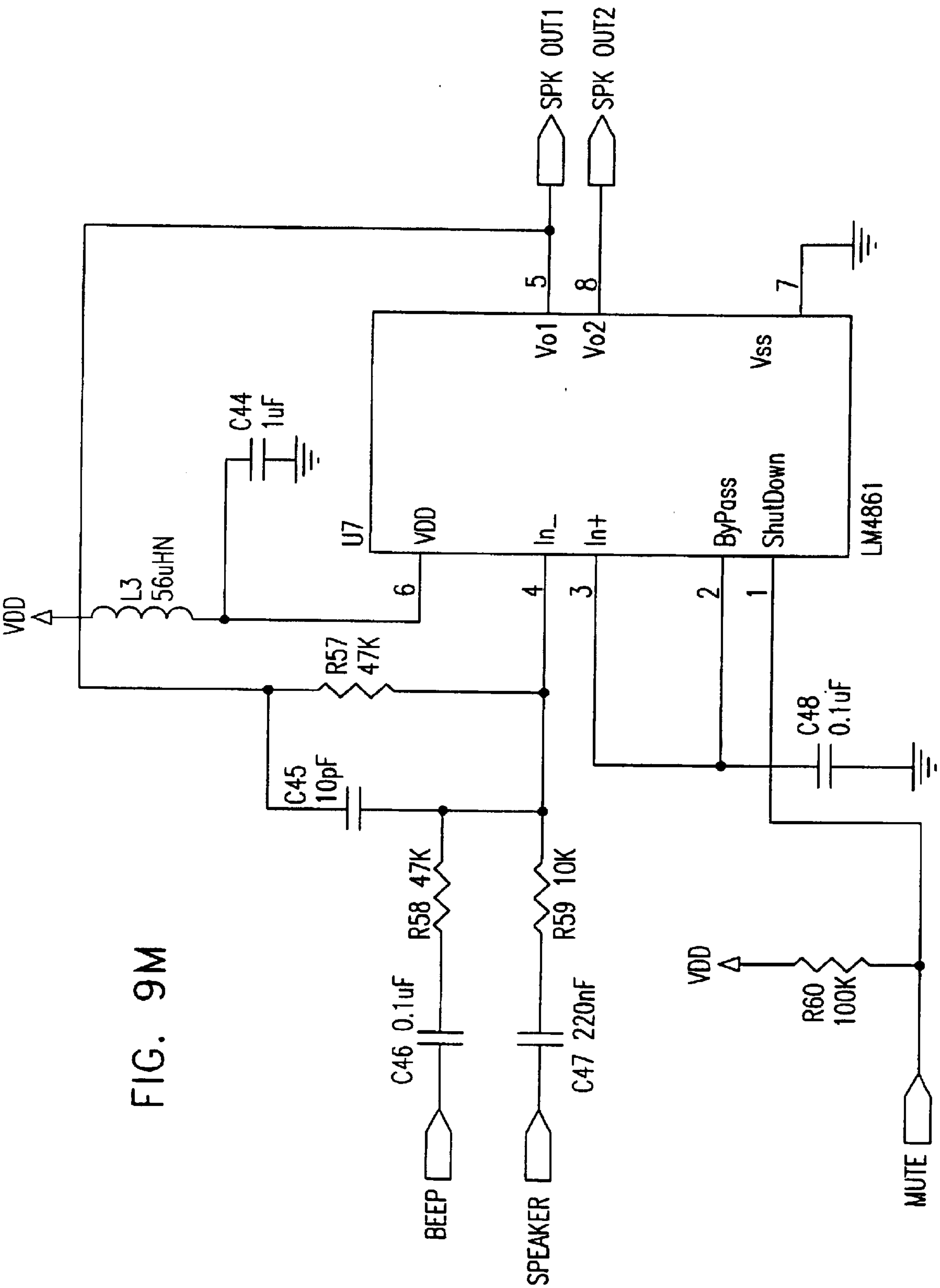

FIG. 7 is a functional block diagram of toy control device 24 of FIG. 5. Device 24 typically comprises a micro controller unit 82 which communicates with base unit 72 of FIG. 5 via a transceiver 84, typically a radio transceiver, and antenna 68. Power is supplied by a power supply 86 which may be fed by power source 48 (FIG. 5). Unit 82 preferably controls and/or receives inputs from a toy interface module 88 which in turn controls and/or receives inputs from the speaker, microphone, sensors, and motors as described hereinabove. Transceiver 84 may additionally or alternatively communicate with interface module 88 for direct communication of microphone inputs and speaker outputs.

Reference is now made to FIGS. 8A–8G, which, taken together, comprise a schematic diagram of base communication unit 62 of FIG. 5. Appendix B is a preferred parts list for the apparatus of FIGS. 8A–8G.

FIGS. 8H–8N, taken together, comprise a schematic diagram of base communication unit 62 of FIG. 5, according to an alternative embodiment.

Reference is now made to FIGS. 9A–9G which, taken together, comprise a schematic diagram of toy control device 24 of FIG. 5. Appendix C is a preferred parts list for the apparatus of FIGS. 9A–9G.

FIGS. 9H–9M, taken together, comprise a schematic diagram of toy control device 24 of FIG. 5, according to an alternative embodiment.

Reference is now made to FIGS. 10–15 which, taken together, are simplified flowchart illustrations of a preferred method of operation of the interactive toy system of FIGS. 1–9G. It is appreciated that the method of FIGS. 10–15 may be implemented partly in computer hardware and partly in software, or entirely in custom hardware. Preferably, the method of FIGS. 10–15 is implemented as software instructions executed by computer 60 (FIG. 5). It is appreciated that the method of FIGS. 10–15, as well as other methods described hereinbelow, need not necessarily be performed in a particular order, and that in fact, for reasons of implementation, a particular implementation of the methods may be performed in a different order than another particular implementation.

FIG. 10 describes the main module of the software and high-level components thereof. Operation typically begins by opening the communication port to the base unit 62 and initiating communication between computer 60 and toy control device 24 via base unit 62. The main module also initiates a speech recognition engine and displays, typically via a display of computer 60, the main menu of the program for selecting various sub-modules. The main module typically comprises the following sub-modules:

1) "About You" is a sub-module that enables a user to configure the system to the users preferences by entering parameters such as the users real name, secret name, age and date of birth, color of the hair and eyes, gender, and typical bed-time and wake-up hours;

2) "Sing Along" is another sub-module that provides specific content such as songs with which the user may sing along;

3) "How To Play" is a sub-module tutorial that teaches the user how to use the system and play with the toy 10;

3) "Play" is the sub-module that provides the interactive content to the toy 10 and directs toy 10 to interact with the user;

5) "Toy Check-Up" is a sub-module that helps the user to solve technical problems associated with the operation of the system, such as the toy having low battery power and lack of sufficient electrical power supply to the base station; and 6) "Exit" is a sub-module that enables the user to cease the operation of the interactive toy system software and clear it from the computers memory.

FIG. 11 shows a preferred implementation of the "open communication" step of FIG. 10 in greater detail. Typical operation begins with initialization of typical system parameters such as setting up the access to the file system of various storage units. The operation continues by loading the display elements, opening the database, initializing the toy and the communication drivers, initializing the speech recognition software engine, and creating separate threads for various concurrently-operating activities such that one user may interact with the toy while another user may use the computer screen and keyboard for other purposes, such as for word processing.

FIG. 12 shows a preferred implementation of the "About You" sub-module of FIG. 10 in greater detail. Typical operation begins when the user has selected the "About You" option of the main menu on the computers screen. The user is then prompted to indicate whether the user is an existing user or a new user. The user then provides the users identification and continues with a registration step. Some or all of the operations shown in FIG. 12 may be performed with verbal guidance from the toy.

FIG. 13 shows a preferred implementation of the registration step of FIG. 12 in greater detail. Typical operation begins by loading a registration data base, selecting a secret name, and then selecting and updating parameters displayed on the computers screen. When the exit option is selected the user returns to the main menu described in FIG. 10.

FIG. 14 shows a preferred implementation of the "Sing Along" sub-module of FIG. 10 in greater detail. Typical operation begins with displaying a movie on the computer screen and concurrently causing all the toys 10 within communication range of the base unit to provide audio content, such as songs associated with the movie, through their speakers. The user can choose to advance to the next song or exit this module and return to the main module, such as via keyboard entry.

FIG. 15 shows a preferred implementation of the "How To Play" and "Play" sub-modules of FIG. 10. Typical operation begins with the initialization of the desired script, described in greater details hereinbelow, minimizing the status window on the computer screen, closing the thread, and returning to the main menu. The computer continues to operate the thread responsible for the operation of the toy, and continues to concurrently display the status of the communication medium and the script on the computer screen.

Reference is now made to FIGS. 16A and 16B which, taken together, form a simplified operational flow chart of one possible implementation of the opening actions of a script executed by the "Play" sub-module of FIG. 10. The implementation of FIGS. 16A and 16B may be understood in conjunction with the following table of action identifiers and actions:

OPENING

| Audio | Text |
|---|---|
| op002 | Squeeze my foot |
| op015m | "Hi! Good morning to you! Wow, what a morning! I'm Storyteller! What's your Secret Name, please? |
| op020m | Hi! Good afternoon! Wow, what an afternoon! I'm Storyteller! What's your Secret Name, please? |
| Op025m | "Hi! Good evening! Wow, what a night. I'm Storyteller! What's your Secret Name, please? |
| op036m | O.K. From now on I'm going to call you RAINBOW. So, hi Rainbow, whaddaya know! O.K., Rainbow, you're the boss. You choose what we do Say: STORY, GAME or SONG. |
| op040m | Ace, straight from outer space! O.K., Ace, you're the boss. You choose what we do Say: STORY, GAME or SONG. |
| Op045m | Rainbow, well whaddaya know! O.K., Rainbow, you're the boss. You choose what we do. Say: STORY, GAME or SONG. |
| Op050m | Bubble Gum, well fiddle de dum! O.K., Bubble Gum, you're the boss. You choose what we do. Say: STORY, GAME or SONG. |
| op060 | Don't be shy. We'll start to play as soon as you decide. Please say out loud: STORY, GAME or SONG. |

Typical operation of the method of FIGS. 16A and 16B begins by playing a voice file identified in the above table as op002. This is typically performed by instructing the toy to begin receiving a voice file of a specific time length. The voice file is then read from the storage unit of the computer and communicated via the radio base station to the toy control device that connects the received radio input to the toys speaker where it is output. Voice file op002 requests that the user press the microswitch located in the nose or the foot of the toy.

If the user presses the microswitch the script then continues by playing either of voice files op015m, op020m or op025m, each welcoming the user in accordance with the current time of the day, and then requests that the user pronounce his or her secret name to identify himself or herself to the system. The script then records the verbal response of the user for three seconds. The recording is performed by the computer, by sending a command to the toy to connect the toy's microphone to the toys radio transmitter and transmit the received audio input for three seconds. The radio communication is received by the radio base station, communicated to the computer and stored in the computer's storage unit as a file. The application software then performs speech recognition on the recorded file. The result of the speech recognition process is then returned to the script program. The script continues according to the user response by playing a personalized welcome message that corresponds to the identified secret name or another message where an identification is not successfully made. This welcome message also requests the user to select between several options such as a story, a game or a song. The selection is received by recording the user verbal response and performing speech recognition. More detailed description of a simplified preferred implementation of a story, a game, and a song are provided in FIGS. 17A to 17E, 18A to 18G, and 19A to 19C respectively.

FIGS. 17A–17E, taken together, form a simplified operational flow chart of one possible implementation of a story by the "Play" sub-module of FIG. 10. The implementation of FIGS. 17A–17E may be understood in conjunction with the following table of action identifiers and actions:

STORY MENU

| Audio | Text |
|---|---|
| stm105 | "Hey Ace, it looks like you like stories as much as I do. I know a great story about three very curious bunnies |
| stm110 | "Hey Rainbow, it looks like you like stories as much as I do. I know a great story about three very curious bunnies. |
| Stm115 | "Hey Bubble Gum, it looks like you like stories as much as I do. I know a great story about three very curious bunnies. |
| stm125m | A story What a great idea! I love stories! Let's tell one together. Let's start with "Goldilocks and the Three Bears." |
| Stm130m | Once upon a time, there was a young girl who got lost in the forest. Hungry and tired, she saw a small, cozy little house. The door was open, so she walked right in. |
| stm135m | On the kitchen table were three bowls of porridge. She walked up to one of the bowls and put a spoonful of porridge in her mouth. |
| Stm140m | Oooh! You tell me. How was the porridge? Too Hot, Too Cold or Just Right? Go ahead, say the words: TOO HOT, TOO COLD, or JUST RIGHT |
| stm150 | (Sputtering) Too hot! That was Papa Bear's bowl. The porridge was too hot. |
| Stm155 | (Sputtering) Too cold! That was Mama Bear's bowl. The porridge was too cold. |
| Stm160 | Hmmm. Just right! That was Baby Bear's bowl. The porridge was just right! And Goldilocks ate it all up! |
| stm170 | Telling stories with you makes my day! Do you want to hear another story? Say: YES or NO. |
| stm180 | If you want to hear another story, just say YES. If you want to do something else, just say NO. |
| stm195 | I'm going to tell you a story about three very curious little bunnies. |
| stm205m | Uh-oh! It looks like the bunnies are in a bit of trouble! Do you want to hear the rest of the Bunny story now? Say YES or NO |
| stm206m | Remember the Bunny story? The bunnies wrer eating something yummy, and then they heard someone coming Do you want to hear what happens? Say YES or NO. |
| stm215m | If you want to hear the rest of the Bunny story, say YES. If you want to do something else, say NO. |
| stm225 | No? - OK, that's enough for now. Remember that you can play with the Funny Bunny Booklet whenever you want. Let's see, what would you like to do now? |
| Stm230 | Would you like to play a game or hear a song now? Say GAME or SONG. |
| stm245 | Now, let's play a game or sing a song. You decide Please - GAME or SONG. |

FIGS. 18A–18E, taken together, form a simplified operational flow chart of one possible implementation of a game script executed by the "Play" sub-module of FIG. 10. The implementation of FIGS. 18A–18E may be understood in conjunction with the following table of action identifiers and actions:

GAME MENU

| Audio | Text |
|---|---|
| gm805 | Hey Ace, so you're back for more games. Great! Let's play the Jumble Story again |
| gm810 | Hey Rainbow, so you're back for more games Great! Let's play the Jumble Story again |
| Gm815 | Hey Bubble Gum, so you're back for more games Great! Let's play the Jumble Story again. |
| Gm820m | A game! What a great idea! I love playing games Especially games that come out of stories. |
| Gm840 | This game is called Jumble Story The story is all mixed up and you're going to help me fix it |
| Gm845m | Listen to the sentences I say when you squeeze my nose, my hand or my foot Then squeeze again in the right order so that the story will make sense |
| gm847m | Here goes, Press my nose please. |
| gm855m | (sneezes) oh, sorry. (sniffles) it's o.k. now, you can press my nose. |
| Gm860 | A woman came to the door and said she was a princess |
| gm865m | "O.k. - now squeeze my foot" |
| gm875m | "Don't worry, I won't kick. Squeeze my foot please." |
| Gm890 | Soon after they got married and lived happily ever after |
| gm895 | One more, now squeeze my hand please. |
| gm905m | "Just a friendly squeeze shake if you please." |
| Gm910 | Once upon a time, a prince was looking for a princess to marry |
| gm915 | "Now try to remember what you squeezed to hear each sentence. Then squeeze my hand, my foot or press my nose in the right order to get the story right." |
| gm921 | A woman came to the door and said she was a princess |
| gm922 | Soon after they got married and lived happily ever after |
| gm923 | Once upon a time, a prince was looking for a princess to marry |
| gm924 | If you want to play the Jumble Story, press my nose, squeeze my hand and squeeze my foot in the right order. |
| Gm925 | The right order is HAND, NOSE then FOOT. Try it. |
| gm926m | "You did it! Super stuff! What a jumble Story player you are!" |
| gm930m | "And that's the way the story goes! Now it's not a jumbled story anymore! In fact, it's the story of the "Princess and the Pea." If you want, I can tell you the whole story from beginning to end What do you say: YES or NO?" |
| gm932 | "You played Jumble Story very well! Do you want to play a different game now? Say YES or NO." |
| gm933 | We can try this game another time Do you want to play a different game now? Say YES or NO |
| gm940 | "OK, then, enough games for now There's so much more to do Should we tell a story or sing a song? Say. STORY or SONG. |
| gm945 | You tell me what to do! Go ahead. Say. STORY or SONG |
| gm965m | This is another of my favorite games. It's called the Guessing Game. |
| gm970 | OK, let's begin I'm thinking about something sticky Guess - Is it A LOLLIPOP or PEANUT BUTTER? Say LOLLIPOP or PEANUT BUTTER. |
| gm972 | Guess which sticky thing I'm thinking about. A LOLLIPOP or PEANUT BUTTER |
| gm975 | That's right! I'm thinking about a lollipop It's sticky and it also has a stick. |
| Gm980 | That's right! I'm thinking about Peanut Butter that sticks to the roof of your mouth. |
| gm984 | That was fantasticky. Let's try another What jumps higher a RABBIT or a Bear? Say RABBIT or BEAR. |
| gm982 | Let's see. What jumps higher - a RABBIT or a BEAR |
| gm985m | A rabbit, that's right, a rabbit jumps (SERIES OF BOINGS) with joy unless it is a toy. |
| Gm990 | I'd like to see a bear jump but I'd hate to have it land on me. |
| gm1005 | That was excellent game playing. Let's try something different. How about a story or a song now? You tell me. STORY or SONG. |
| gm997 | Choose what we shall do Say STORY or SONG |

FIGS. 19A–19C, taken together, form a simplified operational flow chart of one possible implementation of a song script executed by the "Play" sub-module of FIG. 10. The implementation of FIGS. 19A–19C may be understood in conjunction with the following table of action identifiers and actions:

SONG MENU

| Audio | Text |
|---|---|
| sng305 | "In the mood for a song, Ace from outer space? Super! Let's do the porridge song again Come on Sing along with me." |
| sng310 | "In the mood for a song, Rainbow well whaddaya know? Super! Let's do the porridge song again. Come on. Sing along with me." |
| Sng315 | "In the mood for a song, Bubble Gum, fiddle de dum? Super! Let's do the porridge song again. Come on Sing along with me." |
| Sng320 | A song, a song, we're in the mood to sing a song |
| sng prog | Short "Pease Porridge" |
| sng370 | "Do you want me to sing the rest of the song? Just say. YES or NO. |
| sng390 | That song reminds me of the Goldilocks story. Remember? - Goldilocks liked her porridge JUST RIGHT! |
| sng395 | "I just thought of another great song. We can hear another song, play a game, or tell a story. Just say SONG or GAME or STORY |
| sng410 + SNG_HAND | All right. We're going to do a great song now. Here goes . . . " [SINGS short HEAD AND SHOULDERS] |
| sng415 | What a song! What a great way to get some exercise! Do you want to play a game or hear a story now? Say: GAME or STORY |
| sng425 | I'm in the mood for a great game or a cool story. You decide what we do. Tell me: GAME or STORY |

FIGS. 20A–20C, taken together, form a simplified operational flow chart of one possible implementation of the "Bunny Short" story script of FIGS. 17A–17E and executed by the "Play" sub-module of FIG. 10. The implementation of FIGS. 20A–20C may be understood in conjunction with the following table of action identifiers and actions:

BUNNY SHORT

| Text | Audio |
|---|---|
| music | rb3005m |
| (Sighing) "Dear me," said the Hungry Woman as she looked in her cupboard. (Squeaky noise of cupboard opening). It was nearly empty, with nothing left except a jar of . . . You decide what was in the jar? HONEY, PEANUT BUTTER or MARSHMALLOW FLUFF? | Rb005m |
| You decide what was in the jar. Say HONEY, PEANUT BUTTER or MARSHMALLOW FLUFF | rb015 |
| It was HONEY | rb026 |
| Honey!! Sweet, delicious, sticky honey, made by bees and looooved by bears. | rb0301 |
| Peanut butter!! Icky, sticky peanut butter that sticks to the roof of your mouth. | rb0302 |
| Marshmallow fluff. Gooey, white, and sticky inside-out marshmallows that tastes great with peanut butter! | rb0303 |
| She reached up high into the cupboard for the one jar which was there. (Sound of woman stretching, reaching.), but she wasn't very careful and didn't hold it very well . . . the jar crashed to the floor, and broke. (Sound of glass crashing and breaking.) | rb3050m |
| And sticky Honey started spreading all over the floor. | rb3055 |
| And sticky Peanut butter started spreading all over the floor. | rb3060 |
| And sticky Marshmallow fluff started spreading all over the floor. | rb3065 |
| "Now I have to clean it up before the mess gets worse, so where is my mop?" [Sounds of doors opening and closing.] Oh, yes! I lent the mop to the neighbor, Mr. Yours-Iz-Mine, who never ever returns things. | rb090m |
| She put on her going-out shoes and rushed out of the house | rb3075 |
| Then, a tiny furry head with long pointed ears, a pink nose and cotton-like tail popped up over the window sill. (Sound effect of something peeping, action.) | |
| What do you think it was? An elephant? A mouse? or A | rb110 |

-continued

BUNNY SHORT

| Text | Audio |
|---|---|
| bunny? You tell me: GIRAFFE, ELEPHANT, or BUNNY. | |
| no . . . Elephants have long trunks, not long ears | rb120 |
| no . . . Giraffes have long necks, not long ears. | Rb125 |
| It was a bunny! The cutest bunny you ever did see! And the bunny's name was BunnyOne. | Rb130 |
| BunnyOne peeked over the window-sill, Sniff, sniff, went the BunnyOne's nose. (Sniffing) There's something yummy-smelling in here." | rb3105 |
| Now when bunnies get excited, they start hopping up an down which is exactly what BunnyOne started to do. | Rb195 |
| Can you hop like a bunny? When I say, "BOING," hop like a bunny. Everytime I "Boing" you hop again. When you want to stop, squeeze my hand. | rb200 |
| 3-boings | 3-boings |
| While BunnyOne was boinging away, another bunny came around. BunnyTwo, was even more curious than BunnyOne and immediately peeked over the window sill. "Hey, BunnyOne," BunnyTwo said | rb220m |
| Let's go in and eat it all up. "Oh, I don't know if that's a good idea . . . " said BunnyOne. "We could get into trouble". | rb230 |
| music | 231m |
| No sooner had BunnyOne said that, when a third pair of long ears peeked over the windowsill. Who do you think that was? | Rb235 |
| Right you are! How did you know that! This is fun, we're telling the story together! | Rb245 |
| His name was BunnyThree! | rb3155 |
| BunnyThree looked at BunnyOne and BunnyTwo and he hopped smack in the middle of the honey And started licking away | rb3160 |
| BunnyThree looked at BunnyOne and BunnyTwo and he hopped smack in the middle of the peanut butter. And started licking away | rb3165 |
| BunnyThree looked at BunnyOne and BunnyTwo and he hopped smack in the middle of the marshmallow fluff. And started licking away | rb3170 |
| BunnyOne and BunnyTwo saw BunnyThree licking away and hopped in as well. | rb3175 |
| But even as the three bunnies were nibbling away at the honey, they heard footsteps. | rb2751 |
| But even as the three bunnies were nibbling away at the peanut butter, they heard footsteps. | rb2752 |
| But even as the three bunnies were nibbling away at the marshmallow fluff, they heard footsteps. | rb2753 |
| music | rb280m |

FIGS. 21A–21F, taken together, form a simplified operational flow chart of one possible implementation of the "Bunny Long" story script of FIGS. 17A–17E and executed by the "Play" sub-module of FIG. 10. The implementation of FIGS. 21A–21F may be understood in conjunction with the following table of action identifiers and actions:

BUNNY LONG

| Text | Audio |
|---|---|
| (Suspenseful music) | rb280m |
| "hey Bunnies - let's go" whispered BunnyOne, who as we know was the most cautious of the bunch. "Yeah, we're out of here" answered BynnyTwo and BunnyThree. But as they tried to get away, they saw to their dismay, that they were - - - stuck | rb285 |
| Stuck in a honey puddle | rb2901 |
| Stuck in peanut butter freckle-like blobs | rb2902 |
| Stuck in a gooey cloud of sticky marshmallow fluff. | rb2903 |
| "What do we do?" asked BunnyTwo? | Rb295 |
| (aside) BUBLLE GUM, don't worry, these three rabbits always manage to get away | rb2961 |
| (aside) ACE, don't worry, these three rabbits always manage to get away | rb2962 |

-continued

BUNNY LONG

| Text | Audio |
|---|---|
| (aside) RAINBOW, don't worry, these three rabbits always manage to get away | rb2963 |
| | rb297m |
| The door opened, and in walked the Hungry Man, who had met the Hungry Woman coming back with the mop from YoursIsMines house. | rb300 |
| "So you mean to tell me that all we have for dinner is bread and honey | rb3051 |
| "So you mean to tell me that all we have for dinner is bread and peanut butter | rb3052 |
| "So you mean to tell me that all we have for dinner is bread and marshmallow fluff | rb3053 |
| That's not even enough for a Rabbit?" Which was what he said when he walked into the door and saw the three bunnies stuck to the floor. | Rb315 |
| Short music | rb316m |
| "Sweetie, I should have known you were kidding but you should never kid around with me when I'm hungry. Rabbit for dinner - my favorite." | Rb320 |
| "Hey, let's go," whispered BunnyOne. "Yeah, we've got to get out of here," whispered BunnyTwo and Bunny Three. But when they tried to move, they found their feet firmly stuck. | Rb330 |
| The Hungry Woman came in, she had no idea what the Hungry Man was talking about, until she saw the rabbits and said: "(giggle) - yes dear, I was just joking. Yummy rabbits for you dinner. Why don't, you catch the rabbits while I get wood for a fire." | Rb335 |
| "No need to catch them," said the Hungry Man. "Those rabbits are good and stuck . . . right where they are. I'll go out to the garden and pick some potatoes. By the time the fire is hot, I'll be back to help you put the rabbits in the pot. And he hurried off. | rb345 |
| (Sounds of footsteps receding, door shutting.) | rb346m |
| "What are we going to do?" asked BunnyThree - he wasn't so brave any more. "Let's try to jump out" said BunnyOne. So they tried to (boing - distorted) and tried to (boing) but they couldn't budge. | Rb350m |
| The Hungry Woman and Hungry Man came in with wood for the fire. They were whistling happily because they knew they were going to eat well. They started the fire and put on a pot of water, whistling as the fire grew hotter (whistling in the background). All this time, the rabbits stood frozen like statues. | Rb355m |
| Can you stand as still as a statue? If you want to practice being a statue, just like the bunnies, squeeze my hand and then stand still. When you're finished being a statue, squeeze my hand again. | Rb360 |
| "Right, so now you're a statue and I'll wait until you squeeze my hand." | rb370 |
| "Squeeze my hand before you play Statue." | rb375 |
| That was a long time to be a statue. | rb382 |
| "A little more wood and the fire will be hot enough to cook in," the Hungry Woman said to her husband, and they both went out to gather more wood. | rb385 |
| (sound effect) | rb386 |
| "Did you hear that?" whispered BunnyTwo fiercely. "What oh what are we going to do?" "Let's try to jump one more time," said BunnyOne. | Rb390 |
| Rainbow, You know, you can help them. When you hear [BOING], hop as high as you can. | Rb395m |
| Ace, You know, you can help them. When you hear [BOING], hop as high as you can. | Rb400m |
| Bubble gum, You know, you can help them. When you hear [BOING], hop as high as you can. | Rb405m |
| Sound of BOING] And up the bunnies hopped. [BOING] And again they hopped. [BOING] And again they hopped. | Rb410m |
| One more [BOING] and they were free of the puddle of honey. | rb4151m |
| One more [BOING] and they were free of the peanut butter blob. | rb4152m |
| One more [BOING] and they were free of the marshmallow fluff sticky cloud. | rb4153m |
| You know why? Because as the fire grew hotter, the honey grew thinner, thin enough for the rabbits to unstick their feet. | rb4201 |
| You know why? Because as the fire grew hotter, the peanut butter grew thinner, thin enough for the rabbits to unstick their feet. | rb2402 |
| You know why? Because as the fire grew hotter, the marshmallow fluff grew thinner, thin enough for the rabbits to unstick their feet. | Rb4203 |
| One more [BOING] and they were on the window sill, and then out in the garden and scurrying away. | Rb425m |
| (music) | rb426m |
| Just then, the Hungry Man and the Hungry Woman walked in the door with the wood and potatoes, singing their favorite song (Peas Porridge Hot in background) | rb435m |
| They walked in, just in time to see their boo hoo hoo rabbit dinner hopping out and away in the garden. | Rb440 |
| As the hopped, they were singing happily (Honey on the Table in background) | rb445m |

FIG. 22 is a simplified operational flow chart of the "Theme Section" referred to in FIGS. 17D, 18C, 19B, and 19C. The Theme Section presents the user with a general introduction and tutorial to the overall application.

Appendix A is a computer listing of a preferred software embodiment of the interactive toy system described hereinabove. A preferred method for implementing software elements of the interactive toy system of the present invention is now described:

1) Provide a computer capable of running the WINDOWS 95 operating system;

2) Compile the source code of the sections of Appendix A labeled:

Installation Source Code

Application Source Code

ActiveX Source Code for Speech Recognition

CREAPI.DLL

CRPRO.DLL

BASEIO.DLL

Toy Configuration Source Code into corresponding executable files onto the computer provided in step 1);

3) Install the "Automatic Speech Recognition Software Development Kit" for WINDOWS 95 version 3.0 from Lernout & Hauspie Speech Products, Sint-Krispisnstraat 7, 8900 Leper, Belgium;

4) Compile the source code of the sections of Appendix A labeled:

Base Station Source Code

Toy Control Device Source Code into corresponding executable files and install into the base communication unit 62 of FIG. 5 and into the toy control device 24 of FIG. 5 respectively;

5) Run the executable file corresponding to the Installation Source Code;

6) Run the executable file corresponding to the Toy Configuration Source Code;

7) Run the executable file corresponding to the Application Source Code;

It is appreciated that the interactive toy system shown and described herein may be operative to take into account not only time of day but also calendar information such as holidays and seasons and such as a child's birthday. For example, the toy may output special messages on the child's birthday or may generate a "tired" facial expression at night-time.

Preferably, at least some of the processing functionalities of the toy apparatus shown and described herein are provided by a general purpose or household computer, such as a PC, which communicates in any suitable manner with the toy apparatus, typically by wireless communication such as radio communication. Preferably, once the toy has been set up, the PC program containing the processing functions of the toy runs in background mode, allowing other users such as adults to use the household computer for their own purposes while the child is playing with the toy.

Preferred techniques and apparatus useful in generating computerized toys are described in copending PCT application No. PCT/IL96/00157 and in copending Israel Patent Application No. 121,574 and in copending Israel Patent Application No. 121,642, the disclosures of which are incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the present specification and claims, the term "computerized creature" or "computerized living creature" is used to denote computer-controlled creatures which may be either virtual creatures existing on a computer screen or physical toy creatures which have actual, physical bodies. A creature may be either an animal or a human, and may even be otherwise, i.e. an object.

"Breathing life" into a creature is used to mean imparting life-like behavior to the creature, typically by defining at least one interaction of the creature with a natural human being, the interaction preferably including sensing, on the part of the creature, of emotions exhibited by the natural human being.

A "natural" human being refers to a God-created human which is actually alive in the traditional sense of the word rather than a virtual human, toy human, human doll, and the like.

Reference is now made to FIGS. 23A and 23B, which are illustrations of the development and operation of a computerized living creature in accordance with a preferred embodiment of the present invention. FIG. 23A shows a physical creature, while FIG. 23B shows a virtual creature.

As seen in FIGS. 23A and 23B, a facility for teaching the development of interactive computerized constructs is provided, typically including a plurality of student workstations 310 and a teacher workstation 312, which are interconnected by a bus 314 with a teaching facility server 316 serving suitable contents to the teacher workstation 312 and the student workstations 310. Preferably, a creature life server 318 (also termed herein a "creature support server" or "creature life support server) is provided which provides student-programmed life-like functions for a creature 324 as described in detail below. Alternatively servers 316 and 318 may be incorporated in a single server. As a further alternative, multiple creature support servers 318 may be provided, each supporting one or more computerized living creatures. As a further alternative (not shown), a single central computer may be provided and the student and teacher workstations may comprise terminals which are supported by the central computer.

As seen in FIG. 23A, creature life support server 18 is preferably coupled to a computer radio interface 320 which preferably is in wireless communication with a suitable controller 322 within the computerized living creature 324, whereby the actions and responses of the computerized living creature 324 are controlled and stored as well as its internalized experiences are preferably retained and analyzed.

It is appreciated that the computerized living creature 324 preferably is provided, by creature life server 318, with a plurality of different anthropomorphic senses, such as hearing, vision, touch, temperature, position and preferably with composite, preferably student-programmed senses such as feelings. These senses are preferably provided by means of suitable audio, visual, tactile, thermal and position sensors associated with the computerized living creature. Additionally in accordance with a preferred embodiment of the invention, the computerized living creature 324 is endowed with a plurality of anthropomorphic modes of expression, such as speech, motion and facial expression as well as composite forms of expression such as happiness, anger, sorrow, surprise. These expression structures are achieved by the use of suitable mechanical and electromechanical drivers and are generated in accordance with student programs via creature life server 318.

Referring now to FIG. 23B, it is seen that a virtual computerized living creature 334 may be created on a display 336 of a computer 338 which may be connected to bus 314 either directly or via a network, such as the Internet. The virtual computerized living creature 334 preferably is endowed with a plurality of different anthropomorphic senses, such as hearing, vision, touch, position and preferably with composite senses such as feelings. These senses are preferably provided by associating with computer 338, a microphone 340, a camera 342, and a tactile pad or other tactile input device 344.

A speaker 346 is also preferably associated with computer 338. A server 348 typically performs the functionalities of both teaching facility server 316 and creature life server 318 of FIG. 23A.

Additionally in accordance with a preferred embodiment of the invention, the virtual computerized living creature 334 is endowed with a plurality of anthropomorphic modes of expression, such a speech, motion and facial expression as well as composite expressions such as happiness, anger, sorrow, surprise. These are achieved by suitable conventional computer techniques.

It is a preferred feature of the present invention that the computerized living creature can be given, by suitable programming, the ability to interact with humans based on the aforementioned anthropomorphic senses and modes of expression both on the part of the computerized living creature and on the part of the human interacting therewith. Preferably, such interaction involves the composite senses and composite expressions mentioned above.

FIG. 23C is a simplified semi-pictorial semi-block diagram illustration of a system which is a variation on the systems of FIGS. 23A–23B in that a remote content server 342 is provided which serves data, programs, voice files and other contents useful in breathing life into the creature 324.

FIG. 24A is a pictorial illustration of a student programming the creature 324 (not shown), preferably using a simulation display 350 thereof. Programming is carried out by the student in interaction with the student workstation 310. Interaction may be verbal or alternatively may take place via any other suitable input device such as keyboard and mouse.

The command "play record", followed by speech, followed by "stop", means that the student workstation should record the speech content generated by the student after "play record", up to and not including "stop" and store the speech content in a voice file and that the creature life server 318 should instruct the creature 324 to emit the speech content stored in the voice file.

"If-then-endif", "speech recognition", "speech type", "and" and "or" are all control words or commands or programming instructions, as shown in FIG. 31.

FIG. 24B is a pictorial illustration of human, at least verbal interaction with a computerized living creature wherein the interaction was programmed by a student as described above with reference to FIG. 24A.

FIG. 24C is a creature 324 equipped with a built in video camera 342 and a video display 582 such as a liquid crystal display (LCD). The video camera provides visual inputs to the creature and via the creature and the wireless communication to the computer. The display enables the computer to present the user with more detailed information. In the drawing the display is used to present more detailed and more flexible expressions involving the eyes and eye brows. Color display enables the computer to adopt the color of the eyes to the user or subject matter.

It is a particular feature of the present invention that an educational facility is provided for training engineers and programmers to produce interactive constructs. It may be appreciated that a teacher may define for a class of students an overall project, such as programming the behavior of a policeman. He can define certain general situations which may be broken down into specific events. Each event may then be assigned to a student for programming an interaction suite.

For example, the policeman's behavior may be broken up into modules such as interaction with a victim's relative, interaction with a colleague, interaction with a boss, interaction with a complainer who is seeking to file a criminal complaint, interaction with a suspect, interaction with an accomplice, interaction with a witness. Each such interaction may have sub-modules depending on whether the crime involved is a homicide, a non-homicidal crime of violence, a crime of vice, or a crime against property. Each module or sub-module may be assigned to a different child.

Similarly, a project may comprise programming the behavior of a schoolchild. In other words, the emotionally perceptive creature is a schoolchild. This project may be broken, into modules such as behavior toward teacher, behavior toward module and behavior toward other children. Behavior toward other children may be broken up into submodules such as forming of a secret club, studying together, gossiping, request for help, etc.

To program a particular submodule, the student is typically expected to perform at least some of the following operations:

a. Select initial events which trigger entry into his submodule. For example, hearing the word "club" may trigger entry into a "Forming Secret Club" submodule. These initial events may form part of the state machine of the module or preferably may be incorporated by the students jointly or by the teacher into a main program which calls various modules upon occurrence of various events.
b. List topics appropriate to the dialogue to be maintained between the schoolchild and a human approaching the schoolchild. For example, in order to form a club, the club typically needs a name, a list of members, a password, a flag, rules, etc.
c. Determine relationships between these topics. For example, the password needs to be conveyed to all members on the list of members, once the list of members has been established.
d. Formulate a branched dialogue between the schoolchild and the human, designed such that each utterance of the school-child tends to elicit a response, from the human, which is easily categorizable. For example, the schoolchild may wish to ask only limited-choice questions rather than open-ended questions. If, for example, the schoolchild asks, "What color should the flag be: white or black or red?" then the system merely needs to recognize one of three words.
e. Determine how to detect emotion and determine the roles of different emotions in the schoolchild-human relationship. For example, if the school-child is defining, in conjunction with the human, the list of members, the schoolchild may notice that the human is becoming emotional. The schoolchild may therefore elect to recommend that the list of members be terminated and/or may express empathy. Alternatively or in addition, each utterance of the schoolchild may have a slightly different text for each of three or four different emotional states of the human.

Other projects include programming the behavior of a teacher, parent, pet, salesperson, celebrity, etc. It is appreciated that the range of projects is essentially limitless.

It is appreciated that the complexity of programming an emotionally perceptive being is anticipated to cause amusing situations whereby the emotionally perceptive being performs in a flawed fashion. This is expected to enhance the learning situation by defusing the tension typically accompanying a student error or student failure situation by associating student error with a humorous outcome. The difficulty of programming an emotionally perceptive being is not a barrier to implementation of the system shown and described herein because the system's objective is typically solely educational and correct and complete functioning of the emotionally perceptive being is only an artifact and is not the aim of the system.

Furthermore, although programming a being which is emotionally perceptive at a high level is extremely difficult, even simplistic emotional sensitivity, when featured by a machine, has a tremendous effect on the interaction of humans with the machine. Therefore, programming of emotional perceptiveness, even at the elementary level, is a rewarding activity and consequently is capable of motivating students to enhance their programming abilities through practice.

FIG. 25 is a simplified software diagram of preferred functionality of a system administrator. Preferably, one of the teacher workstations 312 doubles as a system administrator workstation.

FIG. 26 is a simplified software diagram of a preferred functionality of teacher workstation 312 in a system for teaching development of interactive computerized constructs such as the system of FIGS. 23A–23C.

Student administration functionality (unit 715 in FIG. 25) typically includes conventional functionalities such as student registration, statistical analysis of student characteristics, student report generation, etc.

Integration (unit 740) may be performed by groups of students or by the teacher. Preferably, the teacher workstation provides the teacher with an integration scheme defining the order in which the various modules should be combined.

Run-time administration functionality (unit 750) refers to management of a plurality of creature life servers 318. For example, a teacher may have at his disposal 15 creatures controlled by 3 creature life servers and 30 projects, developed by 300 students and each including several project modules. Some of the project modules are alternative. The run-time administration functionality enables the teacher to determine that at a particular day and time, a particular subset of creatures will be controlled by a particular creature life server, using a particular project. If the project includes alternative modules, the teacher additionally defines which of these will be used.

FIG. 27 is a simplified software diagram of preferred functionality of student workstation 310 in a system for teaching development of interactive computerized constructs such as the system of FIGS. 23A–23C. The Analysis and Design block 815 in FIG. 27 typically comprises a word processing functionality, a flowchart drawing functionality and a database schema design functionality allowing the student to document his analysis of the project module.

The Visual Programming block 840 in FIG. 27 is preferably operative to enable a student to define and parametrize software objects and to associate these objects with one another.

Software objects preferably include:

Sub-modules; events such as time events, verbal events, database events, sensor events, and combinations of the above; functions such as motion functions, speech (playback) functions; states for a state machine; and tasks performed in parallel.

A typical session of visual programming may, for example, comprise the following steps:

a. Student selects "view" and then "state machine" in order to view the state machine currently defining his module of the project that his class has been assigned. In response, the system displays the current state machine to the student.
b. Student selects "insert" and then selects "state", thereby to add a new state to the state machine.
c. Student selects "insert" and "connection" in order to connect the new state to an existing state in the state machine.
d. Student defines an event and function for the selected connection. The function may be selected from among existing functions listed under the Functions option or may be generated, using the Program Block option, and using a third generation programming language such as Basic or by opening a state machine within the function.

Selection may be implemented by any suitable interface mechanism such as drag-and-drop of icons from a toolbox or such as selection from a menu bar and subsequent selection from menus associated with menu bar items.

The visual programming block 840 preferably allows a student to select one of a plurality of "views" each comprising a different representation of the module as programmed thus far by the student. The views may, for example, include:

a. sub-modules within the module assigned to the student;
b. a list of events within the module. Events typically include time events, sensor events, verbal events, database events e.g. that a particular counter in the database has reached zero, and combinations of the above. An event can be generated from scratch, modified or associated with an existing connection between a source state and a destination state.
c. a state machine illustrating states in the module and connections therebetween;
d. a list of tasks, wherein each task includes a sequence of functions and/or modules and wherein an association is defined between tasks in order to allow the sequences of the various tasks to be performed in parallel.
e. a list of functions within the module. Functions typically include verbal functions e.g. talking, speech recognition and recording, actuator functions such as motor functions and lighting functions, database functions such as computations performed on data stored in the database.

A function can be generated from scratch, modified or associated with an existing connection between a source state and a destination state.

Within each view, the student may modify or add to any aspect of the module represented in the view. For example, in order to modify an event associated with an individual connection in the state machine, the student may typically access the event list and change the definition of the event. Alternatively, the student may access the state machine and select a different event to associate with the individual connection.

FIGS. 28–31 are examples of screen displays which are part of a human interface for the Visual Programming block 840. As shown in the menu bar of FIG. 28, the student is preferably given the option of performing one of the following types of activity:

Conventional file operations, conventional editing operations, viewing operations, insert operations, simulation operations and conventional Window and Help operations.

Using the View menu, also shown in FIG. 28, the student may elect to view various representations of the module he has developed, such as a project map representation, module chart representation, list of tasks, etc.

In FIG. 28, the student has selected Connections in the View menu. In response, the student typically is shown, on the screen, a list of the existing state machine connections in his or her module. The student may then select one or another of the connections. As shown, the student has selected connection t6. In response, the student sees a screen display of the parameters of connection t6, including the connection's source and destination states, and the event and function associated with the connection.

Typically, each function is a combination of one or more function primitives such as "play", "record", "set expression", etc.

A list of the currently defined function primitives and their parameters is typically displayed to the student response to a student selection of the "function primitive" option in the View menu.

FIG. 29 is an illustration of a state machine view of a module, generated in response to the student's selection of State Machine from the View menu. As shown, interactions are shown in state form, wherein the creature moves from state to state, wherein transition from state to state is conditional upon occurrence of the event which appears between the states, and is accompanied by occurrence of the function which appears between the states.

For example, the transition between State 2 to State 6 is associated with Function 7 and Event 7. This means that when the creature is in State 2, then if it detects Event 7, it performs Function 7 and moves to State 7.

Event 7 may, for example, be that the natural human is happy. This is a complex event being a combination of several primitive events such as Loud Voice, High Pitch, Intonation Rises at End of Sentence, "happy" detected by speech recognition unit, etc. Function 7 may, for example, be emission of the following message: "It looks like you're in a great mood today, right?"

State 6 may, for example, be a Waiting For Confirmation Of Emotional Diagnosis state in which the creature waits for the natural human to confirm or reject the creature's perception that the natural human is "in a great mood".

State 2 may, for example, be an Emotion Change state in which a change in emotion has been detected but the new emotion has not yet been characterized.

"U" denotes an unconditional transition from one state to another.

In FIG. 30, the student is modifying the module by inserting a new function intended to be associated with a state-to-state connection within the state machine. The function which the student is shown to be inserting is the function "record for 2 seconds".

It is appreciated that the Functions option under the View option (FIG. 28) may be employed to define functions which are a sequence of existing functions.

The screen display of FIG. 32 includes an illustration of an example of a state machine view of a project. As shown, each connection between states is characterized by an event and by a function. Occurrence of an event causes the function to be performed and the process to flow from the current state to the next state. For example, if event E1 occurs when the system is in State 1, then the system performs F1 and advances to state 6.

In FIG. 32, states are represented by ovals, events by diamonds and functions by rectangles. To insert an event and a function for a connection, the student selects the desired connection from the display of FIG. 32, then selects Insert in the main menu bar of Visual Programming and then selects, in turn, Function and Event.

The screen display of FIG. 33 enables a student to create an environment in which a previously generated module can be tested. To do this, the student typically does as follows:

a. the student generates a simulation of the software that actuates the module (launch setup);

b. the student generates a simulation of the environment which deals with inputs to the module and outputs from the module. In other words, the environment simulation generated in step (b) simulatively provides inputs to the module and accepts and acts upon, simulatively, outputs by the module which would have caused the environment to act back onto the module;

c. the student defines a setup for monitoring the module's performance. Typically, the student defines that certain detected events will be displayed on the screen and certain detected events will be logged into a log file.

d. the student executes the simulation, simultaneously monitoring the screen; and e. the student views the contents of the log file.

FIGS. 34–37 are examples of display screens presented by the teacher workstation 312 of FIG. 23A, 23B or 23C.

Specifically, FIG. 34 is an example of a display screen generated within the Student Administration unit 715 of FIG. 26. As shown, the display screen enables a teacher to enter and modify student identification particulars and also to view the project and module assigned to each student and preferably, the status of the project and module. The display screen also allows the teacher to assign a mark to the student. Alternatively, assigning marks may be part of execution monitoring (unit 760).

Assignment of students to projects and modules is typically carried out within the project module assignment unit 730 as described below with reference to FIG. 35.

FIG. 35 is an example of a display screen generated within the project module assignment unit 730 of FIG. 26. As shown, the teacher typically selects a project from among a menu of projects which typically displays characteristics of each project such as level of difficulty, number of modules, etc. In FIG. 13, the teacher has selected the "policeman" project. As shown, there are several modules within the project.

The teacher also selects a class to perform the project. In FIG. 35, the teacher has selected Class 3A and in response, the screen display has displayed to the teacher, a list of the students in Class 3A.

The screen display also displays to the teacher a list of the modules in the "policeman" project and the teacher assigns one or more students to each module, typically by clicking on selected students in the student menu.

FIG. 36 is an example of a display screen generated within the integration supervising unit 740 of FIG. 26. As shown, the teacher typically determines at least an order in which modules will be integrated to form the finished project. The system typically draws graphic representations of connections between modules which are to be integrated with one another. Each such connection is typically marked with a date and with a status indication (integrated/not-integrated).

FIG. 37 is an example of a display screen generated within the assign run-time unit 755 of FIG. 26. The assign run-time unit is particularly important if the creature generated is a physical creature rather than a virtual creature. If this is the case, then the physical creature typically is a scarce resource shared by a large number of students. As shown, the teacher typically selects a physical creature, such as a red policeman, from among an available pool of physical creatures. The selected physical creature performs the functionalities defined by the teacher's students when working on the policeman project, at a teacher-determined time. If two different modules are assigned to the same time and the same creature, i.e. if the red policeman is instructed to operate in his "victim's relative" module and in his "suspect" module, then the teacher typically defines a priority system such that overriding is minimal.

FIG. 38 is a simplified flowchart illustration of the process by which the student typically uses the student workstation 310 of FIG. 23.

A preferred flowchart illustration of processes performed by the student in the course of performing steps 910 and 920 of FIG. 38 is described hereinbelow with reference to FIG. 41.

As shown, initially, a teacher or project delineator defines states, i.e. categories of emotion (happy, sad, angry).

A student operationally defines each emotion category in terms of contents of and/or characteristics of verbal inputs recorded/received from human. The student defines events to partition emotions into categories. Characteristics of verbal inputs include: voice amplitude, voice pitch, rate of speech and diction quality.

The student defines explicit interrogations confirming various categories of emotion. The student defines each interrogation as a state, each interrogation as a function, and each result of interrogation as an event.

The student and/or teacher determines modification of interaction with human according to category of human's emotion.

FIG. 39 is an example of a display screen generated by selecting Event in the Insert menu in the student workstation 10. As shown, the event which is being selected comprises closure of various switches. Specifically, the event comprises closure of a switch in the right hand of the creature 324 or closure of a switch in the right foot of the creature.

FIG. 40 is an example of a display screen generated by selecting Function in the Insert menu in the student workstation 10. As shown, the function which is being selected comprises an eye-motion. Specifically, the function comprises movement of the eyeballs to the left.

Preferred embodiments of the present invention and technologies relevant thereto are now described with reference to FIGS. 42–68.

A preferred architecture of the LOLA application is described in chart form in FIGS. 42–68.

The LOLA system is a distributed application that is composed of several main processes. Address and data spaces boundaries are separating these processes which can reside on one computer or on different computers in the network. These processes use a standard middleware (MW) like CORBA/DCOM/RMI in order to communicate transparently with each other.

The Main Processes Are:

Task Dispatcher:

This component runs on every radio base station that communicates with living objects. The main sub-components in this component are described in FIGS. 42–68.

Proxy Objects:

Responsibilities: Every living object in the system has a corresponding object that represents it. All operation invocations that are done on a living object are first invoked on its proxy object, and all events generated by a living object are first received in its proxy object. In addition, the proxy object is responsible to store and track the state of each living object. The proxy object is a remote object in order to allow inter-process communication.

Services Used by the Proxies (Collaborators):

The proxies are using the provided Java Bean in order to invoke operations and receive events from the living object.

The security manager in order to verify if a requested operation is legal.

The log and event service in order to log messages and generate events.

Services Provided to Other Components:

The tasks that are spawned by the dispatcher interact locally with the proxies.

The IDE can interact with the proxies in order to allow remote debugging or executions.

The management console can remotely interact with the proxy in order to invoke diagnostics and monitoring operations.

Dispatcher Engine:

Responsibilities: Gets from the task manager the registered tasks for execution, and executes each task in a separate thread. The tasks run in a sandbox in order to enforce security policies.

Services Used by the Dispatcher:

The task manager in order to receive the registered tasks.

The spawned tasks use the proxy objects in order to invoke operations on the living objects.

The timer, in order to receive time events.

The log and event service in order to log messages and generate events.

Services Provided to Other Components:

The IDE can interact with the dispatcher in order to coordinate remote debugging or executions.

The management console can remotely interact with the dispatcher in order to invoke diagnostics and monitoring operations.

Timer:

Responsibilities: Generate time events to the registered listeners.

Services Used by the Timer:

The timer doesn't use any service provided by the LOLA system. It only uses OS services.

Services Provided to Other Components:

The dispatcher registers in the timer in order to receive time events.

LOLA Servers

This component supplies the required services to all other components in the system. The main sub-components in this component are described in FIGS. 42–68.

Log Server:

Responsibilities: The log server is responsible to log messages of other components in the system, and to retrieve those messages according to several criteria. Log messages, unlike events are just logs, i.e. they only log information, rather then expect that some action will be triggered from that log messages.

Services Used by the Log Server:

The persistent storage service in order to keep the logs in a persistent storage.

Services Provided to Other Components:

The dispatcher and the proxies log certain events during task executions.

The management console and the students IDE in order to track the execution of particular tasks.

The teacher management console in order to receive statistics about task executions.

Monitor Engine:

Responsibilities: The monitor engine is responsible to receive events from other components in the system, and to act upon them according to event-condition-action logic. The monitor engine supplies such logic on a system wide basis, even though this component can in addition reside on every radio base station in order to allow local handling of events.

Services Used by the Monitor Engine:

The persistent storage service in order to keep the policies and the received events in a persistent storage.

Services Provided to Other Components:

The dispatcher and the proxies generate events during task executions, or when pooling the system for its sanity.

The management console in order to receive the events and act appropriately upon them.

Security Manager:

Responsibilities: The security manager keeps in a repository all the users, groups, and roles in the system, and according to that decides who has the permission to do what action.

Services Used by the Security Manager:

The persistent storage service in order to keep the users, groups and roles in a persistent storage.

Services Provided to Other Components:

The proxies in order to confirm remote operations that are invoked on them.

The task manager in order to confirm that a specific task registration is allowed.

Task Manager:

Responsibilities: The task manager keeps in a repository all the tasks in the system, and according to that supplies the appropriate radio base stations the tasks that they should execute.

Services Used by the Task Manager:

The persistent storage service in order to keep the tasks in a persistent storage.

The security manager in order to confirm task registration.

Services Provided to Other Components:

The radio base stations in order to receive the registered tasks.

Management Console

This component is the console of the administrator that monitors and controls the system behavior, and configures the system appropriately. In addition, it provides the teacher a console from which it can query the system in order to do tasks such as evaluate students works, or assign permissions to its students to execute particular tasks.

The main sub-components in this component are illustrated in FIGS. 42–68. An on-line view of these components is also shown in these figures.

Responsibilities: The console for on-line monitoring and control of the system. View of things like the tasks that are running on each radio base station, and the state and status of each living object. The ability to invoke operations such as changing the channel of a particular living object. The ability to view all the events that are generated in the system.

Services Used by the On-line View Typically Include:

The proxy object in order to invoke operations on them, and receive events from them.

The dispatcher in order to monitor and control tasks executions in an on-line manner.

The monitor engine in order to receive events on a system wide basis.

Services Provided to Other Components:

The on-line view is only a GUI client.

A configuration view is illustrated in the figures.

Responsibilities: The console for configuring the system during its run-time. Configurations such as definitions of users, groups, and roles are done from this console.

Services Used by the Configuration View

The security manager in order to authorize the invoked operations.

Services Provided to Other Components:

The configuration view is only a GUI client.

Off-line view:

Responsibilities: Configurations done to the system not during its normal executions, such as upgrade, adding living objects, and others.

Services Used by the Configuration View

Services Provided to Other Components:

The configuration view is only a GUI client.

Teacher Console

Responsibilities: The console to be used by the teacher in order to evaluate the students' works. The teacher will be provided with information such as the popularity of the students' works, and other statistics about the task executions. In addition, the teacher will be able to view the source of all the tasks that were written by its students.

Services Used by the Configuration View

The task manager in order to view the source of its students tasks.

The log server in order to obtain statistics about tasks executions.

Services Provided to Other Components:

The off-line view is only a GUI client.

Integrated Development Environment (IDE)

This component runs on each student programming station. The architecture support the following three possibilities:

A standalone PC residing in the student home and not connected to the Internet.

A PC residing in the students home, and connected to the LOLA system via the Internet. A firewall can reside between the PC in the student home, and the LOLA system.

A PC residing in an internal intranet, and connected to other LOLA components via a standard middleware.

IDE Core:

Responsibilities: The integrated development environment that is used by the students to write tasks that will be executed by the task dispatcher.

Services Used by the IDE core:

The IDE core use the living object simulator in order to test the task before register is for execution.

The IDE core can use the proxy object in order to execute the task on a real living object. This feature can be used only if the IDE core can communicate with the proxy object via the middleware, i.e. only if the PC resides on the same intranet, or remotely from home if a firewall doesn't restrict packets of the middleware port, and the available bandwidth allows that.

Services Provided to Other Components:

The IDE core is only a client of services.

Proxies Simulator:

Responsibilities: Simulate the proxies of the living object in order to allow local debugging and executions of tasks.

Services Used by the Configuration View

Services Provided to Other Components:

The IDE core uses the simulator for local task execution and debugging.

Tasks Registration:

Responsibilities: Browser based component that provides the students the ability to add or delete tasks for execution on a radio-based PC.

Services Used by the Configuration View

The task registration server.

Services Provided to Other Components:

Deployment

This component is responsible for the deployment of all other components in the system. In particular, it is responsible for the deployment of all proxy objects and their corresponding simulators, and the building of these objects if necessary. The building of these objects is optional, and basically there are three alternatives regarding this issue:

All objects are of the same type, i.e. all objects have the same interface regardless the living object they represent. Operations that are specific to a particular living object are executed via a common interface like "send_cmd". The advantage of this approach is simple deployment, maintenance and configuration of the system. The disadvantage, is a command set that is less meaningful to its users, and more important, that improper use of the command will be detected only when the task is executed on the living object, rather than being detected before on the simulator or at compile time.

All objects are of the same type in the API level, but every object knows its type. All types in the system reside in a repository. Thus, from deployment and maintenance perspective this approach is less simple, the API of the command set is still not meaningful, but errors can be detected when the task is executed on the simulator.

Objects from different types have different API to access them. Thus, the deployment and maintenance of the system is even less simple because code is generated and build according to the types of the living objects, rather than just being kept in a repository, or not kept at all. However, the command set is more meaningful to its users, and errors will be detected as soon as the task is compiled. Thus, this approach is the preferred approach. However, implementing this approach requires more development efforts, and thus can be implemented only in a secondary iteration.

Task and Security Managers Data Model

FIGS. 42–68 include a chart which describes the data models of the task and security managers.

User:

Name.

Password: encrypted using one-way function.

Group/s: one or more groups the user belongs to.

Group:

Name.

Users: zero or more users that belong to this group.

Roles: zero or more roles that are associated with this group.

Role:

Name.
Permissions: According to the following criteria:
Living object types.
Living objects.
Computers.
Times: capabilities like UNIX crontab.
Task:
Name.
Location.
Users: One or more users that wrote this task.
Execution time: Where and when this task will execute. Must match the roles that associated with the user's group.
Living object:
Name
Type
Host
Tasks: zero or more tasks that operate this living object.
Living object type:
Name.
Components Descriptions
Security Manager The security manager exports two main servers for other components:

ConfigAuthorization: Responsible to build the repository of users, groups and roles. Its exported operations are remote operations. The administrator triggers the invocation of these operations whenever she decides to update the definitions of pupils, groups and roles. The administrator makes these changes through its GUI-based console that acts as a clients that uses the above mentioned operations.

ConfirmAuthorization: Responsible to check whether a specific operation is legal, by using the data in the repository. The clients of this service are:

The task manager—it asks for confirmations whenever a pupil registers a task.

The proxy objects—is asks for confirmations whenever a pupil invoke a remote operation.

Task Manager

The task manager keeps in a repository all the tasks in the system, and according to that supplies the appropriate radio base stations the tasks that they should execute.

FIGS. 42–68 include a diagram illustration of the scenario where a pupil registers a task for execution. She first enters her user and password, and the security manager checks the authorization of the pupil. If authorized, the pupil gets a menu of all the allowed operations, i.e. she get a menu with the following operations:

Add task
Remove task
Update task
List all registered tasks

Suppose that the pupil decides to register a task for execution, so she chooses the "Add task" operation. The task manager receives the task content and the task info, and asks the security manager whether the pupil is permitted to register a task with the specified task info. If so, the task manager registers the task, and notifies the pupil that the registration ended successfully.

Task Scheduler:

The task scheduler is responsible for the scheduling of all the registered tasks. Whenever the execution time of a task arrives, the task scheduler is responsible to notify the appropriate dispatcher that it should download the task and spawn it.

When the scheduler starts, it iterates through all the list of registered task, and for every SchedInfo object it builds a simple object that contains the next time that this task should be started and stopped.

The task scheduler keeps a list of indexes of all the registered tasks, according to their execution time. It then registers in the timer to receive events whenever the execution time of a task arrives. Upon receiving such event it notifies the appropriate dispatcher that it should download and execute the task.

Task Dispatcher:

The task dispatcher gets from the scheduler a registered task, whenever the start time of the task arrives. Then, it executes the task in a separate thread. Each task runs in a sandbox in order to enforce security policies. The following state diagram describes the task dispatcher.

A diagram included in FIGS. 42–68 describes the data flow among the task dispatcher, task scheduler and other components in the system. The task scheduler can receive time events from the timer, and taskListChange event from the task manager. The time event is generated when the start execution time of a task arrives. This event triggers the downloading and spawning of a task from the scheduler to the dispatcher. The taskListChange event actually changes the list of the scheduled task, thus changes the registrations in the timer.

The management console can browse and change manually the tasks that are executing.

General consdierations relating to preferred LOLA system implementations are now described.

The LOLA (Living Object LAboratory) is a computer class that enables pupils to build and experience animation of physical figures called living objects. The animation provides the living objects with the ability to interact with users in a human voice, in a human-like and intelligent manner.

The Living Objects Laboratory teaches pupils to analyze, design and program "Natural Intelligence" (NI) into physical objects—the Living Objects figures. The NI developed by the pupils over time accumulates and increases the ability of the Living Objects to interact with the pupils. The Living Objects figures are distributed over the schoolyard and are used as playing and educational objects for all the children in the schoolyard.

Natural Intelligence

Natural Intelligence is the ability of a computerized object to present "human-like behavior". Human beings, even the very young are highly adaptive to their ever-changing environment. This skill enables a significant amount of freedom in the interaction between humans.

Computer based systems have strict interaction protocol. The behavior of a computerized machine is highly predictable and very accurate as long as the communicator (user or another computerized machine) strictly follows the rules of the protocol. Deviation from the protocol should lead to immediate cessation of the interaction.

Programming of computers and computer-based machines is oriented to "problem solving". The program ends (or pauses, waiting for a new input or event) when an well-identified target is reached. Human interaction is oriented towards building a growing shared understanding. Even when the final goal of the interaction is to solve a problem, the "continuous goal" of each step of the interaction is to collect and add relevant information to the collective pool of knowledge. This can be done until the final goal is reached. In many situations, the final goal is not known before the interaction begins, and is identified only later, as a result of the interaction.

Implementing Natural Intelligence into a machine enables the machine to perform the following loop:

1. Identify a situation.

2. Respond to a human being.

3. Deliver information that describes the accumulated or additional understanding of the situation.

4. Identify what information is missing.

5. Suggest additional information.

6. Request additional information.

7. Receive the human response and analyze it.

Goals of LOLA

The first implementation of LOLA is targeted at high schools for educational purposes. These are the high level goals of the project:

Teaches pupils to analyze, design and program "Natural Intelligence" (NI) into physical objects.

Friendly and easy to use system that will attract pupils to learn high technology subjects.

Support teachers in tasks assignments and grading.

Serves as content-based objects that amuse and provide information to the pupils and staff.

Services and their Use Case Analysis

The main actors in the system are pupil, teacher, administrator and user. This document specifies the important use-cases of the actors of the system. The use-cases are grouped by the actors targeted by the service: pupil, teacher, administrator and user. One person can act as one or more actors. In particular, every pupil, teacher and administrator is also a user of the system. It might be that the same person acts as a teacher and an administrator.

The Major Components in the System Are:

Programming station: every station that contains the IDE (Integrated Development Environment) that provide the ability to program NI into Living Objects. The computer at the pupils' home can also be such a programming station, if Creator IDE was installed on it.

Radio based station: every station that communicates with one or more Living Objects (via RF communication), and sends these objects commands.

LOLA servers: Station that hosts the servers of the LOLA system, e.g. task server, security server.

Teacher and administrator console: stations in the lab that are used by the teacher and administrator respectively.

Living objects: Living objects are toys equipped with a control device. The control device contains a micro-controller, a radio transceiver and I/O ports. The I/O ports connect to various peripheral components also contained within the Living objects, such as: speaker(s), microphone(s), sensors, actuators, motor(s), lamps, video camera, etc. The peripherals enable the Living Object to interact with humans in a human-like manner. The peripherals are operated by the micro-controller. The micro-controller receives its program instruction in real time from a radio-based PC via the built-in transceiver.

Two more secondary actors that provide data for building an internal database are later introduced. An information server that provides data for building an internal database that support queries made from pupils tasks, and a contents provider that provides contents that will be kept in a contents database. These contents will be scheduled for execution as determined.

We describe the services, and an analysis of the related use cases.

Pupil Services

The main services offered to pupils, who build the behaviors of the living objects, are illustrated in the drawings.

Name

Creator IDE Installation

Actors

Pupil if installed on her home PC, administrator if installed on a PC at school. Teacher might also install the IDE on her home PC in order to browse her pupils' tasks.

Goal

That Creator IDE will be installed correctly.

Forces in Context

1) There could have been previous installations. In such a case, this installation will be an upgrade of previous installations.

2) Installshield type installation.

3) Pupil typically works on Windows 95/98 based PC, but might also work on other environments such as Macintosh, Windows3.11/DOS, Linux or NC (in such a case the installation will take place in the server).

Trigger

Actor starts the installation process from a CD, or from a downloaded file.

Summary

This use case captures the first, and later installations of Creator IDE:

1) Actor is asked for several configurations parameters.

2) Actor advances to regular usage of Creator IDE.

Pre-conditions

Actor downloaded the package, or has a CD.

Post-conditions

Creator IDE is installed.

Related Use Cases

Create or Update living object types on a PC at home should be followed immediately, or be deferred to a later time at the users convenience.

Name

Add living object type at home

Actors

Pupil.

Teacher might also be an actor of this use-case if she has installed the IDE on her home PC.

Administrator is not an actor here: Administrator has a separate use case dealing with living object updates.

Goal

That the types of all living objects in the system will be known to Creator IDE, in order to support a simulator for every living object type.

Forces in Context

1) The information source will be typically the LOLA system installed at school, and the update process will be browser based and be done via the Internet. A firewall might reside between the pupil browser at home, and the LOLA system.

2) The pupil can put the required data on a floppy disk (or other media) at school, and then install it on her PC at home.

Trigger

Can be either one of the following triggers:

1) The Creator IDE has been just being installed.

2) New type of living object has been connected to the system.

Summary

Create or update the types of the living objects known to the IDE installed at the pupil's home.

Pre-conditions

Creator IDE has been Installed.

Post-conditions

1) The simulators in Creator IDE are matching the types of the available living objects.

2) Pupil can commence to build a decision tree.

Related Use Cases

1) Creator IDE Installation

2) LOLA installation

Name

Build a decision tree

Actors

Pupil

Goal

Build a task that is ready for compilation.

Forces in Context

1) No programming knowledge is required

2) Easy to use friendly GUI.

3) Can reuse decision trees or sub-trees made in previous tasks.

4) Can use built-in decision trees or sub-trees.

5) Pupil wants to use high level commands that are specific to the toy she is working with.

Trigger

1) Teacher assigns homework to her pupils.

2) Pupil builds the decision tree during a class in the lab, or by his own free choice.

Summary

This use case captures the scenario where a pupil builds a decision tree in order to program NI into a living object.

1) Pupil launch Creator IDE.

2) Pupil builds a decision tree.

Pre-conditions

1) Creator IDE is installed on the pupil desktop.

Post-conditions

1) A task that is ready for compilation.

Related Use Cases

1) Creator IDE installation: is a requirement.

2) Create or Update living object types on a PC at home: is a requirement.

Name

Build a highly customized decision tree

Actors

Pupil

Goal

Build a task that is ready for compilation.

Forces in Context

1) Basic programming skills are required.

2) Easy to use programming language and libraries.

3) Reuse decision trees or sub-trees made in previous tasks.

4) Use built-in decision trees or sub-trees.

5) Pupil wants to use high level commands that are specific to the toy she is working with.

Trigger

1) Teacher assigns homework to her pupils.

2) Pupil builds the decision tree during a class in the lab, or by his own free choice.

Summary

This use case captures the scenario where a pupil builds a decision tree in order to program NI into a living object.

1) Pupil launch Creator IDE.

2) Pupil builds a decision tree.

Pre-conditions

1) Creator IDE is installed on the pupil desktop.

2) Simulators simulate the living objects that exist in school.

Post-conditions

1) A task that is ready for compilation.

Related Use Cases

1) Creator IDE installation: is a requirement.

2) Create or Update living object types on a PC at home: is a requirement.

Name

Compile a task

Actors

Pupil

Goal

Produce a task that is ready for execution on a living object, which behaves according to the decision tree built by the pupil.

Forces in Context

1) Pupil should not be familiar with the internal implementation of the decision tree.

2) If the pupil only built a decision tree without the addition of pupil's defined macros/code, then the compilation process should be expected to pass in most cases.

3) Compilation errors/warning should be displayed by a view of a decision tree. Only in cases that the pupil added macros, these lines should be displayed either.

4) Friendly, easy to use.

Trigger

1) Pupil has built a decision tree.

Summary

This use case captures the scenario where a pupil built a decision tree, and wants to compile it.

1) Pupil launch Creator IDE.

2) Pupil builds a decision tree.

3) Pupil compiles the task.

Pre-conditions

1) Pupil has built a decision tree.

Post-conditions

1) If compilation passes—a task that is ready for execution.

Related Use Cases

1) Build a highly customize decision tree or Build a decision tree is a requirement.

Name

Execute a task

Actors

Pupil

Goal

Execute a task locally on the pupil PC in order to check it. The task is interacting with a living object simulator resides on the pupil PC, or if available with a physical living object connected either to the pupil PC, or to other PC in the network.

Forces in Context

1) Living object simulator should simulate accurately a physical living-object behavior. In particular, it should point on all errors that can occur when this task is executed alone on a living object.

2) Look as an integral part of Creator IDE.

3) Friendly, easy to use GUI.

4) Security: check pupil permission in case she is trying to execute the task on a living object connected to a remote PC.

Trigger

1) Pupil built and compiled a task, and wants to execute it.

Summary

This use case captures the scenario where a pupil has built a decision tree, and wants immediately to run it, typically in order to check the task.

1) Pupil launch Creator IDE.

2) Pupil builds a decision tree.

3) Pupil compiles the task.

4) Pupil executes the task.

Pre-conditions

1) Pupil has built a decision tree and compiled it.

Post-conditions

1) A task that is ready for execution on a living object.

Related Use Cases

1) Build a highly customize decision tree or Build a decision tree and compile a task is a requirement.

Name

Debug a task

Actors

Pupil

Goal

Debug a task locally on the pupil PC. The task is interacting with a living object simulator resides on the pupil PC, or if available with a physical living object connected to the pupil PC, or to other computer in the network.

Forces in Context

1) Living object simulator should simulate accurately a physical living-object behavior. In particular, it should point on all errors that can occur when this task is executed with the living object alone.

2) Look as an integral part of Creator IDE.

3) Friendly, easy to use GUI.

4) Security checks if pupil executes the task on a living object connected to a remote PC.

5) Pupil can trace task execution in steps, and can see in a graphical way what node in the decision tree is being executed now.

6) Pupil can step into lines of code added to the decision tree.

7) Usual debug capabilities like step into, step over, run to cursor, set breakpoint, continue, watch, etc.

Trigger

1) Pupil built and compiled a task, and wants to debug it.

Summary

This use case captures the scenario where a pupil has built a decision tree, and wants to debug it.

1) Pupil launch Creator IDE.

2) Pupil builds a decision tree.

3) Pupil compiles the task.

4) Pupil debugs the task.

Pre-conditions

1) Pupil has built a decision tree.

Post-conditions

1) A task that is ready for execution on a living object.

Related Use Cases

1) Build a highly customize decision tree or Build a decision tree and compile a task is preferably a requirement.

Name

Task registration

Actors

Pupil

Goal

That the task will be installed correctly, and run when scheduled.

Forces in Context

1) Browser-based registration via the Internet or intranet.

2) Security, privacy.

3) Firewall can reside between the web-based client and the servers.

Trigger

Pupil starts the registration process, typically after she has built, executed and debugged a task.

Summary

This use case captures the case where pupil registers a task for execution.

1) Pupil is asked for a user-name and password.

2) Pupil is asked to send the file of the task.

3) Pupil can browse all her registered tasks, and perform additional operations such as remove previously registered tasks.

Pre-conditions

Pupil has built, executed and debugged her task.

Post-conditions

Task is registered for execution as scheduled.

Related Use Cases

1) Debug a task or Execute a task.

Name

Browse task's executions logs

Actors

The main actor is a pupil. A teacher or an administrator might also be the actors of this use-case, typically in order to help in problems solving.

Goal

Browse the logs of a task that has been already executed, typically in order to diagnose problems.

Forces in Context

1) Pupils can browse the logs from every PC that is connected to the intranet.

2) Browser-based logs browsing via the Internet, where a firewall resides between the PC at home and the LOLA system is a nice to have feature.

3) Pupil can browse logs according to several criteria.

Trigger

1) Pupil's task has been executed, and pupil wants to browse the execution logs.

Summary

This use case captures the scenario where a pupil has built a decision tree, registered it for execution, and wants to browse the logs of the execution.

1) Pupil launch Creator IDE.

2) Pupil builds a decision tree.

3) Pupil debugs the task.

4) Pupil registers the task.

5) Pupil browses the execution's logs.

Pre-conditions

1) Pupil has registered a task, and that task has already been executed.

Post-conditions

1) Pupil understands how her task has been executed.

Related Use Cases

1) Task registration is a requirement.

Teacher Services

Teacher is responsible for all aspects of task assignments, checking and evaluation.

Name

Browse pupils tasks

Actors

Teacher

Goal

Browse pupils tasks in order to evaluate their tasks, or help with problem solving.

Forces in Context

1) Security, privacy—only a teacher can browse pupils tasks.

2) Teacher can browse every registered task.

3) Teacher uses creator IDE as the task browser.

4) According to the configuration, teacher can or can not change pupils tasks.

Trigger

Teacher wants to evaluate her pupils tasks, or help them in problems solving.

Summary

1) Teacher launch creator IDE.

2) Teacher logs into the task manager.

3) Teacher loads a task from the server to her IDE.

Pre-conditions

1) Creator IDE is installed on the teacher desktop.

Post-conditions

A pupil task appears on the teacher console.

Related Use Cases

Creator IDE Installation is a requirement.

The use case of Executed tasks statistics is either used as a measure to evaluate pupils tasks.

Name

Executed tasks statistics

Actors

Teacher

Goal

Teacher browses through the statistics gathered about her pupils tasks, typically in order to evaluate their works.

Forces in Context

1) Security, privacy—only a teacher can browse pupils tasks.

2) Teacher can browse every statistics related to her pupils tasks.

Trigger

1) Teacher wants to evaluate her pupils tasks.

Summary

1) Teacher logs into the statistics server.

2) Teacher queries the server for data, and browses this data.

Pre-conditions

Pupils tasks have been already executed in the system.

Post-conditions

Teacher has more measures to evaluate her pupils tasks.

Related Use Cases

The use case of browse pupils tasks is either used as a measure to evaluate pupils tasks.

Administrators Services

The administrator is responsible for the installation, deployment, maintenance, diagnostics, monitoring and controlling of the system.

Name

Installation

Actors

Administrator

Goal

That the LOLA system will be installed correctly

Forces in Context

1) Application components should be deployed in such a way that no bottlenecks will occur, and the system will run in an efficient way.

2) Installation process can be done from a central location.

3) There could have been previous installations. In such case, this installation will be upgrade of previous installations.

4) Installshield like installation.

5) System should scale to support tens of living objects, and hundreds of pupils.

Trigger

Administrator starts the installation process from CD, or from a downloaded file.

Summary

This use case captures the first, and later installations of the LOLA system:

1) Administrator is asked for several configurations parameters.

2) Administrator advances to the update living object use case.

Pre-conditions

Administrator downloaded the package, or has a CD.

Post-conditions

Everything is setup for defining living object types.

Related Use Cases

1) Update living object types can follow immediately, or be deferred to a later time at the user's convenience.

Name

Add living object types

Actors

Administrator

Goal

That the types and objects of all living objects in the system will be known to the system, and appropriate application components will be deployed according to that.

Forces in Context

1) Done from a central location.

2) Living objects and objects types can be added or removed from the system during its lifetime, and not only after the installation.

3) In particular, the simulators residing in the IDE on the pupils PCs at home should be updated.

Trigger

1) The LOLA system has been just being installed.

2) New type of living object should be connected to the system.

Summary

The system is configured according to the available living objects.

Pre-conditions

Installation of the system.

Post-conditions

All living object types are known in the system.

Related Use Cases

1) Installation

2) Trigger the use case of Create or update living object types on a PC at home.

Name

Pupils, groups and roles definitions

Actors

Administrator

Goal

Pupils can log into the system, and perform actions according to their permissions.

Forces in Context

1) Flexibility—pupil can be belong to one or more groups, and each group can have one or more roles. The same role can be assigned to several groups.

2) This process can be done after installation, and configuration of the living object, as well as on a regular basis whenever new pupils, groups or roles should be added or removed.

3) Users definition is independent of the OS users.

Trigger

The teacher asks the administrator to open accounts to her pupils, so that they will start using the system.

Summary

This use case captures the scenario where a teacher of a class wants that her pupils will be granted with permission to use the system.

1) Administrator defines roles: each role definition consists of role name and the permissions that the owner of this role is granted. Permissions can be granted according to the following criteria:

Living object types.

Living objects.

Times: capabilities like UNIX crontab.

2) Administrator defines groups: each group definition consists of group name, and zero or more roles that are associated with this group.

3) Administrator defines users: each user definition consists of user name, password (encrypted with one-way function) and zero or more roles that are associated with this group.

Pre-conditions

1) Installation.

2) Update living objects types.

Post-conditions

Pupils can log into the system according to their permissions.

Related Use Cases

1) Installation and Update living object types are required.

Name

Diagnose, monitor and control the system.

Actors

Administrator

Goal

That the actor be able to diagnose, monitor and control the system.

Forces in Context

1) Potential problems should be detected in advance when possible.

2) Isolate problems through diagnostics tools.

3) Resolve problems through corrective measures.

4) Automatic sanity checks.

5) Allow the administrator to define automatic action to certain events, e.g. change the RF channel upon receiving a specific time event.

6) Administrator can invoke operations on living objects, and receive events from them in an on-line manner.

7) Administrator can browse all events in the system.

8) Browser-based management console.

9) Security.

10) Integration with enterprise management console if exists.

Trigger

Management of the system on a regular basis, or after a pupil or a teacher complains of problems.

Summary

1) Administrator launch browser-based management station.

2) Administrator diagnoses, monitors, and controls the system.

Pre-conditions

1) System has been already installed

Post-conditions

System functions correctly.

Related Use Cases

1) Installation.

2) Browse and change scheduling time of tasks.

Name

Browse and change scheduling time of tasks.

Actors

Administrator

Goal

Control the execution time of tasks from a central location, and from a view of the whole system.

Forces in Context

1) Potential problems that stem from task scheduling should be detected in advance when possible.

2) Administrator should be able to see the scheduling time of all tasks in the system, and in several views.

3) Administrator should be able to change scheduling time of tasks, or to schedule unscheduled tasks for execution.

4) Security.

Trigger

1) Pupils have just registered their tasks for execution. Administrator wants to verify that they scheduled their tasks appropriately. Note: Pupils can only register tasks according to their permissions. However, they still can register tasks not appropriately—for example—if two or more pupils have registered tasks on the same living object and with overlapping times, and those tasks acts on same sensors.

2) Pupils have registered tasks, but didn't specify the scheduling time, typically because the administrator wants to avoid conflicts and specify it herself. Thus, the administrator specifies the scheduling times of all tasks.

3) Tasks had been downloaded from a content provider server on the Internet. Administrator wants to schedule those tasks for execution.

Summary

1) Administrator launches browser-based management station.

2) Administrator browses all tasks in the system, and their scheduling times if schedules.

3) Administrator changes scheduling times of tasks, or scheduled new tasks for execution.

Pre-conditions 1) system has been already installed

2) Tasks have been already registered in the system, or downloaded into the system.

Post-conditions

Tasks are scheduled for execution as desired.

Related Use Cases

1) Installation.

2) Diagnose, monitor and control the system.

Users Services

The users can be everyone in the schoolyard that interacts with a living object. In particular it can be a pupil, teacher, administrator or none of them.

Name

Interaction with living object

Actors

User

Goal

The purpose of the interaction can be for amusement, education, task checking (pupil or teacher), or system checking (administrator).

Forces in Context

1) Friendly interaction.

2) Living object operated according to the registered tasks and the scheduler that schedule these tasks for executions.

Trigger

User sees a living object in the schoolyard and decides to interact with it.

Summary

This use case captures the scenario where a user interacts with a living object. User interacts with the living object by voice (listening or talking to it), by watching its reactions, or by triggering its sensors.

Pre-conditions

One or more tasks are executing with the living object.

Post-conditions

One or both of the followings:

1) The user is amused, more educated.

2) A task has been checked with a physical living object (student or teacher).

3) Living object has been checked of its functionality (administrator).

Related Use Cases

1) Execute a task.

2) Debug a task.

3) Task registration.

Contents Providers Services

External servers that interact with the system in order to push data into LOLA database, or supply such data upon a request from a LOLA client.

Name

Build contents database

Actors

Contents providers

Goal

Push or supply tasks (contents) that will run on living objects.

Forces in Context

1) Leverage the capabilities developed for the LOIS system.

2) Contents can be pushed automatically on a regular basis, or can be pulled upon a request.

3) Tasks written by contents providers are scheduled for execution in a similar way to tasks written by pupils.

Trigger

Depends on the configuration:

1) Generally, administrator will configure the push client to run updates at specific intervals, so the trigger is the push client scheduler.

2) Administrator may manually initiate a download.

Summary

This use case captures the scenario where the administrator at school wants to schedule for execution tasks that were written by contents providers, and to update these tasks on a regular basis. These tasks are scheduled for execution in a similar way to tasks written by pupils.

All the use-cases that support that action, e.g. registration, billing, content-provider side are considered part of the LOIS system.

Pre-conditions

1) The LOLA system has been installed.

2) The installation and registration use cases of the LOIS system.

Post-conditions

1) New content that is ready for execution resides now in the tasks database.

Related Use Cases

1) Installation

Information Servers Services

External servers that interact with the system in order to push data into LOLA database, or supply such data upon a request from a LOLA client.

Name

Supplies information to build a database that supports queries of pupils tasks.

Actors

Information servers

Goal

Push or supply data that will serve pupils database queries.

Forces in Context

1) Use standard tools and protocols to build this database.

2) Data can be pushed automatically on a regular basis, or can be pulled upon a request.

Trigger

Depends on the configuration:

1) Generally, administrator will configure the push client to run updates at specific intervals, so the trigger is the push client scheduler.

2) Administrator may manually initiate a download.

Summary

This use case captures the scenario where the administrator at school wants to build an internal database that pupils can query it, instead of searching the desired data on the web.

Pre-conditions

The LOLA system has been installed.

Post-conditions

1) The database is updated.

Related Use Cases

1) Installation

FIG. 42 is a simplified flowchart illustration of an emotional interaction flowchart design process.

FIGS. 43–102 illustrate preferred embodiments of a computerized programming teaching system constructed and operative in accordance with a preferred embodiment of the present invention.

FIGS. 69 to 102 are now described in detail.

FIG. 69 is a general logical overview of the system network with the servers (such as the database server 316 and creature control server 318) at the center and the students' programming workstations 310, teacher station 312, administrator station 1200, and radio base station 320 clustered around the servers.

FIG. 70 is a general logical overview of the control over the creatures 322 with the radio base station (that provides the control over the creatures) at the center and the students' programming workstations 310, teacher station 312, administrator station 1200, and radio base station 320 clustered around the servers.

FIG. 71:

The main menu of the administrator station comprises of four main sub-menus: Real-Time Information 1250 regarding the operation of the system, Diagnose 1260 for trouble-shooting hardware and software problems, Configuration and registration 1270 of software and hardware components and Task 1280 for the deployment and administration of the various tasks (projects, programs) provided by students and executed by the system.

FIG. 72 illustrates the basic steps for developing and testing a task (project, program) at home. First the student develops the task (step 1290), then compiles the source code (step 1300), than executes the task using the simulator (step 1310). If the task does not perform as it was designed the student uses the simulator (step 1320) to debug the program and to find the problem, correct it and test the task again. If the task performs as designed the student registers the task (step 1330) to be executed over a physical creature.

FIG. 73 illustrates the process of developing, testing and registration of a task by a student at home and at school. The process begins with the student at home, similar to FIG. 62, however, the student transfers the task to school and continues with the same process at school.

FIG. 74 is a flow chart describing a very simple "decision tree" (also termed "state machine"). This flow chart instructs the creature to enter "listen mode", thus recording the verbal utterances of the user and processing the recording by means of the speech recognition engine. The listen mode persists until the term "wake-up" is spotted the task sings a song. After the song is finished the process repeats.

FIG. 75 is a block diagram showing the main functions of the simulation engine. The simulation engine enables the student to test the program (task) developed for a physical creature without a physical creature itself. The simulation engine provides all the physical functions of the physical creature by means of standard computer peripherals such as computer microphone to simulate creature listen functions (1450), computer speakers to simulate creature talking functions (1460), simulation of the creature motion by displaying animation of the creature on the computer screen (1470), simulation of the creature sensors with the computer keyboard and mouse (1480) and simulation of video display and video camera installed in the creature by means of the computer display and peripheral video camera.

FIG. 76 is a flow chart describing the process of registration and execution of a project (task). In step 1500 the student or the teacher registers the task in the database server (Lola server) 316 for future execution by means of a specific creature control server 318 and a specific creature 324. In step 1510, at the appropriate date, time or other conditions as specified in the registration step 1500, the Lola server 316 sends the task to the appropriate creature control 318 server for execution. The Creature Control Server launches the program and execute it by sending commands via the radio base station (320) to the appropriate creature (323).

FIG. 77 is a Block diagram of the main services available to the teachers. Teachers can access exclusive extensions of the IDE (step 1600) to select and investigate each of the tasks of each of the students (step 1610). The teacher can brows the student tasks (1620), view statistics associated with the execution of the tasks (1630) such as absolute performance statistics (1640) and relative performance statistics (1650) and to assign marks to the students (1660).

FIG. 78 is a Block diagram of the Living Object Laboratory (LOLA) system topology, comprising of the main subsystems:

The LOLA Server, comprising one or more servers, such as database server and creature control servers: Administrator Station (1710); Teacher station (1720); Student Programming station (1740); and Radio Base Station (1750). All the main sub-systems, except for the radio base station, are interconnected by networking means such as HyperText Transport Protocol (HTTP) or middleware (MW) where middleware is any appropriate interfacing software. Typically the all subsystems except for the Radio Base Station are interconnected over a Local Area Network (LAN) such as the Ethernet, while the Radio Base Station is connected by means of Universal Serial Bus (USB).

FIG. 79 is a Block diagram of the Living Object Laboratory (LOLA) system presenting the main (logical) services provided by the system: The database engine 1760 manages all accesses to the database repository 1765. The log server logs 1770 details of the execution and performance of all creatures and tasks running in the system. The monitor engine 1775 presents to the users real time information about the performance of tasks executed by the system at the time of monitoring. The security manager 1780 supervises all user access to the system and verifies that only authorized users will have access to particular parts of the database as is predetermined by the administrator. The task manager 1785 supervises the operation of all tasks in the system according to instruction provided by authorized users. These services are typically provided by software subsystems that are separated and interconnected by conventional means of communication such as HTTP and middleware.

FIG. 80 is a Block diagram of the main services available to the system administrator by means of the system administrator station 1200. These services typically comprise:

On-line console 1800 for all services that are available while the system functions regularly.

Off-line console 1810 for all services available when the system is shut down for major installation and maintenance procedures.

Configuration console 1820 that enables the system administrator to set-up hardware peripherals, networking configuration, etc.

Deployment console 1830 that enables the system administrator to set-up new creatures or change the configuration of existing creatures.

FIG. 81 is a Block diagram of the main modules of the software of the Creature Control Server, whether implemented as an independent server or as a part of another server such as the general LOLA server. The Creature Control Server comprises of multiplicity of Proxy Objects 1840, each of which is responsible to a specific creature and a scheduler task that is responsible for the coordination and timing of the operation of the various proxies.

FIG. 82 is a Block diagram of the main services available to the student by means of the programming station. These services are implemented as modules interconnected by means of interfacing such as HTTP and middleware. The three main modules/services are the Interactive Development Environment 1860 (IDE) that enables the student to perform the programming of the tasks assigned to him; the simulator 1870 that enables the student to test the developed program using virtual creatures animated on the computer screen; and task registration 1880 that enables the student to registered the developed program for execution by means of a physical creature.

FIG. 83 is a Block diagram of the main services available to the teacher by means of the teacher station. These services are identical to the services and module construction of the programming station except for the additional teacher console that enables the teacher to assign tasks to students, monitor their work, assign marks, etc.

FIGS. 84 to 93 together comprise a general description of a demonstration pilot project of a Living Object Laboratory.

FIG. 84 is a block diagram of pilot Living Object Laboratory comprising of two classes, each with five programming stations, one teacher station, one radio base station connected directly to the network and one creature. Additionally, outside the two classes, one LOLA server, one administrator station and one base station, also connected directly to the network and controlling four creatures.

FIG. 85 is a block diagram describing the methods and functions for installing the pilot laboratory and using it at the administrator level and within the two classes.

FIGS. 86 and 87 Describe the software and the hardware topologies of the pilot system.

FIGS. 88 to 90 are a flow chart description of the steps in the activation of the demonstration program of the pilot project.

FIG. 90 describes the main application modules of the pilot system.

FIGS. 92 and 93 illustrate the steps to be taken to make the LOLA system operative.

FIG. 92 lists the software modules that has to be installed to be able to activate the pilot demonstration software.

FIG. 93 lists the configuration activity that has to be done before the activity described in FIGS. 88 to 89 can be carried.

The order in which the steps are executed is not important as long as all the steps are executed completely.

FIG. 94 to FIG. 105 describes the structure and features of the Interactive Development Environment (IDE).

FIG. 94 describes a typical construction of the screen of the IDE. The screen typically comprises of a top menu bar 2000 and a bottom status bar 2005 as is common to all windows applications; tool bars, such as 2010 and 2020 that can be placed anywhere on the screen and are shown adjacent to the top menu bar. Tool bar 2010 contains icons of software tools available to the programmer such as editing, compiling, simulating, etc. Programming Tool bar 2020 contains icons of objects that the programmer can incorporate in the software program, such as states, events, functions, etc. An object can be dragged from the tool bar and dropped into the programming window 2030 to be connected with other objects in this window. When an object is selected the properties of the specific objects appear in the object inspector window 2040. The values of these properties can be modified by the programmer to create the necessary program behavior. When simulation is selected an animation of the programmed creature appears in the simulation window 2050. When the creature is instructed to collect input data (such as speech or tactile sensors) the popup menu 2060 appears and the programmer can interact with the creature by the appropriate selections from the popup menu. The message window 2070 provides the programmer with hints during the programming activity and with tracing data of the program execution during simulation activities.

FIG. 95 describes the main functions (File, Edit, View, etc) are available to the programmer in the top menu bar 2000 of the IDE screen and the sub-functions that are made available in a drop down window when a main function is selected.

FIGS. 96A and 96B describe the main objects and programming tools available to the user in the object tool bar 2010 and the programming tool bar 2020.

FIG. 97 describes the objects inspection window 2040 in more details.

FIG. 98 describes the main groups of messages that appear to the programmer in the message window 2070 at various situations. Such message groups are: programming syntax errors, compilation errors, progress indication messages for various functions such as compilation and debugging, test logging messages that the system provide while debugging.

FIG. 99 is a block diagram of the simulation process and module structure. When simulation is activated the IDE module 2200 executes the tested program but sends the creature executable instructions to the virtual creature command interface 2210. Interface 2210 identifies the creature type and the appropriate creature function to be simulated selects and operates the appropriate function 2220. The function 2220 executes the appropriate animation 2230 of the virtual creature on the computer display.

FIG. 100 describes the structure of the bottom status bar 2005.

FIGS. 101A to 101B describes in more detail the content and structure of the objects tool bar 2020 for various groups of objects when such a group is selected. FIG. 101A refers in detail to 2100 of FIG. 96A; FIG. 101B refers in detail to 2120 of FIG. 96A; FIG. 101C refers in detail to 2120 of FIG. 96A and FIG. 101D refers in detail to 2130 of FIG. 96A.

Emotional Analysis

The goal of the Living Object Laboratory is to teach students the art to instill human behavior in computerized machines. One major characteristic of humans is emotional sensitivity. That is, the ability to identify the emotional state and state transition in another human being and to respond accordingly. It is very difficult to teach emotional sensitivity to humans and it is much more difficult to instill emotional sensitivity in machines. However, even the most simplistic emotional sensitivity, when featured by a machine, has a tremendous effect on the interaction of humans and the machine. Therefore, the art of programming emotional sensitivity is important.

The goal of Emotional Analysis is to provide the main application with the capabilities to accommodate to the emotional state of the human that interacts with the machine. Emotional analysis is a background process, or processes. Emotional analysis evaluates the emotional state of the person who interacts with the Living Object. The evaluation is performed continuously, in parallel to other processes. The process may be performed as a subroutine called by the main process or as a background task, as is appropriate for the level of complexity of the application system and the perceived ease of programming. The main module (or process) deals with the main goals of the application (such as playing the role of a teacher, a guard, a guide, a playmate, etc.). The Emotional Analysis communicates with the main task, receiving the required inputs and providing the main application with queues for appropriate response to the interacting human.

The Emotional Analysis is mostly verbal. The Emotional Analysis process analyses the content of verbal inputs recorded by the main application. According to the results of the analysis the Emotional Analysis provides the main application with appropriate data. The data provided by the Emotional Analysis process to the main process may range from the perceived emotional state, or emotional state transition, of the interacting human, to detailed verbal phrases to be played by the main process. The final decision, to provide the Emotional Analysis with inputs and to follow the Emotional Analysis outputs, is in the hands of the main (application) process.

The Emotional Analysis is basically a program and can be programmed using the same programming means available for programming the main application. The Emotional Analysis program can be viewed as an algorithm, implemented as a state machine, where events are combinations of acoustic analysis and semantic analysis of verbal inputs received (recorded) from the interacting human and accumulated data.

The design of the Emotional Analysis process involves several stages such as:

Determining the scope of emotions, e.g., three emotions: sad, happy, angry.

Determining acoustic and semantic representations of the emotions to be detected in the received (recorded) verbal inputs from the interactive human, e.g.

Voice amplitude (quiet or loud voice)
Voice pitch
Rate of speech
Diction quality (quality of speech recognition)
Specific words such as "sad", "happy", "angry"

Of course, the change in one of the above features may be more important than the feature itself. E.g., raising the voice carries more emotional information than continuous loud voice.

Determining means for explicit interrogations of the emotions of the interactive human, such as direct questions, e.g. "Are you sad?"

Determining modifications of the application interaction according to the perceived emotional state of the interacting human. First should be determined the goal of the modification and then the means. For example:

Goals
Express empathy
Provide emotional support, encouragement, etc.
Affect (change) mood Means
Adaptation of appropriate amplitude (loudness), pitch and rate of verbal output.
Several versions of the same verbal content to be selected and played.
Default/standard phrases expressing empathy, interest, support, etc.

Determining the communication means (the protocol) between the application process(es) and the Emotional Analysis process.

Assigning Marks to Student's Programming Projects

Teachers usually evaluate examinations and assign marks based on a checklist. This is true for all subject matter, from exact sciences to humanities. It is also true for the evaluation of programming, from analysis through design to implementation. Checklist evaluation can be automated, that is, be executed by means of a computer. Since the mechanism of computerized evaluation of examinations is common and the same for all subject matter it is outside the scope of this document.

Programming must also work properly, that is, the implementation must function on its own, without faults (crashes) and according to the specifications. It is obvious that the computer can track the performance of the executed program, analyze the performance according to the specifications, and report the results.

Automated (or computerized) evaluation is performed by means of a monitoring program that logs the performance of the monitored program, analyzes the log and reports the results. To enable the monitoring, several checkpoints are set within the monitored program, and the monitoring program logs every passage through these each of these checkpoints with the values of associated parameters.

LOLa's default monitoring provides every entry into and exit from each state (and hence, every entry to and exit from each state transition/connection). The monitoring program reports the results of the monitoring by program module and by student. A mark can be assigned according to the following criteria:

The percentage of states and state connections that have been entered (and hence have been tested).

The percentage of states and state connections that have been exited (and hence have performed successfully).

Internal performance balance, that is, the ratio between the number of entries to (exits from) the entity (state; connection) least visited (most visited) and the average number of entries (exits) within the module (for each and every module). More precisely, the square root of the sum of the squares of the differences between entries (exits) of the list and the most visited entities and the average.

Overall performance balance, that is the ratio between the number of entries (exits) in the module and the project average.

FIG. 103 is a table illustration of an emotional analysis database; and

FIG. 104 is an emotional analysis state chart.

The emotional analysis apparatus is sensitive to mood changes of the user. Mood changes are associated with changes in features of speech of the user, such as loudness, rate, pitch (these are examples of implicit events), the use of specific terms by the user and the answers to direct closed questions (these are examples of explicit events) played by the creature. Each such event has a weight and when the event occurs the weight is added to the relevant table cell. Only when a threshold is passed does the creature respond to a perceived mood change (by providing empathy, asking a closed question, and the like).

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow.

What is claimed is:

1. A system of interactive toys comprising:

at least one toys, each individual toy having a fanciful physical appearance, a speaker mounted on the individual toy and a user input receiver operative to receive input from a user relating to that user's interaction with said individual toy; and a content controller operative to log information, received from said user input receivers, relating to individual past interactions between each user and toy, and to utilize said information relating to individual past interactions, to subsequently control at least one of the toys.

2. A system according to claim 1 wherein said content controller subsequently controls the selection of content to be output from the speaker of at least one of the toys.

3. A system according to claim 1 wherein the content controller identifies the user interacting with an individual toy.

4. An interactive toy method comprising:

providing at least one toys, each individual toy having a fanciful physical appearance, a speaker mounted on the individual toy and a user input receiver operative to receive input from a user relating to that user's interaction with said individual toy; and logging information, received from said user input receivers, relating to individual past interactions between each user and toy, and utilizing said information relating to individual past interactions, to subsequently control at least one of the toys.

* * * * *